US011805528B2

(12) United States Patent
Hosseini et al.

(10) Patent No.: US 11,805,528 B2
(45) Date of Patent: Oct. 31, 2023

(54) COMMUNICATION PREEMPTION APPLICABILITY TECHNIQUES

(71) Applicant: QUALCOMM Incorporated, San Diego, CA (US)

(72) Inventors: Seyedkianoush Hosseini, San Diego, CA (US); Xiaoxia Zhang, San Diego, CA (US); Wanshi Chen, San Diego, CA (US); Alberto Rico Alvarino, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 16/871,936

(22) Filed: May 11, 2020

(65) Prior Publication Data

US 2020/0367278 A1    Nov. 19, 2020

Related U.S. Application Data

(60) Provisional application No. 62/847,124, filed on May 13, 2019.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0007* (2013.01); *H04L 5/0048* (2013.01);
(Continued)

(58) Field of Classification Search
CPC ........... H04W 72/1289; H04W 72/046; H04W 72/1247; H04W 76/27; H04W 72/1242;
(Continued)

(56) References Cited

U.S. PATENT DOCUMENTS

2016/0269047 A1* 9/2016 Jiang .................... H03M 13/27
2017/0366992 A1* 12/2017 Rune .................... H04B 7/0617
(Continued)

FOREIGN PATENT DOCUMENTS

WO    WO-2018204730 A1    11/2018

OTHER PUBLICATIONS

Asustek: "Discussion on Preemption Indication Enhancement", 3GPP Draft, R1-1905085, Discussion on Preemption Indication Enhancement, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Mar. 29, 2019 (Mar. 29, 2019), XP051691983, 3 pages, Retrieved from the Internet: URL: http://www.3gpp.org/ftp/tsg%5Fran/WG1%5FRL1/TSGR1%5F96b/Docs/R1%2D1905085%2Ezip. [retrieved on Mar. 29, 2019] Section 2; p. 2-p. 3.
(Continued)

*Primary Examiner* — Ian N Moore
*Assistant Examiner* — Sun Jong Kim
(74) *Attorney, Agent, or Firm* — QUALCOMM Incorporated

(57) ABSTRACT

A base station allocates uplink and/or downlink resources (e.g., in the time domain, frequency domain, spatial domain) to user equipment (UEs), or groups of UEs, that are subsequently reallocated. A base station determines a reallocation of uplink resources and/or downlink resources, and issues a cancellation indication or preemption indicator that corresponds to at least a portion of the previously allocated resources. UEs is configured to monitor for cancellation or preemption indicators, and based on received cancellation or preemption indicators, UEs determines whether or not to proceed with an uplink transmission or downlink reception using their previously allocated resources. Rules for application of cancellation or preemption indicators are identified
(Continued)

US 11,805,528 B2

Page 2 by a UE and/or base station based on traffic prioritization and cancelation indication prioritization, based on types of scheduled reference signals to be transmitted by the UE, etc.

16 Claims, 23 Drawing Sheets

(51) Int. Cl.
  *H04W 76/27* (2018.01)
  *H04W 72/044* (2023.01)
  *H04W 72/566* (2023.01)
(52) U.S. Cl.
  CPC ....... *H04W 72/046* (2013.01); *H04W 72/566* (2023.01); *H04W 76/27* (2018.02)
(58) Field of Classification Search
  CPC ............. H04W 72/1268; H04L 5/0007; H04L 5/0048; H04L 5/0023; H04L 5/0051; H04L 5/0064; H04L 5/0094; H04L 5/0096; H04B 7/0695
  See application file for complete search history.

(56) References Cited

U.S. PATENT DOCUMENTS

| | | | | |
|---|---|---|---|---|
| 2018/0295631 | A1* | 10/2018 | Fröberg | H04B 7/0632 |
| 2019/0261341 | A1* | 8/2019 | Tang | H04W 72/12 |
| 2019/0268961 | A1* | 8/2019 | Tsai | H04B 7/0695 |
| 2019/0306877 | A1* | 10/2019 | Wang | H04L 5/0094 |
| 2020/0077470 | A1* | 3/2020 | Xiong | H04W 88/06 |
| 2020/0413436 | A1* | 12/2020 | Bae | H04W 72/14 |
| 2021/0314038 | A1* | 10/2021 | Matsumura | H04B 7/0602 |

OTHER PUBLICATIONS

Partial International Search Report—PCT/US2020/032500—ISA/EPO—dated Aug. 7, 2020 (192651WO).
Qualcomm Incorporated: "URLLC DL Pre-Emption and UL Suspension Indication Channel Design", 3GPP Draft; R1-1720692 URLLC DL Pre-Emption and UL Suspension Indication Channel Design, 3rd Generation Partnership Project (3GPP), Mobile Competence Centre; 650, Route Des Lucioles; F-06921 Sophia-Antipolis Cedex; France, vol. RAN WG1, No. Reno, Nevada, US; Nov. 27, 2017-Dec. 1, 2017 Nov. 18, 2017, XP051370153, Retrieved from the Internet: URL:http://www.3gpp.org/ftp/tsg%5Fran/WG1%5FRL1/TSGR1%5F91/Docs/ [retrieved on Nov. 18, 2017], 10 pages.
Catt: "UL Reference Signals for NR Positioning," 3GPP Draft, 3GPP TSG RAN WG1 Meeting #97, R1-1906306, UL Reference Signals for NR Positioning, 3RD Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 4, 2019 (May 4, 2019), XP051708341,7 pages, Retrieved from the Internet: URL: http://www.3gpp.org/ftp/tsg%5Fran/WG1%5FRL1/TSGR1%5F97/Docs/R1%2D1906306%2Ezip [retrieved on May 4, 2019] Section 2,1; p. 1-p. 2.
Ericsson: "On Intra-UE Prioritization Enablers," 3GPP Draft, 3GPP TSG RAN WG1 Meeting #97, R1-1906097, On Intra-UE Prioritization Enablers, 3RD Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 4, 2019 (May 4, 2019), XP051708139, 11 pages, Retrieved from the Internet: URL: http://www.3gpp.org/ftp/tsg%5Fran/WG1%5FRL1/TSGR1%5F97/Docs/R1%2D1906097%2Ezip [retrieved on May 4, 2019] Section 2.2; p. 3-p. 4.
International Search Report and Written Opinion—PCT/US2020/032500—ISA/EPO—dated Sep. 16, 2020 (192651WO).
Mitsubishi Electric: "Views on UL Cancellation," 3GPP Draft, 3GPP TSG RAN WG1 Meeting #97, R1-1907176-URLLC_INTERUE_MITBS_A, 3RD Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 3, 2019 (May 3, 2019), XP051709202, 3 pages, Retrieved from the Internet: URL: http://www.3gpp.org/ftp/tsg%5Fran/WG1%5FRL1/TSGR1%5F97/Docs/R1%2D1907176%2Ezip [retrieved on May 3, 2019] Section 2; p. 1-p. 2.
Taiwan Search Report—TW109115704—TIPO—dated Jul. 11, 2023.

* cited by examiner

COMMUNICATION PREEMPTION APPLICABILITY TECHNIQUES

CROSS REFERENCE

The present application for patent claims the benefit of U.S. Provisional Patent Application No. 62/847,124 by HOSSEINI et al., entitled "COMMUNICATION PREEMPTION APPLICABILITY TECHNIQUES," filed May 13, 2019, assigned to the assignee hereof, and expressly incorporated by reference herein.

BACKGROUND

The following relates generally to wireless communications, and more specifically to communication preemption applicability techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support communication preemption applicability techniques. In some examples, a base station or other network entity may allocate uplink and/or downlink resources to UEs, or groups of UEs, that are subsequently reallocated (e.g., based on a reprioritization of communications) to other UEs, or other groups of UEs. For example, a base station may determine a reallocation of uplink resources or downlink resources and issue a cancellation indication (e.g., an uplink preemption indicator (ULPI) or a downlink preemption indicator (DLPI)) that may correspond to at least a portion of the previously allocated resources (as allocated to particular UEs). UEs may be configured to monitor for cancellation indications, and based on received cancellation indications, UEs may determine whether or not to proceed with an uplink transmission and/or a downlink reception using their previously allocated resources.

For example, a cancellation indication (such as a ULPI) may be used to prevent a UE from using at least a portion of previously allocated uplink resources for an uplink transmission, which may thus support dynamic allocation of uplink resources from communications associated with one latency threshold to communications associated with another latency threshold. For example, resources that were originally allocated to enhanced mobile broadband (eMBB) communications may be reallocated to ultra-reliable low-latency communications (URLLC) (a reallocation towards more performance-sensitive communications, higher priority traffic, etc.). In one example, an eMBB UE that decodes an uplink cancellation indication message may cancel or otherwise preempt uplink transmission (e.g., partially or completely, depending on whether the ULPI applies to allocated resources corresponding to the uplink transmission).

In some cases, ULPI may be used to indicate one or more beams or spatial directions (e.g., to transmission reception points (TRPs), etc.) to be preempted by a UE for uplink transmissions. For example, in some cases, a base station may identify that only a subset of resources (e.g., spatial directions, beams, etc.) over which a UE is transmitting may be reclaimed. In such cases, ULPI may be used to indicate such one or more spatial directions in which transmissions made by the UE are preempted. The UE may thus receive the ULPI, suppress transmission of an uplink message in the one or more spatial directions, and in some cases, transmit the uplink message in different spatial directions than the one or more spatial directions identified by the ULPI.

According to some examples, a particular UE may ignore a cancellation indication, such as when a cancellation indication is meant to halt uplink transmissions from other UEs in order to reallocate the uplink resources to the particular UE, or to a type of traffic that is to be transmitted by the particular UE. In some cases, the applicability of the cancellation indication may be based on the content of a UE uplink transmission. For example, in some cases, there may be rules (which may be referred to as a cancelation rule, a preemption applicability rule, etc.) for application of a cancelation indication (e.g., rules for application of ULPI, rules for application of DLPI, etc.). Thus, according to these and other examples, various types of uplink resource allocations may be canceled, preempted, or reallocated, thereby supporting a dynamic redistribution of uplink resources in a wireless communication system that more effectively balances the performance and resource utilization of communications according to different priorities.

A method of wireless communication at a UE is described. The method may include receiving, at the UE, a downlink control message that schedules transmission by the UE of an uplink message using a set of time and frequency resources, receiving, at the UE, an uplink preemption indicator, where the uplink preemption indicator is indicative of one or more spatial directions in which transmissions made by the UE are preempted during at least a portion of the set of time and frequency resources, and suppressing transmission of the uplink message in the one or more spatial directions during at least the portion of the set of time and frequency resources based on the uplink preemption indicator.

An apparatus for wireless communication at a UE is described. The apparatus may include a processor, memory in electronic communication with the processor, and instructions stored in the memory. The instructions may be executable by the processor to cause the apparatus to receive, at the UE, a downlink control message that schedules transmission by the UE of an uplink message using a set of time and frequency resources, receive, at the UE, an uplink preemption indicator, where the uplink preemption indicator is indicative of one or more spatial directions in which transmissions made by the UE are preempted during at least a portion of the set of time and frequency resources, and suppress transmission of the uplink message in the one or more spatial directions during at least the portion of the set of time and frequency resources based on the uplink preemption indicator.

Another apparatus for wireless communication at a UE is described. The apparatus may include means for receiving, at the UE, a downlink control message that schedules transmission by the UE of an uplink message using a set of time and frequency resources, receiving, at the UE, an uplink preemption indicator, where the uplink preemption indicator is indicative of one or more spatial directions in which transmissions made by the UE are preempted during at least a portion of the set of time and frequency resources, and suppressing transmission of the uplink message in the one or more spatial directions during at least the portion of the set of time and frequency resources based on the uplink preemption indicator.

A non-transitory computer-readable medium storing code for wireless communication at a UE is described. The code may include instructions executable by a processor to receive, at the UE, a downlink control message that schedules transmission by the UE of an uplink message using a set of time and frequency resources, receive, at the UE, an uplink preemption indicator, where the uplink preemption indicator is indicative of one or more spatial directions in which transmissions made by the UE are preempted during at least a portion of the set of time and frequency resources, and suppress transmission of the uplink message in the one or more spatial directions during at least the portion of the set of time and frequency resources based on the uplink preemption indicator.

Some examples of the method, apparatuses, and non-transitory computer-readable medium described herein may further include operations, features, means, or instructions for transmitting the uplink message in spatial directions different than the one or more spatial directions identified by the uplink preemption indicator during at least the portion of the set of time and frequency resources. Some examples of the method, apparatuses, and non-transitory computer-readable medium described herein may further include operations, features, means, or instructions for identifying that the uplink preemption indicator includes one or more bits that correspond to a sounding reference signal resource indicator, and determining the one or more spatial directions based on the one or more bits.

In some examples of the method, apparatuses, and non-transitory computer-readable medium described herein, determining the one or more spatial directions may include operations, features, means, or instructions for identifying one or more panels in which transmissions made by the UE may be preempted during at least the portion of the set of time and frequency resources based on the one or more bits, where the one or more spatial directions may be determined based on the identified one or more panels. In some examples of the method, apparatuses, and non-transitory computer-readable medium described herein, determining the one or more spatial directions may include operations, features, means, or instructions for identifying one or more beams in which transmissions made by the UE are preempted during at least the portion of the plurality of time and frequency resources based at least in part on the one or more bits, wherein the one or more spatial directions are determined based at least in part on the identified one or more beams. In some examples of the method, apparatuses, and non-transitory computer-readable medium described herein, determining the one or more spatial directions may include operations, features, means, or instructions for identifying one or more precoders in which transmissions made by the UE may be preempted during at least the portion of the set of time and frequency resources based on the one or more bits, where the one or more spatial directions may be determined based on the identified one or more precoders.

In some examples of the method, apparatuses, and non-transitory computer-readable medium described herein, the uplink preemption indicator includes a bit sequence in downlink control information. In some examples of the method, apparatuses, and non-transitory computer-readable medium described herein, a first subset of the bit sequence indicates the portion of the set of time and frequency resources and a second subset of the bit sequence indicates the one or more spatial directions. Some examples of the method, apparatuses, and non-transitory computer-readable medium described herein may further include operations, features, means, or instructions for receiving radio resource control signaling indicative of a relationship between the second subset of the bit sequence and the one or more spatial directions. In some examples of the method, apparatuses, and non-transitory computer-readable medium described herein, the relationship indicates a mapping of one or more sounding reference signal resource indicators to one or more bit values represented by the second subset of the bit sequence.

A method of wireless communication at a UE is described. The method may include identifying, at the UE, that the UE is scheduled to transmit a positioning reference signal using a set of time and frequency resources, receiving, at the UE, an uplink preemption indicator, where the uplink preemption indicator is indicative of at least a portion of the set of time and frequency resources for which transmissions made by the UE are preempted, identifying a rule for application of the uplink preemption indicator to the scheduled positioning reference signal, and transmitting the scheduled positioning reference signal in accordance with the rule.

An apparatus for wireless communication at a UE is described. The apparatus may include a processor, memory in electronic communication with the processor, and instructions stored in the memory. The instructions may be executable by the processor to cause the apparatus to identify, at the UE, that the UE is scheduled to transmit a positioning reference signal using a set of time and frequency resources, receive, at the UE, an uplink preemption indicator, where the uplink preemption indicator is indicative of at least a portion of the set of time and frequency resources for which transmissions made by the UE are preempted, identify a rule for application of the uplink preemption indicator to the scheduled positioning reference signal, and transmit the scheduled positioning reference signal in accordance with the rule.

Another apparatus for wireless communication at a UE is described. The apparatus may include means for identifying, at the UE, that the UE is scheduled to transmit a positioning reference signal using a set of time and frequency resources, receiving, at the UE, an uplink preemption indicator, where the uplink preemption indicator is indicative of at least a portion of the set of time and frequency resources for which transmissions made by the UE are preempted, identifying a rule for application of the uplink preemption indicator to the scheduled positioning reference signal, and transmitting the scheduled positioning reference signal in accordance with the rule.

A non-transitory computer-readable medium storing code for wireless communication at a UE is described. The code may include instructions executable by a processor to identify, at the UE, that the UE is scheduled to transmit a positioning reference signal using a set of time and frequency resources, receive, at the UE, an uplink preemption indicator, where the uplink preemption indicator is indicative of at least a portion of the set of time and frequency resources for which transmissions made by the UE are preempted, identify a rule for application of the uplink preemption indicator to the scheduled positioning reference signal, and transmit the scheduled positioning reference signal in accordance with the rule.

In some examples of the method, apparatuses, and non-transitory computer-readable medium described herein, transmitting the scheduled positioning reference signal in accordance with the rule may include operations, features, means, or instructions for refraining from transmitting the positioning reference signal using the portion of the set of time and frequency resources based on applying the uplink preemption indicator to the scheduled positioning reference signal according to the rule. In some examples of the method, apparatuses, and non-transitory computer-readable medium described herein, transmitting the scheduled positioning reference signal in accordance with the rule may include operations, features, means, or instructions for transmitting the positioning reference signal using the set of time and frequency resources regardless of the uplink preemption indicator being indicative of at least the portion of the set of time and frequency resources. In some examples of the method, apparatuses, and non-transitory computer-readable medium described herein, the rule may include application of the uplink preemption indicator to the scheduled positioning reference signal based at least in part on a priority of the positioning reference signal.

Some examples of the method, apparatuses, and non-transitory computer-readable medium described herein may further include operations, features, means, or instructions for receiving an indication of the rule, where the rule may be identified based on the indication. Some examples of the method, apparatuses, and non-transitory computer-readable medium described herein may further include operations, features, means, or instructions for determining that the portion of the set of time and frequency resources for which transmissions made by the UE may be preempted correspond to the set of time and frequency resources, where the rule may be identified based on the determination. In some examples of the method, apparatuses, and non-transitory computer-readable medium described herein, the positioning reference signal may be a sounding reference signal that includes a usage indication that the sounding reference signal may be to be used for positioning, where applying the uplink preemption indicator to the scheduled positioning reference signal may be based on the usage indication. In some examples of the method, apparatuses, and non-transitory computer-readable medium described herein, the rule may be identified based on the usage indication.

A method of wireless communication at a UE is described. The method may include receiving, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receiving, at the UE, a downlink preemption indicator, where the downlink preemption indicator indicates that one or more communications are preempted during at least a portion of the set of time and frequency resources, identifying a rule for application of the downlink preemption indicator, and receiving the one or more communications in accordance with the rule.

An apparatus for wireless communication at a UE is described. The apparatus may include a processor, memory in electronic communication with the processor, and instructions stored in the memory. The instructions may be executable by the processor to cause the apparatus to receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receive, at the UE, a downlink preemption indicator, where the downlink preemption indicator indicates that one or more communications are preempted during at least a portion of the set of time and frequency resources, identify a rule for application of the downlink preemption indicator, and receive the one or more communications in accordance with the rule.

Another apparatus for wireless communication at a UE is described. The apparatus may include means for receiving, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receiving, at the UE, a downlink preemption indicator, where the downlink preemption indicator indicates that one or more communications are preempted during at least a portion of the set of time and frequency resources, identifying a rule for application of the downlink preemption indicator, and receiving the one or more communications in accordance with the rule.

A non-transitory computer-readable medium storing code for wireless communication at a UE is described. The code may include instructions executable by a processor to receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receive, at the UE, a downlink preemption indicator, where the downlink preemption indicator indicates that one or more communications are preempted during at least a portion of the set of time and frequency resources, identify a rule for application of the downlink preemption indicator, and receive the one or more communications in accordance with the rule.

Some examples of the method, apparatuses, and non-transitory computer-readable medium described herein may further include operations, features, means, or instructions for identifying a channel priority list, identifying a priority of the one or more communications, and identifying a priority of the downlink preemption indicator, where the rule for application of the downlink preemption indicator may be based on the channel priority list and a comparison of the priority of the one or more communications and the priority of the downlink preemption indicator. In some examples of the method, apparatuses, and non-transitory computer-readable medium described herein, the channel priority list may be identified based on a format of the downlink control message, a size of the downlink control message, a radio network temporary identifier of the downlink control message, a search space or control resource set used to monitor for the downlink control message, an indication in the downlink control message, or some combination thereof.

In some examples of the method, apparatuses, and non-transitory computer-readable medium described herein, the priority of the downlink preemption indicator may be identified based on a bit sequence included in the downlink preemption indicator, a radio network temporary identifier of the downlink preemption indicator, a monitoring occasion of the downlink preemption indicator, or some combination thereof. Some examples of the method, apparatuses, and non-transitory computer-readable medium described herein may further include operations, features, means, or instructions for receiving, at the UE, an indication of the rule in radio resource control signaling, the downlink control message, or both.

In some examples of the method, apparatuses, and non-transitory computer-readable medium described herein, the indication includes a priority indication for at least a portion of the scheduled set of time and frequency resources for downlink communications. Some examples of the method, apparatuses, and non-transitory computer-readable medium described herein may further include operations, features, means, or instructions for receiving, at the UE, a downlink preemption indicator monitoring configuration in a system information block. Some examples of the method, apparatuses, and non-transitory computer-readable medium described herein may further include operations, features, means, or instructions for identifying a radio network temporary identifier, and decoding the downlink preemption indicator based on the identified radio network temporary identifier and the received downlink preemption indicator monitoring configuration.

Some examples of the method, apparatuses, and non-transitory computer-readable medium described herein may further include operations, features, means, or instructions for identifying, from the downlink control message, a group of time and frequency resources including the set of time and frequency resources for downlink communications, where the downlink preemption indicator indicates the one or more preempted communications based on the group of time and frequency resources. Some examples of the method, apparatuses, and non-transitory computer-readable medium described herein may further include operations, features, means, or instructions for identifying, from the downlink control message, a group of time and frequency resources including one or more multimedia broadcast multicast service symbols, where the downlink preemption indicator indicates the one or more preempted communications based on the group of time and frequency resources.

Some examples of the method, apparatuses, and non-transitory computer-readable medium described herein may further include operations, features, means, or instructions for identifying, from the downlink control message, a group of time and frequency resources including one or more uplink symbols, where the downlink preemption indicator indicates the one or more preempted communications based on the group of time and frequency resources.

A method of wireless communication at a base station is described. The method may include transmitting, to a UE, a downlink control message that schedules transmission by the UE of an uplink message using a set of time and frequency resources, transmitting, to the UE, an uplink preemption indicator, where the uplink preemption indicator is indicative of one or more spatial directions in which transmissions made by the UE are preempted during at least a portion of the set of time and frequency resources, and monitoring for the uplink message during at least the portion of the set of time and frequency resources based on the transmitted uplink preemption indicator.

An apparatus for wireless communication at a base station is described. The apparatus may include a processor, memory in electronic communication with the processor, and instructions stored in the memory. The instructions may be executable by the processor to cause the apparatus to transmit, to a UE, a downlink control message that schedules transmission by the UE of an uplink message using a set of time and frequency resources, transmit, to the UE, an uplink preemption indicator, where the uplink preemption indicator is indicative of one or more spatial directions in which transmissions made by the UE are preempted during at least a portion of the set of time and frequency resources, and monitor for the uplink message during at least the portion of the set of time and frequency resources based on the transmitted uplink preemption indicator.

Another apparatus for wireless communication at a base station is described. The apparatus may include means for transmitting, to a UE, a downlink control message that schedules transmission by the UE of an uplink message using a set of time and frequency resources, transmitting, to the UE, an uplink preemption indicator, where the uplink preemption indicator is indicative of one or more spatial directions in which transmissions made by the UE are preempted during at least a portion of the set of time and frequency resources, and monitoring for the uplink message during at least the portion of the set of time and frequency resources based on the transmitted uplink preemption indicator.

A non-transitory computer-readable medium storing code for wireless communication at a base station is described. The code may include instructions executable by a processor to transmit, to a UE, a downlink control message that schedules transmission by the UE of an uplink message using a set of time and frequency resources, transmit, to the UE, an uplink preemption indicator, where the uplink preemption indicator is indicative of one or more spatial directions in which transmissions made by the UE are preempted during at least a portion of the set of time and frequency resources, and monitor for the uplink message during at least the portion of the set of time and frequency resources based on the transmitted uplink preemption indicator.

Some examples of the method, apparatuses, and non-transitory computer-readable medium described herein may further include operations, features, means, or instructions for receiving the uplink message in spatial directions different than the one or more spatial directions indicated by the uplink preemption indicator during at least the portion of the set of time and frequency resources. Some examples of the method, apparatuses, and non-transitory computer-readable medium described herein may further include operations, features, means, or instructions for identifying traffic of another UE may be of a first priority that may be higher than a second priority the uplink message, and identifying the one or more spatial directions in which transmissions made by the UE may be preempted based on the identification that the traffic of the another UE may be of the first priority that may be higher than the second priority the uplink message.

Some examples of the method, apparatuses, and non-transitory computer-readable medium described herein may further include operations, features, means, or instructions for identifying one or more bits that correspond to a sounding reference signal resource indicator based on the identified one or more spatial directions, where the uplink preemption indicator may be indicative of one or more spatial directions based on the sounding reference signal resource indicator. Some examples of the method, apparatuses, and non-transitory computer-readable medium described herein may further include operations, features, means, or instructions for identifying one or more precoders in which transmissions made by the UE may be preempted during at least the portion of the set of time and frequency resources, where the sounding reference signal resource indicator may be identified based on the one or more precoders.

In some examples of the method, apparatuses, and non-transitory computer-readable medium described herein, the uplink preemption indicator includes a bit sequence in downlink control information. In some examples of the method, apparatuses, and non-transitory computer-readable medium described herein, a first subset of the bit sequence indicates the portion of the set of time and frequency resources and a second subset of the bit sequence indicates the one or more spatial directions. Some examples of the method, apparatuses, and non-transitory computer-readable medium described herein may further include operations, features, means, or instructions for transmitting radio resource control signaling indicative of a relationship between the second subset of the bit sequence and the one or more spatial directions. In some examples of the method, apparatuses, and non-transitory computer-readable medium described herein, the relationship indicates a mapping of one or more sounding reference signal resource indicators to one or more bit values represented by the second subset of the bit sequence.

In some examples of the method, apparatuses, and non-transitory computer-readable medium described herein, monitoring for the uplink message based on the based on the transmitted uplink preemption indicator may include operations, features, means, or instructions for monitoring for the uplink message in spatial directions different than the one or more spatial directions indicated by the uplink preemption indicator during at least the portion of the set of time and frequency resources.

A method of wireless communication at a base station is described. The method may include transmitting, to a UE, a downlink message that schedules transmission by the UE of a positioning reference signal using a set of time and frequency resources, transmitting, to the UE, an uplink preemption indicator, where the uplink preemption indicator is indicative of at least a portion of the set of time and frequency resources for which transmissions made by the UE are preempted, identifying a rule for UE application of the uplink preemption indicator to the scheduled positioning reference signal, and monitoring for the scheduled positioning reference signal based on the rule.

An apparatus for wireless communication at a base station is described. The apparatus may include a processor, memory in electronic communication with the processor, and instructions stored in the memory. The instructions may be executable by the processor to cause the apparatus to transmit, to a UE, a downlink message that schedules transmission by the UE of a positioning reference signal using a set of time and frequency resources, transmit, to the UE, an uplink preemption indicator, where the uplink preemption indicator is indicative of at least a portion of the set of time and frequency resources for which transmissions made by the UE are preempted, identify a rule for UE application of the uplink preemption indicator to the scheduled positioning reference signal, and monitor for the scheduled positioning reference signal based on the rule.

Another apparatus for wireless communication at a base station is described. The apparatus may include means for transmitting, to a UE, a downlink message that schedules transmission by the UE of a positioning reference signal using a set of time and frequency resources, transmitting, to the UE, an uplink preemption indicator, where the uplink preemption indicator is indicative of at least a portion of the set of time and frequency resources for which transmissions made by the UE are preempted, identifying a rule for UE application of the uplink preemption indicator to the scheduled positioning reference signal, and monitoring for the scheduled positioning reference signal based on the rule.

A non-transitory computer-readable medium storing code for wireless communication at a base station is described. The code may include instructions executable by a processor to transmit, to a UE, a downlink message that schedules transmission by the UE of a positioning reference signal using a set of time and frequency resources, transmit, to the UE, an uplink preemption indicator, where the uplink preemption indicator is indicative of at least a portion of the set of time and frequency resources for which transmissions made by the UE are preempted, identify a rule for UE application of the uplink preemption indicator to the scheduled positioning reference signal, and monitor for the scheduled positioning reference signal based on the rule.

In some examples of the method, apparatuses, and non-transitory computer-readable medium described herein, monitoring for the scheduled positioning reference signal based on the rule may include operations, features, means, or instructions for refraining from monitoring for the positioning reference signal using the portion of the set of time and frequency resources based on the rule. Some examples of the method, apparatuses, and non-transitory computer-readable medium described herein may further include operations, features, means, or instructions for receiving the positioning reference signal using the set of time and frequency resources regardless of the uplink preemption indicator being indicative of at least the portion of the set of time and frequency resources based on the rule.

Some examples of the method, apparatuses, and non-transitory computer-readable medium described herein may further include operations, features, means, or instructions for transmitting, to the UE, an indication of the rule. Some examples of the method, apparatuses, and non-transitory computer-readable medium described herein may further include operations, features, means, or instructions for determining that the portion of the set of time and frequency resources for which transmissions made by the UE may be preempted correspond to the set of time and frequency resources, where the rule may be identified based on the determination. In some examples of the method, apparatuses, and non-transitory computer-readable medium described herein, the positioning reference signal may be a sounding reference signal that includes a usage indication that the sounding reference signal may be to be used for positioning. In some examples of the method, apparatuses, and non-transitory computer-readable medium described herein, the rule may be identified based on the usage indication.

A method of wireless communication at a base station is described. The method may include transmitting, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmitting, to the UE, a downlink preemption indicator, where the downlink preemption indicator indicates that one or more communications are preempted during at least a portion of the set of time and frequency resources, identifying a rule for UE application of the downlink preemption indicator, and monitoring for the one or more communications based on the rule.

An apparatus for wireless communication at a base station is described. The apparatus may include a processor, memory in electronic communication with the processor, and instructions stored in the memory. The instructions may be executable by the processor to cause the apparatus to transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmit, to the UE, a downlink preemption indicator, where the downlink preemption indicator indicates that one or more communications are preempted during at least a portion of the set of time and frequency resources, identify a rule for UE application of the downlink preemption indicator, and monitor for the one or more communications based on the rule.

Another apparatus for wireless communication at a base station is described. The apparatus may include means for transmitting, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmitting, to the UE, a downlink preemption indicator, where the downlink preemption indicator indicates that one or more communications are preempted during at least a portion of the set of time and frequency resources, identifying a rule for UE application of the downlink preemption indicator, and monitoring for the one or more communications based on the rule.

A non-transitory computer-readable medium storing code for wireless communication at a base station is described. The code may include instructions executable by a processor to transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmit, to the UE, a downlink preemption indicator, where the downlink preemption indicator indicates that one or more communications are preempted during at least a portion of the set of time and frequency resources, identify a rule for UE application of the downlink preemption indicator, and monitor for the one or more communications based on the rule.

Some examples of the method, apparatuses, and non-transitory computer-readable medium described herein may further include operations, features, means, or instructions for identifying a channel priority list, identifying a priority of the one or more communications, and identifying a priority of the downlink preemption indicator, where the rule for UE application of the downlink preemption indicator may be based on the channel priority list and a comparison of the priority of the one or more communications and the priority of the downlink preemption indicator.

Some examples of the method, apparatuses, and non-transitory computer-readable medium described herein may further include operations, features, means, or instructions for determining a format of the downlink control message, a size of the downlink control message, a radio network temporary identifier of the downlink control message, a search space or control resource set used to monitor for the downlink control message, an indication in the downlink control message, or some combination thereof based on the channel priority list, where the channel priority list may be indicated to the UE based on the determining.

Some examples of the method, apparatuses, and non-transitory computer-readable medium described herein may further include operations, features, means, or instructions for determining a bit sequence included in the downlink preemption indicator, a radio network temporary identifier of the downlink preemption indicator, a monitoring occasion of the downlink preemption indicator, or some combination thereof based on the priority of the downlink preemption indicator, where the priority of the downlink preemption indicator may be indicated to the UE based on the determining. Some examples of the method, apparatuses, and non-transitory computer-readable medium described herein may further include operations, features, means, or instructions for transmitting, to the UE, an indication of the rule in radio resource control signaling, the downlink control message, or both.

In some examples of the method, apparatuses, and non-transitory computer-readable medium described herein, the indication includes a priority indication for at least a portion of the scheduled set of time and frequency resources for downlink communications. Some examples of the method, apparatuses, and non-transitory computer-readable medium described herein may further include operations, features, means, or instructions for transmitting, to the UE, a downlink preemption indicator monitoring configuration in a system information block. Some examples of the method, apparatuses, and non-transitory computer-readable medium described herein may further include operations, features, means, or instructions for identifying a radio network temporary identifier, and encoding the downlink preemption indicator based on the identified radio network temporary identifier.

Some examples of the method, apparatuses, and non-transitory computer-readable medium described herein may further include operations, features, means, or instructions for determining a group of time and frequency resources, from the set of time and frequency resources scheduled by the downlink control message, including the set of time and frequency resources for downlink communications, where the downlink preemption indicator indicates the one or more preempted communications based on the group of time and frequency resources. Some examples of the method, apparatuses, and non-transitory computer-readable medium described herein may further include operations, features, means, or instructions for determining a group of time and frequency resources, from the set of time and frequency resources scheduled by the downlink control message, including one or more multimedia broadcast multicast service symbols, where the downlink preemption indicator indicates the one or more preempted communications based on the group of time and frequency resources.

Some examples of the method, apparatuses, and non-transitory computer-readable medium described herein may further include operations, features, means, or instructions for determining a group of time and frequency resources, from the set of time and frequency resources scheduled by the downlink control message, including one or more uplink symbols, where the downlink preemption indicator indicates the one or more preempted communications based on the group of time and frequency resources.

DETAILED DESCRIPTION

Figure 1:
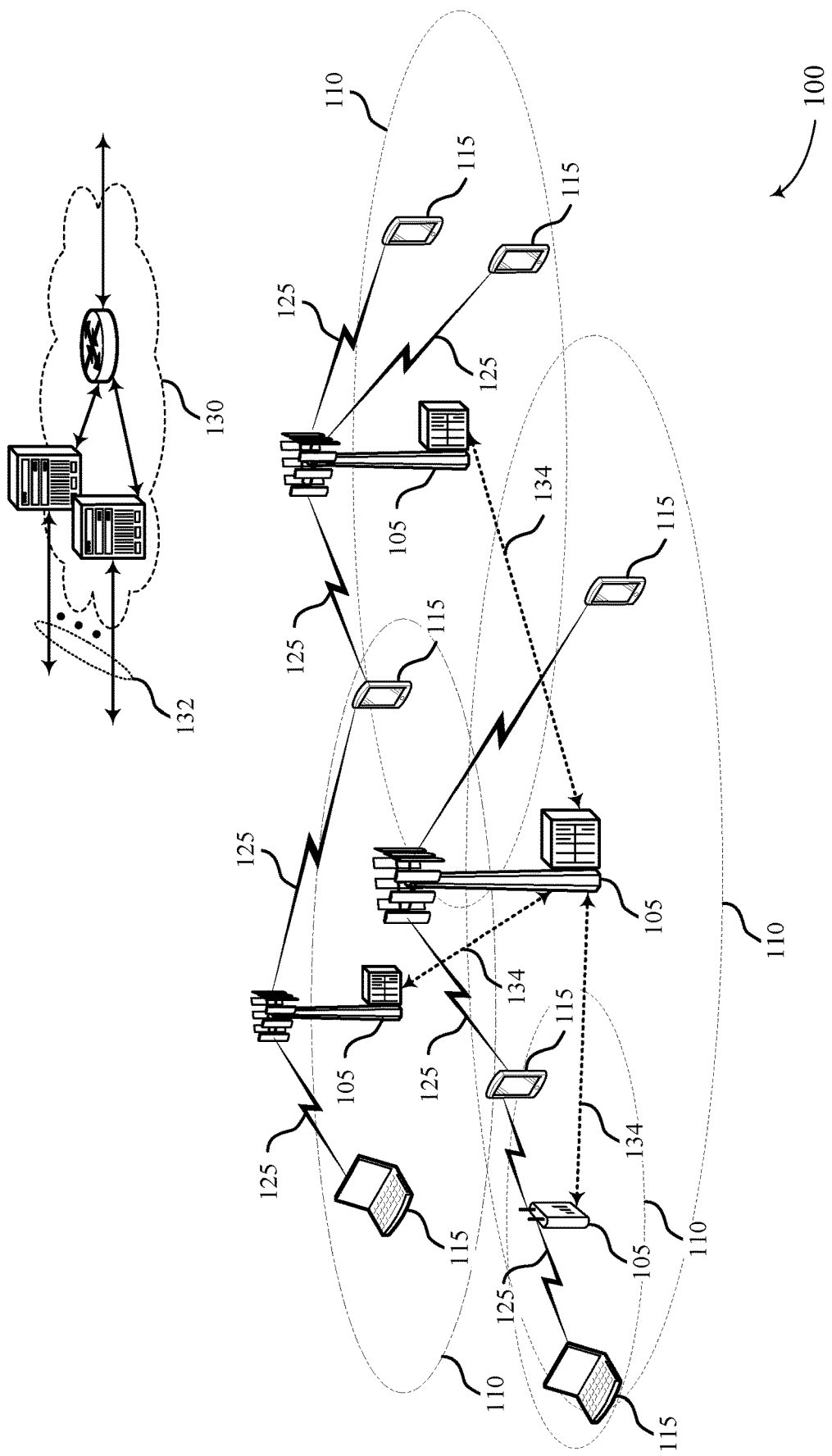
FIG. 1 illustrates an example of a system for wireless communications that supports communication preemption applicability techniques in accordance with aspects of the present disclosure.

Some wireless communications systems, such as NR systems, may support heterogeneous conditions for one or more service deployments. For example, communication devices, such as a base station or a UE, may support flexibility in allocating multiple supported services or traffic types over resources of a channel. As part of the allocation of channel resources, a base station and a UE may support the prioritization of some communications over others, which may include prioritization of traffic or services having different reliability thresholds, different latency thresholds, or both. In some cases, efficient system utilization may be based on how resources are shared or allocated between different traffic types, or UEs configured according to different traffic types.

Some communication systems may support different traffic types which may include or refer to communications traffic having different reliability thresholds, different latency thresholds, different services, or various combinations thereof. For example, a wireless communication system may support a first traffic type associated with relatively high reliability targets or thresholds and relatively low latency targets or thresholds, such as ultra-reliable low-latency communications (URLLC) traffic type. The wireless communication system may also support a second traffic type associated with relatively low reliability targets or thresholds and relatively long or relaxed latency thresholds, such as enhanced mobile broadband (eMBB) traffic type. In some cases, to support various system operations (e.g., efficient utilization of wireless communication resources, appropriate allocation or balancing of wireless communication resources, appropriate support of traffic according to different prioritization or latency thresholds), a wireless communication system may support dynamic resource sharing between traffic types, such as a dynamic allocation of resources between URLLC communications and eMBB communications, or other communications, according to different traffic types, categories, or other prioritizations.

The described techniques include various examples of dynamic resource allocation by way of cancellation or preemption of previously allocated uplink resources by a network entity, such as a base station or other controller or resource allocation authority in communication with a base station. For example, a base station, or other network entity, may allocate uplink resources (e.g., an initial uplink resource allocation) to UEs, or groups of UEs, and the base station may subsequently issue a cancellation or preemption indicator (e.g., an uplink preemption indicator (ULPI) or a downlink preemption indicator (DLPI)) that may correspond to at least a portion of the previously allocated uplink or downlink resources (as allocated to particular UEs). UEs may detect such a cancellation indication and determine whether or not to proceed with an uplink transmission (e.g., physical uplink shared channel (PUSCH) transmission) or a downlink reception (e.g., reception of physical downlink shared channel (PDSCH)) using their previously allocated uplink resources (e.g., based on whether or not the cancelation indication is directed to the UE, based on rules for application of ULPI, based on rules for application of DLPI, etc.).

In some examples, a cancellation indication may be used to prevent a UE from using at least a portion of previously allocated uplink resources for an uplink transmission, which may support a dynamic allocation of uplink resources from communications associated with one latency threshold to communications associated with another latency threshold, or some other reallocation based on communications prioritization. For example, resources that were originally allocated to eMBB communications may be reallocated to URLLC communications (a reallocation towards more performance-sensitive communications). In some examples, a particular UE may ignore a cancellation indication, such as when a cancellation indication is meant to halt uplink transmissions from other UEs in order to reallocate the uplink resources to the particular UE, or to a type of traffic that is to be transmitted by the particular UE. Generally, UEs may receive ULPI and/or DLPI and identify rules for application of the ULPI and/or DLPI (e.g., based on a type of traffic or traffic priority associated with the UE during resources preempted by the cancelation indication, based on a scheduled reference signals to be transmitted by the UE, etc.)

Thus, according to these and other examples, various types of uplink resource allocations may be canceled, preempted, or reallocated, thereby supporting a dynamic redistribution of uplink resources in a wireless communication system that more effectively balances the performance and resource utilization of communications according to different priorities. Further, the described techniques may provide for efficient adherence to cancelation indications. For example, the described rules for application of ULPI/DLPI (e.g., based on traffic prioritization and cancelation indication prioritization, based on types of reference signals to be transmitted by the UE, etc.) may provide for efficient communication preemption such that uplink and/or downlink communications are not unnecessarily or inefficiently preempted by the UE.

Aspects of the disclosure are initially described in the context of a wireless communications system. Aspects of the disclosure are further illustrated by and described with reference to examples of signaling, operations, and diagrams that may support the described techniques for uplink preemption applicability techniques. Aspects of the disclosure are further illustrated by and described with reference to apparatus diagrams, system diagrams, and flowcharts that relate to communication preemption applicability techniques.

FIG. 1 illustrates an example of a wireless communications system 100 that supports uplink preemption applicability techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may be configured to support different traffic types (e.g., traffic categories, traffic priorities, service priorities), which may include or refer to communications traffic having different reliability thresholds, different latency thresholds, different services, or various combinations thereof. For example, the wireless communications system 100 may support a first traffic type associated with relatively high reliability targets or thresholds and relatively low latency targets or thresholds, such as a URLLC traffic type. The wireless communications system 100 may also support a second traffic type, associated with relatively low reliability targets or thresholds and relatively long or relaxed latency thresholds, such an eMBB traffic type. In some cases, to support various system operations (e.g., efficient utilization of wireless communication resources, appropriate allocation or balancing of wireless communication resources, appropriate support of traffic according to different prioritization or latency threshold), the wireless communications system 100 may support dynamic resource sharing between traffic types, such as a dynamic allocation of resources between URLLC communications and eMBB communications, or other communications, according to different traffic types, categories, or other prioritization.

To support various uplink resource allocation techniques, a base station 105 or other network entity (e.g., an entity of the core network 130, an entity of a distributed base station 105, etc.) may allocate uplink and/or downlink resources (e.g., an initial uplink resource allocation or an initial downlink resource allocation) to UEs 115, or groups of UEs 115, for uplink transmissions and/or downlink transmissions. In some examples, a base station 105 or other network entity may subsequently determine to perform a reallocation of the previously allocated resources, which may be triggered, for example, by a determined or detected need, demand, or request to support higher-priority communications. Thus, a base station 105 or other network entity may generate and transmit a cancelation indication (e.g., an ULPI and/or a DLPI) that may correspond to at least a portion of the previously allocated resources (e.g., as allocated to particular UEs 115). UEs 115 may be configured to monitor for ULPIs and DLPIs, and accordingly may determine, based at least in part on received, detected, or decoded ULPIs or DLPIs, whether or not to proceed with uplink transmissions and/or downlink reception using their previously allocated uplink resources.

According to some examples, a particular UE 115 may ignore a cancellation indication, such as when a cancellation indication is meant to halt uplink transmissions from other UEs 115 in order to reallocate the uplink resources to the particular UE 115, or to a type of traffic that is to be transmitted by the particular UE 115. In some cases, the applicability of the cancellation indication (e.g., rules for applying or adhering to a cancellation indication) may be based on the a traffic type of UE 115 communications, content of a UE 115 uplink transmission, etc.). For example, in some cases, there may be rules (which may be referred to as a cancelation rule, a preemption applicability rule, etc.) for application of a cancelation indication (e.g., rules for application of ULPI, rules for application of DLPI, etc.). Thus, according to these and other examples, various types of uplink resource allocations may be canceled, preempted, or reallocated, thereby supporting a dynamic redistribution of uplink resources in a wireless communication system that more effectively balances the performance and resource utilization of communications according to different priorities.

Figure 2:
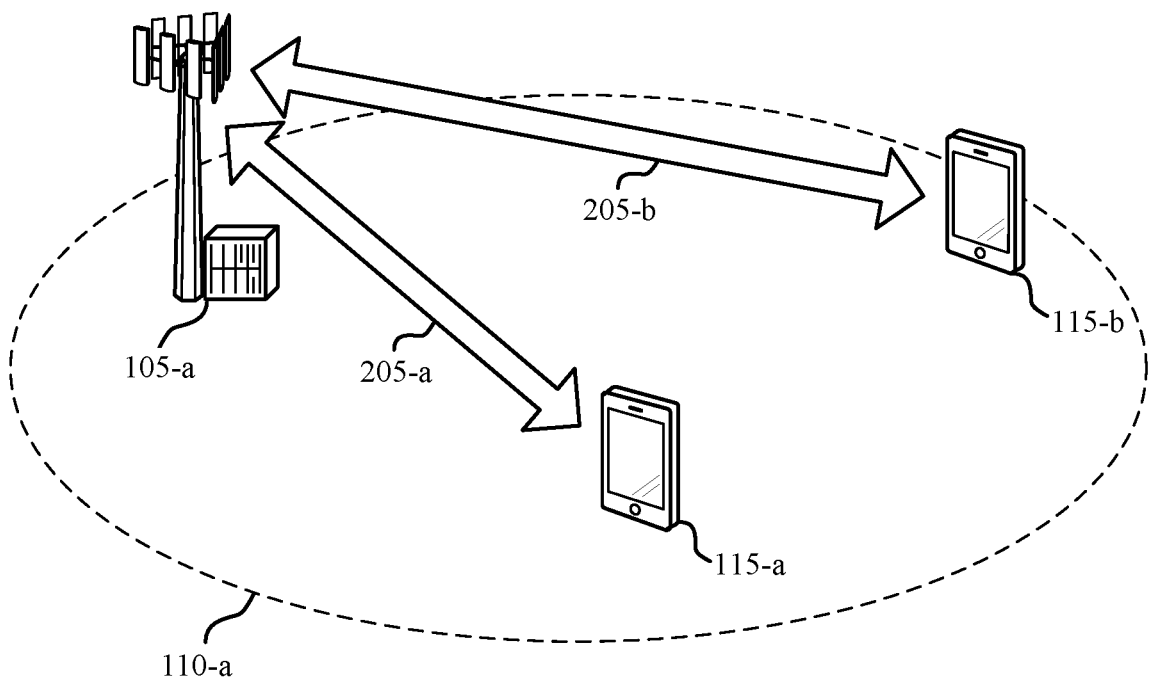
FIG. 2 illustrates an example of a wireless communications system that supports communication preemption applicability techniques in accordance with aspects of the present disclosure.

FIG. 2 illustrates an example of a wireless communications system 200 that supports communication preemption applicability techniques in accordance with aspects of the present disclosure. In some examples, wireless communications system 200 may implement aspects of wireless communications system 100. Wireless communications system 200 may include base station 105-a, UE 115-a, and UE 115-b, which may be examples of the corresponding devices described with reference to FIG. 1. In the example of FIG. 2, base station 105-a may support communications with UE 115-a and UE 115-b within a supported geographic coverage area 110-a via communications links 205-a and 205-b, respectively. In some examples, the wireless communications system 200 may support mission critical applications that include stringent communication performance (e.g., reliability thresholds, latency thresholds, etc.) along with communications of other types.

In the wireless communications system 200, UE 115-a and UE 115-b may support different service deployments, such as URLLC service and eMBB service. For example, the UE 115-a may support URLLC transmission to reduce end-to-end latency for data transmission and reception associated with the base station 105-a. In some examples, the UE 115-a may correspond to a URLLC UE that supports or is otherwise configured for transmissions, such as periodic transmissions, of relatively small data packets. For example, the UE 115-a may include a URLLC UE that supports operations and data communication associated with factory automation (e.g., automated manufacturing, supply chain management, etc.), transport (e.g., vehicle-to-vehicle (V2V) communications, vehicle-to-infrastructure (V2I) communications, etc.), or electrical power distribution (e.g., power grid networking) within a supported area or locale, among other possible implementations.

Additionally or alternatively, the UE 115-b may support eMBB transmissions associated with high data rates across wide coverage areas (such as geographic coverage area 110-a) supported by the base station 105-a. In some examples, compared to URLLC communications, eMBB communications may be associated with relatively relaxed latency targets or thresholds, lower reliability targets or thresholds, or both. Moreover, one or more of UE 115-a and UE 115-b may support data communications associated with multiple service deployments (such as URLLC and eMBB), as part of an intra-UE or inter-UE operation.

As such, according to the described techniques, a base station 105-a, or other network entity, may allocate uplink and/or downlink resources (e.g., in the time domain, frequency domain, and/or spatial domain) to UEs 115, or groups of UEs, that may be subsequently reallocated. For example, a base station 105-a may determine a reallocation of uplink resources and/or downlink resources, and may issue a cancellation indication or preemption indicator that may correspond to at least a portion of the previously allocated resources. UEs 115 (e.g., UE 115-a and UE 115-b) may be configured to monitor for cancellation or preemption indicators, and based on received cancellation or preemption indicators, UEs 115 may determine whether or not to proceed with an uplink transmission or downlink reception using their previously allocated resources. In some cases, rules for application of cancellation or preemption indicators may be identified by a UE 115 and/or base station 105 based on traffic prioritization and cancelation indication prioritization, based on types of scheduled reference signals to be transmitted by the UE 115, etc.

That is, to support the conditions associated with the URLLC and eMBB service deployments, or other types of resource allocation based on communication prioritization, the base station 105-a and the UEs 115-a and 115-b may support various techniques for dynamic uplink resource allocations and communication preemption applicability techniques described herein. For example, the base station 105-a may be configured to transmit ULPI based at least in part on determining a reallocation of uplink resources (e.g., associated with uplink resources allocated to one or both of the UE 115-a or 115-b), and the UEs 115-a and 115-b may monitor for such ULPIs to determine how they should proceed with uplink communications. In other words, the UEs 115 may be notified about canceled or preempted uplink resources in the time domain, frequency domain, and/or spatial domain. In various examples, each of the UE 115-a or the UE 115-b may perform uplink communication determinations such as determining whether to perform or proceed with uplink transmissions using at least a portion of their previously allocated uplink resources, or determining to refrain from using at least a portion of their previously allocated uplink resources, or determining to await another allocation of uplink resources before initiating or resuming uplink communications, or other determinations.

ULPIs may be signaled by the base station 105-a to UEs 115 (one or both of the UEs 115-a or 115-b, or a group of UEs) according to various techniques. For example, a UE 115 may be configured to monitor for ULPIs according to various signaling by the base station 105-a, such as various types of downlink control signaling, physical channel signaling, cell-specific signaling, and others. In some examples, ULPIs may be conveyed in downlink control information (DCI) over a physical downlink control channel (PDCCH), which may support UE-specific ULPIs. In some examples, a UE 115 may be configured (by the base station 105-a) with a radio network temporary identifier (RNTI) for monitoring a PDCCH that may be carrying ULPIs. In various examples, a UE 115 may be configured with a RNTI that is common between uplink and downlink cancellation or preemption indicators, or different between uplink and downlink cancellation or preemption indicators.

In some examples, a UE 115 may transmit over multiple beams (a UE 115 may transmit an uplink message in one or more spatial directions). In some cases, only a subset of the spatial directions may be imposing interference on another UE. For example, such a scenario may arise where UE 115-a (e.g., a URLLC UE) transmits over a beam in the same direction (or at least partially aligned) as one of the UE 115-b (e.g., an eMBB UE) beams. For example, UE 115-b may be scheduled to transmit an uplink message in multiple spatial directions using a plurality of time and frequency resources. In some examples, UE 115-b (and in some cases UE 115-a) may be capable of transmitting simultaneous (in parallel or at least partially overlapping in time) uplink channels per serving cell. Base station 105-a may determine that UE 115-a is to employ URLLC (or other high priority communications) using resources that may interfere with some subset of the spatial directions associated with scheduled UE 115-b transmission (e.g., base station 105-a may determine that a subset of spatial directions to transmitted over by UE 115-b may interfere with UE 115-a URLLC during at least a portion of the plurality of time and frequency resources scheduled for the UE 115-*b*). In such cases, ULPI may indicate the one or more spatial directions in which transmissions made by the UE are preempted (e.g., based on the subset of potentially interfering spatial directions determined by the base station) during the portion of the plurality of time and frequency resources. In some cases, the UE 115-*b* may thus still transmit the uplink message in spatial directions different than the one or more spatial directions identified by the ULPI (which may result in more efficient resource utilization, as only the potentially interfering spatial directions may be preempted). That is, instead of requesting the UE 115-*b* (e.g., an eMBB user) to terminate its transmission, ULPI may indicate that transmission on a subset of beams should be terminated.

In some examples, positioning reference signals (PRSs) may be similar to sounding reference signals (SRS), which may be transmitted in wideband and may span over multiple symbols (e.g., 6 symbols of a slot). In different scenarios, it may or may not be efficient for PRS to be terminated if ULPI is received by a UE. That is, in general, some reference signals (RSs) (such as PRSs) may be configured to be received by multiple base stations 105 throughout the network (such that tradeoffs between cancelation indications for high priority traffic and network positioning needs may be considered).

PUCCH, SRS, PRS, other RSs, etc. may in some cases be used by multiple base stations or TRPs (such that preempting such communications may be costly from the network perspective). However, as such communications may span a relatively large number of resource blocks (RBs) and span over multiple symbols, such communications may impact URLLC in some scenarios. In such cases, wireless communications systems (e.g., wireless communications system 200) may employ preemption applicability rules (e.g., rules for application of ULPIs) to balance such tradeoffs. For example, in some cases, a rule may be defined such that if a UE 115 receives a ULPI, and the indication refers to the resources used for transmission of a particular RS (e.g., a PRS transmission), the particular RS (e.g., the PRS) is preempted. Alternatively, a rule may be defined such that if a UE 115 receives a ULPI, and the indication refers to the resources used for transmission of a particular RS (e.g., a PRS transmission), the ULPI does not apply to the particular RS (e.g., the PRS). In some cases, different rules for different RSs may be configured by a network based on a priority of the particular RS and a priority of a traffic type prompting consideration of resource reallocation (e.g., a network may define such rules based on tradeoff decisions and configurations established by the network).

In some cases, the rules for whether ULPI received by a UE applies to the receiving UE may be configurable. For example, in some cases a base station 105 may configure rules for application of ULPIs in radio resource control (RRC) signaling, in the ULPI itself (e.g., the ULPI may be associated with a priority that the UE 115 may use to determine whether or not the ULPI applies based on a priority of the communications to the preempted by the UE), etc. In some examples, if PRS is defined as a usage of SRS, then ULPI may be applied to the SRS resources with usage set to Positioning, or alternatively not applied to SRS resources with usage set to Positioning. That is, when SRS is configured for a positioning application (e.g., usage ENUMERATED {beamManagement, codebook, nonCodebook, antennaSwitching, Positioning}), the ULPI may or may not apply based on rules employed by the wireless communications system 200. In some cases, ULPI similarly may or may not apply to RSs for other usages or applications based on rules employed by the wireless communications system 200.

Further, rules for whether DLPI received by a UE applies to the receiving UE may also be configurable. For example, rules may be configured regarding whether DLPI should be applied to multimedia broadcast multicast services (MBMS), single cell point-to-multipoint (SC-PTM), etc. For example, DLPI may be applied (rules may indicate whether or not to apply DLPI) based on the priority of different services. For example, a priority list may be defined (e.g., at the PHY layer). When a UE 115 receives DLPI, the UE 115 may check the priority of the DLPI and compare it with the priority of communications indicated as preempted by the DLPI (according to the priority of channels list) and decide whether or not the DLPI is to be applied.

In some examples, ULPIs may be configured or conveyed in a group-common physical downlink control channel (GC-PDCCH) or otherwise conveyed in group-common DCI (GC-DCI), or DCI format 2_1, which may support signaling ULPIs that are relevant to sets of one or more UEs 115, and may reduce signaling overhead as compared to ULPIs that are conveyed in UE-specific signaling. In some examples, ULPIs, or GC-PDCCH or GC-DCI indications, may be configured for UEs 115 configured for particular communications, such as eMBB communications (e.g., configured for eMBB UEs).

In some examples, uplink cancellation may include various configurations by way of RRC configuration or other connection establishment between the base station 105-*a* and UEs 115. For example, such configurations may be signaled to UEs 115 (e.g., by the base station 105-*a*) in an information element (IE) or other configuration for uplink cancellation (e.g., an UplinkCancellation or UplinkPreemption IE, an int-RNTI configuration, etc.).

ULPIs may also be configured to be associated with particular communication resources in the time domain, which may be configured by RRC configuration (e.g., by the base station 105-*a*) or other configuration. For example, resources in the time domain for which cancellation is applied (e.g., corresponding to a ULPI) may be indicated in symbol-level intervals (e.g., symbol durations, OFDM symbol durations, etc.), such as sets of 7-symbol durations or sets of 14-symbol durations, or may be indicated in sub-slots, such as 7 sub-slots each having a length of two symbol durations or four symbol durations. Such divisions or partitioning may be referred to as a granularity of resources in the time domain for cancellation, and, in some examples, such a granularity of resources in the time domain may be common between uplink cancellation or preemption and downlink cancellation or preemption.

Figure 3:
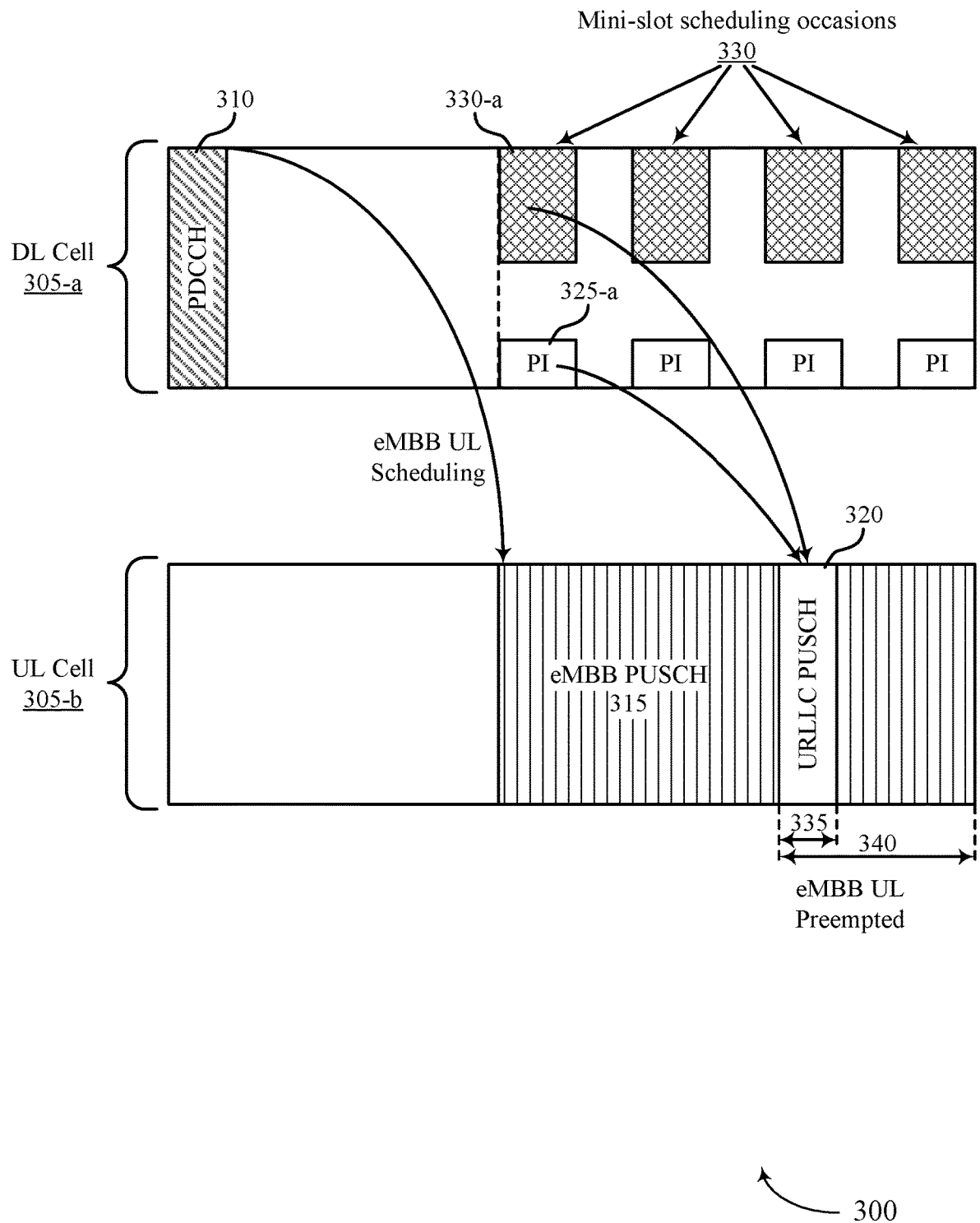
FIG. 3 illustrates an example of a diagram that supports communication preemption applicability techniques in accordance with aspects of the present disclosure.

FIG. 3 illustrates an example of a diagram 300 that supports communication preemption applicability techniques in accordance with aspects of the present disclosure. In some examples, diagram 300 may illustrate aspects of techniques supported by wireless communications system 100 and/or wireless communications system 200. Generally, diagram 300 may illustrate eMBB uplink scheduling and ULPIs. For example, diagram 300 may illustrate base station 105 scheduling of a UE 115 for eMBB uplink communications, as well as base station 105 configuration (e.g., implementation) of ULPIs and UE 115 handling of such ULPIs.

Aspects of the techniques discussed herein are described with reference to illustrated downlink (DL) cell 305-*a* (which may be an example of a downlink FDD cell) and uplink (UL) cell 305-*b* (e.g., which may be an example of an uplink FDD cell). For example, a base station 105 may transmit PDCCH 310 to schedule eMBB PUSCH 315 (e.g., to schedule a UE 115 with time and frequency resources for eMBB uplink). In some cases, uplink of both eMBB (e.g., low priority traffic) and URLLC (e.g., high priority traffic) may be grant-based (e.g., scheduled by DCI). Considering that the URLLC may require a faster timeline (e.g., faster N2 for UL scheduling) than eMBB, it may happen that some resources that are initially allocated to eMBB uplink may be reclaimed for URLLC. To reduce the interference imposed by the eMBB user on the URLLC user, the eMBB user may be asked to preempt its uplink transmission (e.g., via an ULPI monitored by the eMBB users).

For example, UEs 115 (e.g., eMBB users) may be configured to monitor mini-slot scheduling occasions 330, where a base station 105 may (e.g., when the base station determines to reallocate resources, preempt certain UEs from some resources, etc.) transmit PIs 325 (e.g., ULPIs, DLPIs, etc.). In the example of FIG. 2, a base station 105 may transmit PDCCH 310 to schedule eMBB PUSCH 315. Later, the base station 105 may identify traffic of another UE is of a first priority that is higher than a second priority of the uplink message (e.g., the base station may identify that another URLLC UE is to communicate traffic of higher priority than the previously scheduled UE). The base station 105 may then identify resources in the time domain, frequency domain, and/or spatial domain (e.g., one or more spatial directions and at least a portion of scheduled time and frequency resources) in which transmissions made by the UE are preempted (e.g., based on the identification that the traffic of the another UE is of the first priority that is higher than the second priority of the uplink message to be transmitted over the originally scheduled resources). In such cases, a base station may transmit a PI 325-a (e.g., an ULPI), in a monitoring occasion 330-a, that may preempt transmission of the scheduled uplink message (e.g., ULPI may preempt the scheduled uplink message over one or more spatial directions, over a portion of the scheduled plurality of time and frequency resources, etc.).

As such, the another UE may transmit URLLC PUSCH 320 over the preempted resources. In some cases, the originally scheduled UE may preempt transmissions over a duration 335 associated with the URLLC PUSCH 320, over a duration 340 associated with the beginning of the URLLC PUSCH 320 through the end of the PUSCH transmission, etc. (e.g., depending on how the ULPI is configured, the resources indicated by the ULPI, etc.).

In general, a UE may receive PDCCH 310 that schedules an uplink transmission, which may be PUSCH 315 (e.g., low priority PUSCH, such as eMBB). The UE may further be configured to monitor mini-slot scheduling occasions 330, and after being scheduled for PUSCH 315 (e.g., via PDCCH 310) may monitor the mini-slot scheduling occasions 330. Through PIs 325, a base station may indicate when to preempt communications in cases where the base station wants to reclaim resources (e.g., preempt the UE from used previously scheduled resources) such that the base station can reallocate the reclaimed resources (e.g., to schedule URLLC). For example, a base station may transmit an ULPI (e.g., PI 325-a) during a monitoring occasion 330-a, and the ULPI may preempt resources (e.g., the time domain, frequency domain, and/or spatial domain) previously scheduled for PUSCH 315 (e.g., such that the preempted resources may be used for URLLC PUSCH 320 by another UE.

Figure 4:
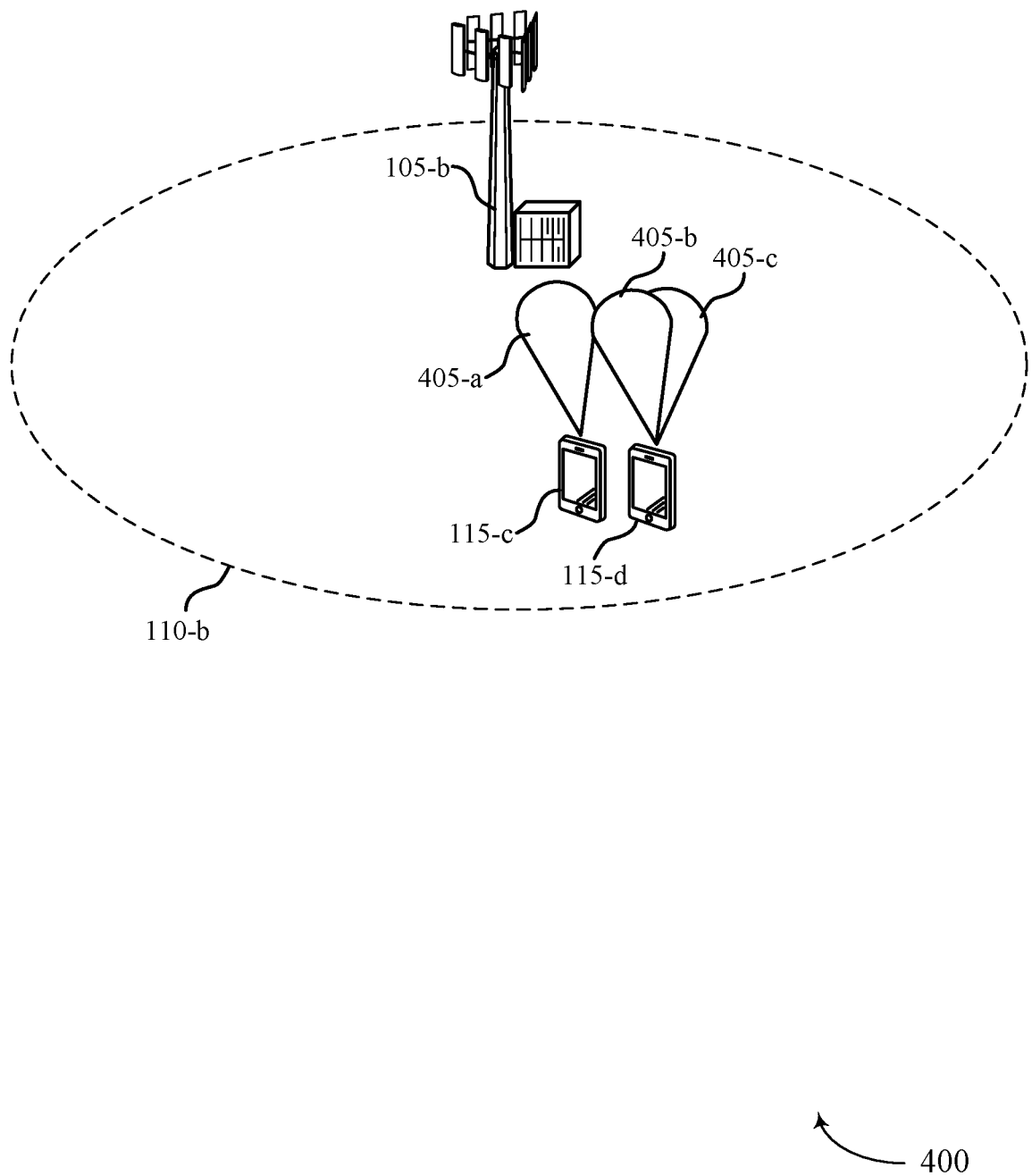
FIG. 4 illustrates an example of a wireless communications system that supports communication preemption applicability techniques in accordance with aspects of the present disclosure.

FIG. 4 illustrates an example of a wireless communications system 400 that supports communication preemption applicability techniques in accordance with aspects of the present disclosure. In some examples, wireless communications system 400 may implement aspects of wireless communications system 100 and/or wireless communications system 200. Wireless communications system 400 may include base station 105-b, UE 115-c, and UE 115-d, which may be examples of the corresponding devices described with reference to FIGS. 1 and 2. In the example of FIG. 4, base station 105-b may support communications with multiple UEs (e.g., UE 115-c and UE 115-d) within a supported geographic coverage area 110-b. In some examples, the wireless communications system 400 may support mission critical applications that include stringent communication performance (e.g., reliability thresholds, latency thresholds) along with communications of other types.

As discussed herein, some UEs 115 may transmit over multiple beams (e.g., a UE 115 may transmit an uplink message in one or more spatial directions). In some cases, only a subset of the spatial directions may be imposing interference on another UE. For example, such a scenario may arise where UE 115-c (e.g., a URLLC UE) is to communicate URLLC traffic over a beam 405-a, which may be in the same direction as (or at least partially aligned with) a beam 405-b to be used by UE 115-d (e.g., an eMBB UE). For example, UE 115-d may be scheduled to transmit an uplink message in multiple spatial directions (e.g., via beam 405-b and beam 405-c) using a plurality of time and frequency resources. Base station 105-b may determine that UE 115-c is to employ URLLC (or other high priority communications) using time and frequency resources that overlap (or that may interfere with) at least a portion of the plurality of time and frequency resources previously scheduled for UE 115-d. The base station 105-b may further identify that a beam 405-a to be used by UE 115-c may interfere with only a subset of the spatial directions (e.g., with only beam 405-b) associated with scheduled UE 115-b transmission (e.g., base station 105-b may determine that beam 405-c may not interfere with beam 405-a during the identified portion of the scheduled time and frequency resources for UE 115-d that overlap with UE 115-c URLLC traffic).

In such cases, ULPI may indicate the one or more spatial directions in which transmissions made by the UE are preempted (e.g., based on the subset of potentially interfering spatial directions determined by the base station) during at least the portion of the scheduled time and frequency resources. In some cases, the UE 115-d may thus still transmit the uplink message in spatial directions different than the one or more spatial directions identified by the ULPI (e.g., UE 115-d may suppress transmission of the uplink message in the spatial direction represented by beam 405-a and may still transmit the uplink message in the other spatial direction represented by beam 405-b). This may result in more efficient resource utilization, as only the potentially interfering spatial directions (e.g., beam 405-b) may be preempted and resources that otherwise would be unnecessarily preempted may still be utilized. That is, instead of requesting the UE 115-d (e.g., an eMBB user) to terminate its scheduled transmission entirely, ULPI may indicate that transmission on a subset of beams should be terminated.

As such, ULPI and DLPI commands may be designed to allow for indication of spatial dimension (e.g., beam/spatial direction/TRP) preemption. ULPIs may thus indicate which beam transmissions or spatial directions to which TRPs should be preempted. Generally, spatial directions may refer to beamforming configurations, precoders, transmission panels, etc., and ULPIs may indicate which spatial directions are canceled or preempted based on which spatial directions the base station or UE has URLLC configured for. For example, a UE (e.g., UE 115-*d*) may have two panels and transmit to two TRPs (the TRPs may be separately located and controlled by base station 105-*b*). If transmissions associated with one panel are aligned with URLLC, base station 105-*b* may preempt the UE from transmissions over the one panel (e.g., via ULPI indicating preemption of beam 405-*b* or preemption of the panel corresponding to beam 405-*b*). Additionally or alternatively, base station 105-*b* may send DLPI to a UE to indicate PDSCH is preempted.

In some wireless communications systems, for codebook-based PUSCH transmission, transmitted precoding matrix index (TMPI), # layers, and SRS resource indicator (SRI) may be used to give uplink transmission parameters (e.g., spatial direction parameters). The SRI may be used to indicate which panel should be used by a UE. In some wireless communications systems for non-codebook based PUSCH transmission, SRI may be used to indicate to the UE which precoders (beams) should be used for transmission. In general, information conveyed by such may be used for preemption. For example, base station 105-*b* may know certain spatial direction parameters or beams used by UEs 115-*c* and 115-*d* from SRSs (e.g., the precoders used for which SRS resources, which UEs are picking what, etc.).

To preempt a subset of beams or panels or stopping the UE from using some of the precoders (e.g., associated with SRS resources), ULPI may be used. In some cases, ULPI may refer a bit sequence in DCI. According to the techniques described herein, the ULPI bit sequence or a part of the ULPI bit sequence may be used for spatial domain preemption. For example, some subset of bits may be used to indicate preemption of time and frequency resources while the remaining bits may be used to indicate the panel, beam, precoder, etc., to be preempted (e.g., during the indicated time and frequency resources). In some examples, for this additional sub-sequence, a relationship between the bit sequence to SRI (e.g., a relationship between the bits indicating spatial dimension preemption and SRI included in the DCI) or relationship between the sub-sequence directly to the beams/panels/precoders/SRS resources being preempted may be defined (and indicated by RRC).

For example, ULPI may include a 12 bit sequence in DCI. Where a first subset of the bit sequence (e.g., 10 bits) may be used to indicate preemption of time and frequency resources, and a second subset of the bit sequence (e.g., the remaining 2 bits) may point to an SRI point. From SRI, a UE receiving the ULPI may know which beams to use and which beams are preempted for the indicated time and frequency resources (e.g., which panel, precoder, etc., should be preempted based on what panel, precoder, etc., correspond to the SRI point indicated by the ULPI). In examples where the relationship between the sub-sequence directly to the beams/panels/precoders/SRS resources being preempted is defined, the second subset of the bit sequence may indicate one or more beam index/panel index/precoder index/SRS resource index. In the example where the second subset for spatial domain preemption includes 2 bits, bit values of '00,' '01,' '10,' and '11' may be used to indicate one of four different indices corresponding to a set of beam indices, precoder indices, etc., where the relationship defining the set of beam indices, precoder indices, etc. may be indicated via RRC signaling. In some examples, the first subset of the bit sequence may include or indicate a bitmap of the ULPI associated with a set of communication resources in the time domain and frequency domain (and a receiving UE may determine whether at least a portion of uplink resources allocated to the receiving UE corresponds to one or more of the subsets of the communication resources for which cancellation applies, as indicated by the bitmap).

Using the described techniques, various other implementations may be considered and would be readily realized by analogy, without departing from the scope of the present disclosure. For example, aspects of ULPI formatting and configuration may generally apply to cancelation indications (e.g., DLPIs), cancelation indications may include different lengths of bit sequences (e.g., to convey more granular or less granular preemption information), cancelation bit sequences may be proportioned into first and second subsets differently (e.g., to convey spatial domain preemption information for smaller or larger sets of beam/panel/precoder/SRS resource indices), etc.

Figure 5:
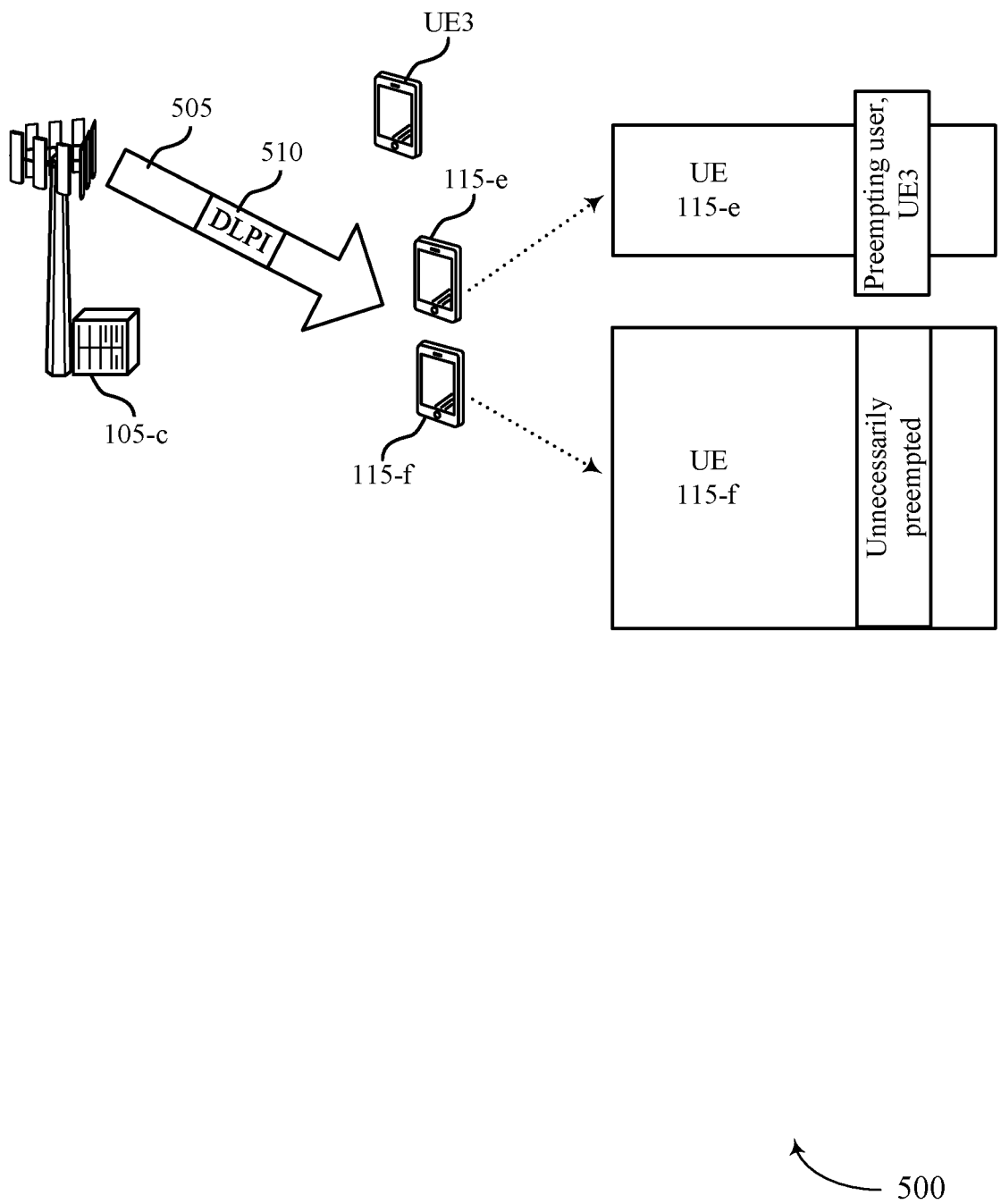
FIG. 5 illustrates an example of a wireless communications system that supports communication preemption applicability techniques in accordance with aspects of the present disclosure.

FIG. 5 illustrates an example of a wireless communications system 500 that supports communication preemption applicability techniques in accordance with aspects of the present disclosure. In some examples, wireless communications system 500 may implement aspects of wireless communications system 100 and/or wireless communications system 200. Wireless communications system 500 may include base station 105-*c*, UE 115-*e*, and UE 115-*f*, which may be examples of the corresponding devices described with reference to FIGS. 1 and 2. In the example of FIG. 5, base station 105-*c* may support communications with multiple UEs (e.g., UE 115-*e* and UE 115-*f*). In some examples, the wireless communications system 500 may support mission critical applications that include stringent communication performance (e.g., reliability thresholds, latency thresholds) along with communications of other types.

Generally, wireless communications system 500 may illustrate DLPIs in accordance with aspects of the techniques discussed herein. For example, wireless communications system 500 may illustrate base station 105 scheduling a UE 115 for downlink and/or uplink communications, as well as base station 105 configuration (e.g., implementation) of DLPIs and UE 115 handling of such DLPIs. As discussed herein, the applicability of cancellation indications may be based on various factors. There may be established (e.g., network specified) or configurable (e.g., base station RRC configurable or cancelation indication specific) rules (which may be referred to as a cancelation rule, a preemption applicability rule, etc.) for application of a cancelation indication. For example, the applicability of ULPI may be based on factors such as the content or RS type of a UE uplink transmission, the priority of scheduled traffic compared to the priority of the ULPI, etc. For example, in cases where a URLLC UE is included in a group of UEs, and the base station transmits ULPI to the group of UEs in an effort to preempt transmission by other UEs in the group, the URLLC UE may determine to not apply the ULPI (e.g., based on identification that the priority associated with the ULPI does not exceed the priority of its URLLC traffic), whereas other UEs in the group (e.g., eMBB UEs) may apply the ULPI (e.g., as the other UEs may identify that the priority associated with the ULPI exceeds the priority of their eMBB traffic).

Further, the applicability of DLPI (e.g., DLPI 510) may also be based on various factors. As discussed herein, base station 105-*c* may transmit DLPI 510 to one or more UEs (e.g., UE 115-*e* and UE 115-*f*) via downlink communications 505. Since the granularity of the DLPI 510 may be coarse, it may not always possible for the base station 105-*c* to indicate that only the low priority resources are to be preempted (e.g., URLLC traffic may only use a portion of a smallest unit of resources that may be indicated for preemption, or a portion of some multiple of the smallest unit of resources that may be indicated for preemption). For example, a base station 105-*c* may transmit DLPI 510 to preempt some resources for some UE (e.g., a UE3). However, in some cases, the resources to be used by UE3 may only include some subset of resources that can be indicated (e.g., based on granularity limitations) by DLPI. Further, in some cases, UE 115-*f* may receive URLLC or high priority broadcast information, but its allocation may be preempted unnecessarily (e.g., in some cases, UE 115-*f* may have been scheduled to receive URLLC or high priority broadcast information using resources that may be unnecessarily preempted due to DLPI granularity constraints). In other examples, UE 115-*f* may have traffic with a same priority or higher priority than UE3 (e.g., where it may not be desirable for the UE 115-*f* to apply the DLPI). As such, according to rules for application of DLPI described herein, such scenarios (and other scenarios where it may be undesirable or inefficient for a UE to apply DLPI) may be avoided or reduced.

In some cases, UE 115-*e* and UE 115-*f* may be in a same group or a different group. For example, DCI format of DLPI (e.g., or ULPI) may include 14 bits (or some multiple of 14 bits). In such examples, each 14 bits may be used for a single UE or multiple UEs (e.g., as multiples UEs may have the same index). In such an example, UE 115-*e* and UE 115-*f* may have the same index and read the same 14 bits. As such, if base station 105-*c* transmits a DLPI 510 to preempt UE 115-*e* from utilizing some resources to reallocate the resources for UE3, such preemption may be ready by and apply to both UE 115-*e* and UE 115-*f*. In some cases, such may undesirably preempt UE 115-*f* from using downlink resources (such as in the example where UE 115-*f* may have traffic with a same priority or higher priority than UE3, such that it may not be desirable for the UE 115-*f* to apply the DLPI).

Downlink communications 505 (e.g., PDCCH) may carry DLPI 510. In some cases, DLPI 510 may be given by PDCCH whose cyclic redundancy check (CRC) is scrambled with an interruption radio network temporary identifier (INT-RNTI), and the DLPI 510 may be monitored (e.g., by UE 115-*e* and UE 115-*f*) in a set of configured slots.

For example, DCI format 2_1 may be used for notifying the one or more physical resource blocks (PRBs) and one or more orthogonal frequency division multiplexing (OFDM) symbols where a UE may assume no transmission is intended for the UE. In some examples, DCI format 2_1 may convey cancelation indications (e.g., preemption indicators). For example, base station 105-*c* may transmit DCI format 2_1 with CRC scrambled by INT-RNTI to convey some {Pre-emption indication 1, Pre-emption indication 2, . . . , Pre-emption indication N}. The size of the DCI format 2_1 may be configurable by higher layers up to, for example, 126 bits (each preemption indicator may include 14 bits).

If a UE is provided with a DLPI 510, the UE may be configured with an INT-RNTI provided by int-RNTI for monitoring PDCCH conveying DCI format 2_1. For example, the UE may additionally be configured with a set of serving cells by INT-ConfigurationPerServingCell that includes a set of serving cell indices provided by corresponding servingCellID and a corresponding set of locations for fields in DCI format 2_1 by positionInDCI. In some cases, the UE may additionally be configured with an information payload size for DCI format 2_1 by dci-PayloadSize (e.g., an indication granularity for time-frequency resources by timeFrequencySet).

ULPIs and DLPIs may also be configured to be associated with particular communication resources in the time domain, which may be configured by RRC configuration (e.g., by the base station 105-*c*) or other configuration. For example, resources in the time domain for which cancellation is applied (e.g., corresponding to a ULPI) may be indicated in symbol-level intervals (e.g., symbol durations, OFDM symbol durations, etc.), such as sets of 7-symbol durations or sets of 14-symbol durations, or may be indicated in sub-slots, such as 7 sub-slots each having a length of two symbol durations or four symbol durations. Such divisions or partitioning may be referred to as a granularity of resources in the time domain for cancellation, and, in some examples, such a granularity of resources in the time domain may be common between uplink cancellation or preemption and downlink cancellation or preemption.

If a UE detects a DCI format 2_1 in a PDCCH transmitted in a control resource set (CORESET) in a slot, the set of symbols may be the last $N_{symb}^{slot} * T_{INT} * 2^{\mu - \mu_{INT}}$ symbols prior to the first symbol of the CORESET in the slot, where $T_{INT}$ is the PDCCH monitoring periodicity provided by the value of monitoringSlotPeriodicityAndOffset, $N_{symb}^{slot}$ is the number of symbols per slot, µ is the subcarrier spacing (SCS) configuration for a serving cell with mapping to a respective field in the DCI format 2_1, $\mu_{INT}$ is the SCS configuration of the downlink (DL) bandwidth part (BWP) where the UE receives the PDCCH with the DCI format 2_1. If the UE is provided TDD-UL-DL-ConfigurationCommon, symbols indicated as uplink by TDD-ULDL-Configuration-Common may be excluded from the last $N_{symb}^{slot} * T_{INT} * 2^{\mu - \mu^{INT}}$ symbols prior to the first symbol of the CORESET in the slot. The resulting set of symbols includes a number of symbols that is denoted as $N_{INT}$.

If the value of timeFrequencySet is 0, 14 bits of a field in DCI format 2_1 may have a one-to-one manning with 14 groups of consecutive symbols from the set of symbols where each of the first $$N_{INT} - \left[\frac{N_{INT}}{14}\right] * 14$$

symbol groups includes $$\left[\frac{N_{INT}}{14}\right]$$

symbols, each of the last $$14 - N_{INT} + \left[\frac{N_{INT}}{14}\right] * 14$$

symbol groups includes $$\left[\frac{N_{INT}}{14}\right]$$

symbol, a bit value of 0 may indicate transmission to the UE in the corresponding symbol group and a bit value of 1 may indicate no transmission to the UE in the corresponding symbol group.

If the value of timeFrequencySet is 1, 7 pairs of bits of a field in the DCI format 2_1 have a one-to-one manning with 7 groups of consecutive symbols where each of the first $$N_{INT} - \left[\frac{N_{INT}}{7}\right] * 7$$

symbol groups includes $$\left[\frac{N_{INT}}{7}\right]$$

symbols, each of the last $$7 - N_{INT} + \left[\frac{N_{INT}}{7}\right] * 7$$

symbol groups includes $$\left[\frac{N_{INT}}{7}\right]$$

symbols, a first bit in a pair of bits for a symbol group is applicable to the subset of first $$\left[\frac{B_{INT}}{2}\right]$$

physical resource mocks (PRBs) from the set of $B_{INT}$ PRBs, a second bit in the pair of bits for the symbol group is applicable to the subset of last $$\left[\frac{B_{INT}}{2}\right]$$

PRBs from me set or $B_{INT}$ PRBs, a bit value of 0 may indicate transmission to the UE in the corresponding symbol group and subset of PRBs, and a bit value of 1 may indicate no transmission to the UE in the corresponding symbol group and subset of PRBs.

In some examples, if SFN (e.g., a SFN structure) is used to broadcast information (e.g., similar to LTE MBMS), the subframes or slots indicated for receiving MBMS may not be used for any other transmission for any other UE. For example, in such cases, the bandwidth of the slot duration or subframe duration may be allocated to MBMS (e.g., there may be nothing to preempt, as no traffic, URLLC included, may be scheduled there). If single-cell architecture (e.g., similar to LTE SC-PTM) is used for transmitting broadcast information, a PDCCH scrambled by group-common RNTI (GC-RNTI) may be used to indicate the PDSCH resources carrying broadcast information for a group of users. In the same slot, the base station may transmit downlink to the same users or other users. In some cases, some users might have URLLC that may preempt SC-PTM, some users may have SC-PTM that may preempt eMBB (e.g., SC-PTM traffic may have higher priority than eMBB traffic from the network perspective), etc.

The techniques described herein (e.g., rules for DLPI application) may be implemented such that DLPI, because of its coarse granularity, may not impact a channel that has high priority (e.g., where a base station or network may not actually intend to preempt it). As discussed herein, for DLPI, a base station and UE may consider a gap between two PDCCH monitoring occasions, take all the symbols in the gap and remove the symbols for uplink, and group the remaining symbols. For SFN architecture, the DLPI may not need to be applied to slots used for MBMS. Similar to the resource grouping described above (e.g., where the uplink symbols may be taken out from the list of symbols), the symbols used/configured for MBMS may be taken out from the list of symbols in-between two DLPI occasions. A cancelation bit sequence may then be applied to the remaining ones (e.g., to the grouped remaining symbols without the removed symbols). For example, signaling may indicate which symbols DLPI doesn't apply to, and DLPI may be applied to the remaining symbols.

DLPI for a group that includes uplink MBMS uplink or MBMS may ignore the uplink or MBMS symbols. For example, for 28 symbols, 2 may be for uplink, and the remaining 26 symbols may be grouped (and the DLPI may be applied to the remaining 26 symbols). For example, base station 105-c may configure some number of slots for MBMS, UEs 115-e and 115-f may identify uplink (e.g., or MBMS) symbols/resources, and may increase the DLPI granularity by forming smaller groups of the total configured slots by removing the MBMS (e.g., or uplink) configured slots. In some cases, symbols indicated semi-statically as uplink may be taken out (such symbols may be removed from formed groups). The same may apply to MBMS symbols (as the base station may not preempt them anyway). Alternatively, the symbols may not be excluded from the list of DL symbols, but, the sequence may not apply to them (MBMS symbols or slots may not necessarily be removed, but DLPI may not apply to such symbols or slots).

If broadcast is similar to SC-PTM, then it may be decided whether DLPI is applicable to it or not (based on preemption application rules) to certain communications. The same may hold for URLLC. If one UE has URLLC data, and receives DLPI, rules may determine whether high priority URLLC resources are preempted. Since the granularity of the DLPI is coarse, it may not always possible for the base station to indicate only the low priority resources. As such, described techniques may be implemented to sort the priority of the channels and apply cancelation indications according to rules described herein. In the example wireless communications system 500, UE 115-f may be scheduled to receive URLLC or high priority broadcast information and may receive a DLPI 510 (and may identify a rule for application of the DLPI 510). Different channels may have different priorities which may be known to the UE (e.g., at the PHY layer via the scheduling DCI format/size, via DCI RNTI, via search space/CORESET used for DCI monitoring, a bit field in the DCI, etc.). Once the priorities are known, DLPI may or may not be applied to some channels according to the rules and/or priorities.

In general the DLPI may indicate a priority. Then, all channels of the same and lower priorities may be preempted if the channels use resources indicated by the DLPI. For example, UEs and base stations may identify a channel priority list (a priority ranking of various channels or traffic types) which may be established by the network, indicated by a base station, etc. UEs and base stations may then mutually understand preemption rules (e.g., whether ULPI/DLPI will apply to uplink or downlink scheduled for a UE), and may identify a priority of uplink/downlink communications scheduled for the UE and a priority of the ULPI/DLPI. For example, application of ULPI/DLPI may be based on the channel priority list and a comparison of the priority of the scheduled communications (e.g., that correspond to resources indicated by the ULPI/DLPI) and the priority of the ULPI/DLPI.

In some cases, such may entail a threshold channel priority of traffic type priority, such that all channel types or traffic types above the threshold priority ignore or disregard any ULPIs/DLPIs and all channel types or traffic types below the threshold priority adhere to or apply any ULPIs/DLPIs. In other examples, ULPIs/DLPIs may be associated with a priority (e.g., in some cases, ULPI/DLPI bit sequences may include an indication of or an index to a priority or a location on a channel/traffic priority list, such that all channel types or traffic types above the indication/index ignore or disregard the ULPI/DLPI and all channel types or traffic types below the indication/index adhere to or apply any ULPI/DLPI). In yet other examples, a base station or network may dynamically configure priority of ULPIs/DLPIs (e.g., via RRC signaling).

In general, the DLPI may indicate a priority. Then, all channels of the same and lower priorities, or only channels of lower priorities, may be preempted if they are using resources indicated by the DLPI. To indicate the priority of DLPI, there may be a bit sequence that indicates priority which is added to the DLPI/ULPI bit sequence, different RNTIs, different DCI sizes, different CORESETs, different search spaces, and/or different DLPI monitoring occasions may indicate different DLPI/ULPI priority, different indices may be indicated to the UEs to indicate PI for different priorities (e.g., within the DLPI payload, there may be one 14-bit sequence for priority 1 and another bit sequence for priority 2), etc. Alternatively, a UE may be configured to not apply DLPI for some channel priorities (e.g., regardless of the DLPI/ULPI priority, or in scenarios where DLPIs/ULPIs are not associated with different/various priorities, etc.). For example, if the UE receives a downlink assignment that indicates a high priority PDSCH, then DLPI is not applied to the resource used by the high priority PDSCH.

Further, UEs 115 in idle mode may receive broadcast communication. For example, via a system information block (SIB), a UE may know which slots to monitor to receive broadcast communication (e.g., a SIB may tell a UE where to monitor for PDCCH that schedules PDSCH that carries broadcast). In the idle mode, the UE may not be configured with a DLPI PDCCH monitoring configuration. However, a base station may want to schedule a high priority service over the resources given for broadcast. The UEs in the idle mode may receive the DLPI monitoring occasions via SIB and try to decode it with a given RNTI (e.g., which, in some cases, may allow a base station to reclaim and reallocate the resources given for broadcast).

Figure 6:
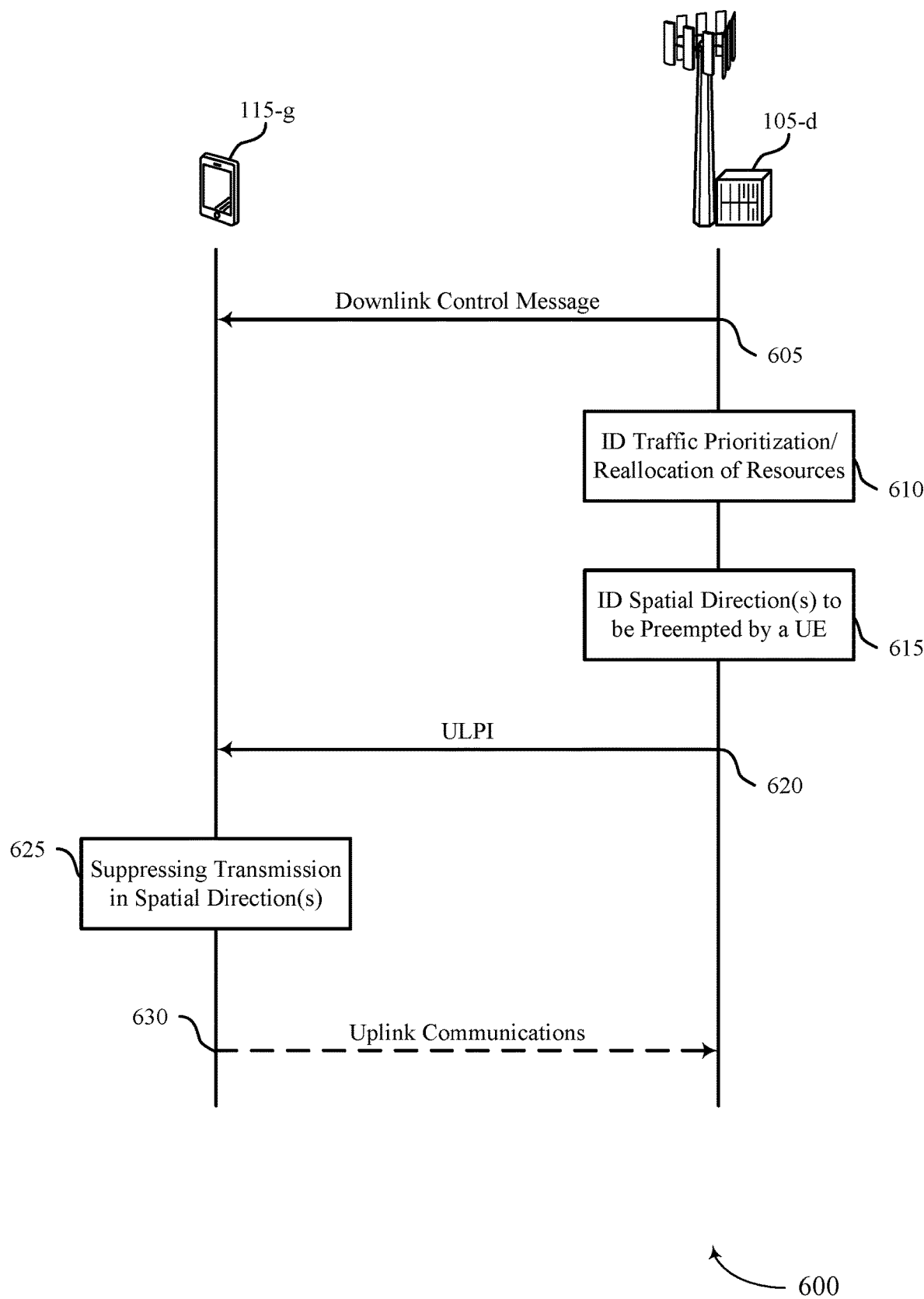
FIG. 6 illustrates an example of a process flow that supports communication preemption applicability techniques in accordance with aspects of the present disclosure.

FIG. 6 illustrates an example of a process flow 600 that supports communication preemption applicability techniques in accordance with aspects of the present disclosure. In some examples, process flow 600 may implement aspects of wireless communications system 100, wireless communications system 200, wireless communications system 400, and/or wireless communications system 500. Further, process flow 600 may be implemented by a UE 115-*g* and a base station 105-*d*, which may be examples of a UE 115 and a base station 105 described with reference to FIGS. 1-5. In the following description of the process flow 600, the operations between UE 115-*g* and base station 105-*d* may be transmitted in a different order than the order shown, or the operations performed by base station 105-*d* and UE 115-*g* may be performed in different orders or at different times. Certain operations may also be left out of the process flow 600, or other operations may be added to the process flow 600. It is to be understood that while base station 105-*d* and UE 115-*g* are shown performing a number of the operations of process flow 600, any wireless device may perform the operations shown.

At 605, the base station 105-*d* may transmit a downlink control message including an allocation of uplink resources for an uplink message (e.g., a downlink control message that schedules transmission, by the UE-g, of an uplink message using a plurality of time and frequency resources), which may be received by the UE 115-*g*. For example, the downlink control message may refer to a PDCCH transmission that schedules, for example, eMBB PUSCH for the UE 115-*g*.

At 610, base station 105-*d* may identify that traffic of another UE is of a first priority that is higher than a second priority uplink message, and that resources for the traffic of the another UE overlaps (or may interfere with) at least a portion of the plurality of time and frequency resources scheduled at 605. For example, base station 105-*d* may identify that another URLLC UE has traffic to communicate using resources (e.g., time resources, frequency resources, and/or spatial resources) overlapping with at least a portion of resources allocated to the UE 115-*g* at 605. In some cases, such may be referred to as the base station 105-*d* determining a reallocation of resources scheduled at 605 (e.g., based on identification/scheduling of another URLLC UE being configured or scheduled for a particular type or category of communications, such as URLLC communications).

At 615, base station 105-*d* may identify one or more spatial directions in which transmissions made by the UE 115-*g* are preempted based at least in part on the identification at 610.

At 620, the base station 105-*d* may signal a ULPI, which may be received by the UE 115-*g*. In various examples, the ULPI may be UE-specific, or common to a set of one or more UEs 115. For example, the ULPI may be signaled using a GC-PDCCH transmission or other DCI or GC-DCI. The ULPI is indicative of one or more spatial directions in which transmissions made by the UE 115-*g* are preempted during at least the portion of the plurality of time and frequency resources identified at 610. In some cases, the ULPI may refer to a bit sequence in DCI (e.g., where a first subset of the bit sequence indicates the portion of the plurality of time and frequency resources to be preempted by the UE 115-*g* and a second subset of the bit sequence indicates the one or more spatial directions to be suppressed by the UE 115-*g* over the portion of the plurality of time and frequency resources).

At 625, UE 115-*g* may suppress transmission of the uplink message in the one or more spatial directions during at least the portion of the plurality of time and frequency resources based at least in part on the ULPI. In some cases, UE 115-*g* may identify that the ULPI includes one or more bits that correspond to a SRI, and the UE 115-*g* may determine the one or more spatial directions to be suppressed based at least in part on the one or more SRI bits. In some cases, determining the one or more spatial directions to suppress comprises determining one or more panels to preempt, one or more precoders to preempt, one or more beams to preempt, or any other beamforming or spatial/directional transmission parameters to be preempted.

At 630, in some cases (e.g., if not all of the spatial directions are preempted), UE 115-*f* may transmit the uplink message in spatial directions different than the one or more spatial directions identified by the ULPI during at least the portion of the plurality of time and frequency resources that overlap with the resources being reclaimed and reallocated by the base station 105-d.

Figure 7:
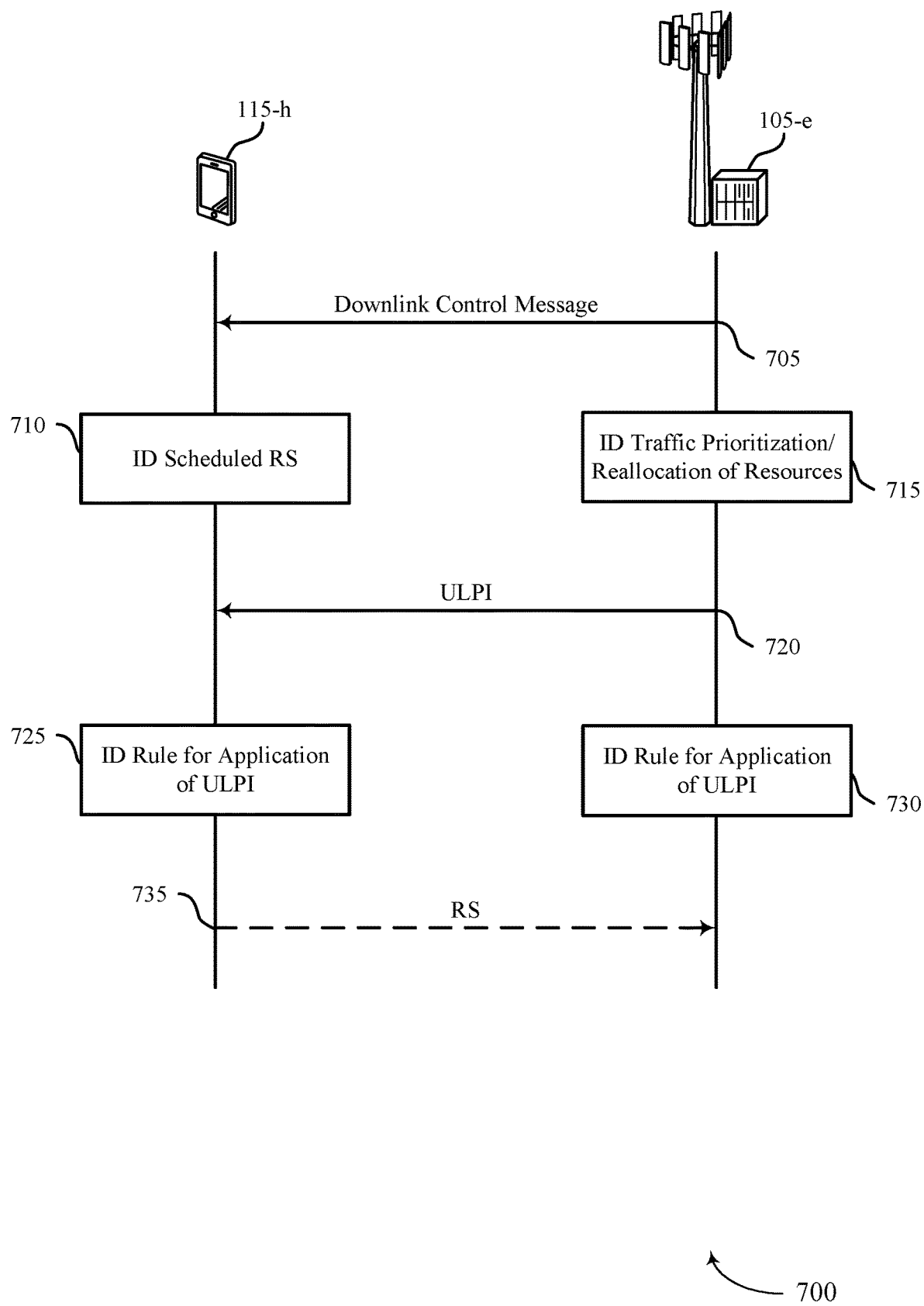
FIG. 7 illustrates an example of a process flow that supports communication preemption applicability techniques in accordance with aspects of the present disclosure.

FIG. 7 illustrates an example of a process flow 700 that supports communication preemption applicability techniques in accordance with aspects of the present disclosure. In some examples, process flow 700 may implement aspects of wireless communications system 100, wireless communications system 200, wireless communications system 400, and/or wireless communications system 500. Further, process flow 700 may be implemented by a UE 115-h and a base station 105-e, which may be examples of a UE 115 and a base station 105 described with reference to FIGS. 1-6. In the following description of the process flow 700, the operations between UE 115-h and base station 105-e may be transmitted in a different order than the order shown, or the operations performed by base station 105-e and UE 115-h may be performed in different orders or at different times. Certain operations may also be left out of the process flow 700, or other operations may be added to the process flow 700. It is to be understood that while base station 105-e and UE 115-h are shown performing a number of the operations of process flow 700, any wireless device may perform the operations shown.

At 705, base station 105-e may transmit a downlink message that schedules transmission by the UE 115-h of a PRS (e.g., or other RS) using a plurality of time and frequency resources, which may be received by the UE 115-h.

At 710, UE 115-h may identify that the UE 115-h is scheduled to transmit a PRS using a plurality of time and frequency resources (e.g., based on the downlink message or downlink control message, such as DCI or PDCCH, received at 705). In some examples, the PRS may be a SRS that includes a usage indication that the SRS is to be used for positioning (e.g., where a rule for applying the ULPI to the scheduled PRS may be based at least in part on the usage indication).

At 715, base station 105-e may identify that traffic of another UE is of a high priority, and that resources for the traffic of the another UE overlaps (or may interfere with) at least a portion of the plurality of time and frequency resources scheduled at 705. For example, base station 105-e may identify that another URLLC UE has traffic to communicate using resources (e.g., time resources, frequency resources, and/or spatial resources) overlapping with at least a portion of resources allocated to the UE 115-h at 705. In some cases, such may be referred to as the base station 105-e determining a high priority traffic overlaps with resources scheduled at 705 (e.g., based on identification/scheduling of another URLLC UE being configured or scheduled for a particular type or category of communications, such as URLLC communications). In some cases, 710 and 715 may occur in parallel (e.g., at least partially overlapping in time) or at different times (e.g., where 710 may occur before 715, or vice versa).

At 720, base station 105-e may transmit, to the UE 115-h, an ULPI, where the ULPI is indicative of at least a portion of the plurality of time and frequency resources (e.g., a portion of the resources identified at 710) for which transmissions made by the UE 115-h are preempted (e.g., the ULPI may indicate resources that were scheduled by the base station 105-e are preempted).

At 725, the UE 115-h may determine whether the resources preempted by ULPI (e.g., signaled at 720) are canceled or preempted. That is, the UE 115-h may identify a rule for application of the ULPI to the scheduled PRS (e.g., the UE 115-h may identify a rule and determine whether or not the resources are to be preempted based on the identified rule). As described herein, determining whether the allocation of uplink resources (e.g., for PRS) is canceled (e.g., the rule for application of the ULPI to the scheduled PRS) may be based on a type of physical channel (e.g., a traffic type/priority) associated with the scheduled uplink communications (e.g., priority of the PRS), a type of physical channel associated with the ULPI, an allocation type associated with the identified allocation of uplink resources, a type or priority of communications associated with the ULPI, or a type or priority of subsequent uplink communications, etc. In some cases, the priority of the DLPI may be identified based on a bit sequence included in the DLPI, a RNTI of the DLPI, a monitoring occasion of the DLPI, or some combination thereof.

At 730, the base station 105-e may also determine whether the resources preempted by ULPI (e.g., signaled at 720) are canceled or preempted. That is, the base station 105-e may identify a rule for whether the UE will apply the ULPI to the scheduled PRS (e.g., such that the base station 105-e may anticipate UE 115-h behavior and monitor for any communications from the UE 115-h accordingly). As described herein, determining whether the allocation of uplink resources (e.g., for PRS) is canceled (e.g., the rule for UE application of the ULPI to the scheduled PRS) may be based on a type of physical channel (e.g., a traffic type/priority) associated with the scheduled uplink communications (e.g., priority of the PRS), a type of physical channel associated with the ULPI, an allocation type associated with the identified allocation of uplink resources, a type or priority of communications associated with the ULPI, or a type or priority of subsequent uplink communications, etc. In some cases, 725 and 730 may occur in parallel (e.g., at least partially overlapping in time) or at different times (e.g., where 725 may occur before 730, where 730 may occur before 725, where 730 may occur after 715, etc.).

At 735, UE 115-h may transmit (e.g., actually transmit or refrain from transmitting) the scheduled PRS in accordance with the rule (e.g., in accordance with the rule identified by the UE at 725). Similarly, at 735, base station 105-e may monitor for, or refrain from monitoring for, the scheduled PRS based at least in part on the rule. Generally, as discussed herein, the process flow 700 described with reference to PRS may be applied to other particular RSs (e.g., where the rules for application of ULPI may differ for different RSs), as well as to other communications by analogy without departing from the scope of the present disclosure.

Figure 8:
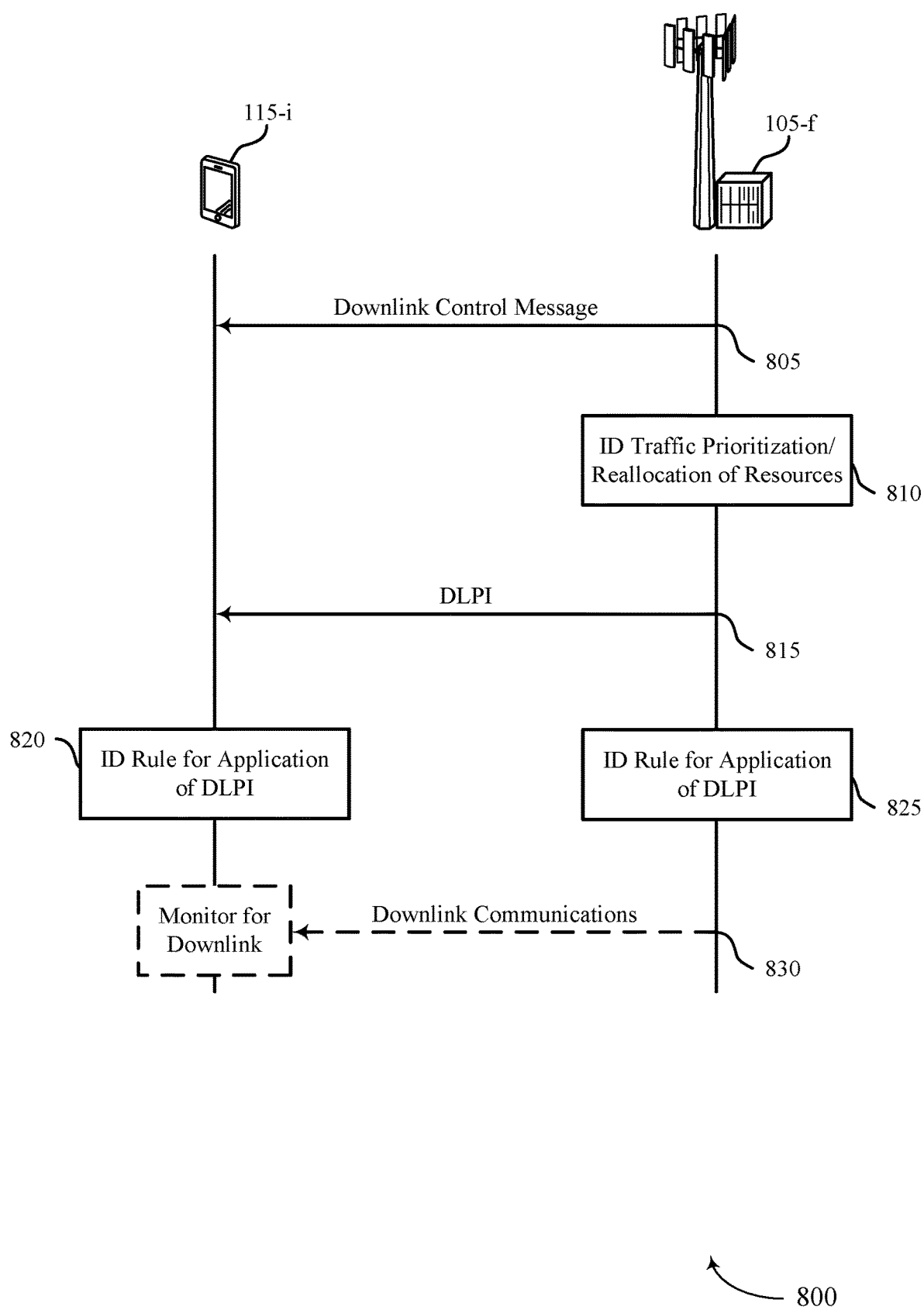
FIG. 8 illustrates an example of a process flow that supports communication preemption applicability techniques in accordance with aspects of the present disclosure.

FIG. 8 illustrates an example of a process flow 800 that supports communication preemption applicability techniques in accordance with aspects of the present disclosure. In some examples, process flow 800 may implement aspects of wireless communications system 100, wireless communications system 200, wireless communications system 400, and/or wireless communications system 500. Further, process flow 800 may be implemented by a UE 115-i and a base station 105-f, which may be examples of a UE 115 and a base station 105 described with reference to FIGS. 1-7. In the following description of the process flow 800, the operations between UE 115-i and base station 105-f may be transmitted in a different order than the order shown, or the operations performed by base station 105-f and UE 115-i may be performed in different orders or at different times. Certain operations may also be left out of the process flow 800, or other operations may be added to the process flow 800. It is to be understood that while base station 105-*f* and UE 115-*i* are shown performing a number of the operations of process flow 800, any wireless device may perform the operations shown.

At 805, the base station 105-*f* may transmit, to UE 115-*i*, a downlink control message including an allocation of uplink resources for an uplink message (e.g., a downlink control message that schedules reception, by the UE 115-*i*, of a downlink message using a plurality of time and frequency resources). For example, the downlink control message may refer to a PDCCH transmission that schedules, for example, eMBB PDSCH for the UE 115-*i*, URLLC PDSCH for the UE 115-*i*, broadcast signaling for the UE 115-*i*, or some other traffic type.

At 810, base station 105-*f* may identify that traffic of another UE is of a high priority, and that resources for the traffic of the another UE overlaps (or may interfere with) at least a portion of a plurality of time and frequency resources scheduled to some UE (which may be UE 115-*i* or some other UE). For example, base station 105-*f* may identify that another URLLC UE has traffic to communicate using resources (e.g., time resources, frequency resources, and/or spatial resources) overlapping with at least a portion of resources that have been previously allocated, and that the base station 105-*f* is to reclaim and reallocate said portion of resources.

At 815, base station 105-*f* may transmit, to the UE 115-*i*, a DLPI, where the DLPI indicates that one or more communications (e.g., that time/frequency/spatial resources associated with one or more communications) are preempted during at least the portion of the plurality of time and frequency resources (e.g., identified by the base station at 810).

At 820, UE 115-*i* may identify a rule for application of the DLPI (e.g., determine whether the resources preempted by DLPI are canceled/preempted or that the DLPI should not be applied and the resources indicated by the DLPI should not be canceled/preempted). In some cases, the rule may be based on a type of physical channel (e.g., a traffic type/priority) associated with the scheduled downlink communications (e.g., priority of the downlink communications), a type of physical channel associated with the DLPI, an allocation type associated with the identified allocation of downlink resources, a type or priority of communications associated with the DLPI, etc.

In some examples, the UE 115-*i* may identify a channel priority list, identify a priority of the one or more communications (e.g., scheduled at 805), and identify a priority of the DLPI, where the rule for application of the DLPI may be based on the channel priority list (e.g., how the network or base station has prioritized traffic types or communications supported by the network) and a comparison of the priority of the one or more communications and the priority of the DLPI. In some cases, the channel priority list may be identified based at least in part on a format of the downlink control message, a size of the downlink control message, a RNTI of the downlink control message, a search space or control resource set used to monitor for the downlink control message, an indication in the downlink control message, or some combination thereof.

At 825, base station 105-*f* may identify a rule for UE 115-*i* application of the DLPI (e.g., determine whether the resources preempted by DLPI will be canceled/preempted by the UE 115-*i* or whether the DLPI will not be applied by the UE 115-*i* and the resources indicated by the DLPI will be used by the UE 115-*i*). In some cases, the rule may be based on a type of physical channel (e.g., a traffic type/priority) associated with the scheduled downlink communications (e.g., priority of the downlink communications), a type of physical channel associated with the DLPI, an allocation type associated with the identified allocation of downlink resources, a type or priority of communications associated with the DLPI, etc.

In some examples, the base station 105-*f* may identify a channel priority list, identify a priority of the one or more communications (e.g., scheduled at 805), and identify a priority of the DLPI, where the rule for application of the DLPI may be based on the channel priority list (e.g., how the network or base station has prioritized traffic types or communications supported by the network) and a comparison of the priority of the one or more communications and the priority of the DLPI. In some cases, the channel priority list may be conveyed by the base station 105-*f* to the UE 115-*i* based at least in part on a format of the downlink control message, a size of the downlink control message, a RNTI of the downlink control message, a search space or control resource set used to monitor for the downlink control message, an indication in the downlink control message, or some combination thereof.

At 830, UE 115-*i* may, according to the rule, monitor for and receive, or not monitor for, downlink communications scheduled at 805 based on the rule (e.g., based on whether the DLPI is applied to the resources associated with the downlink communications.

Figure 9:
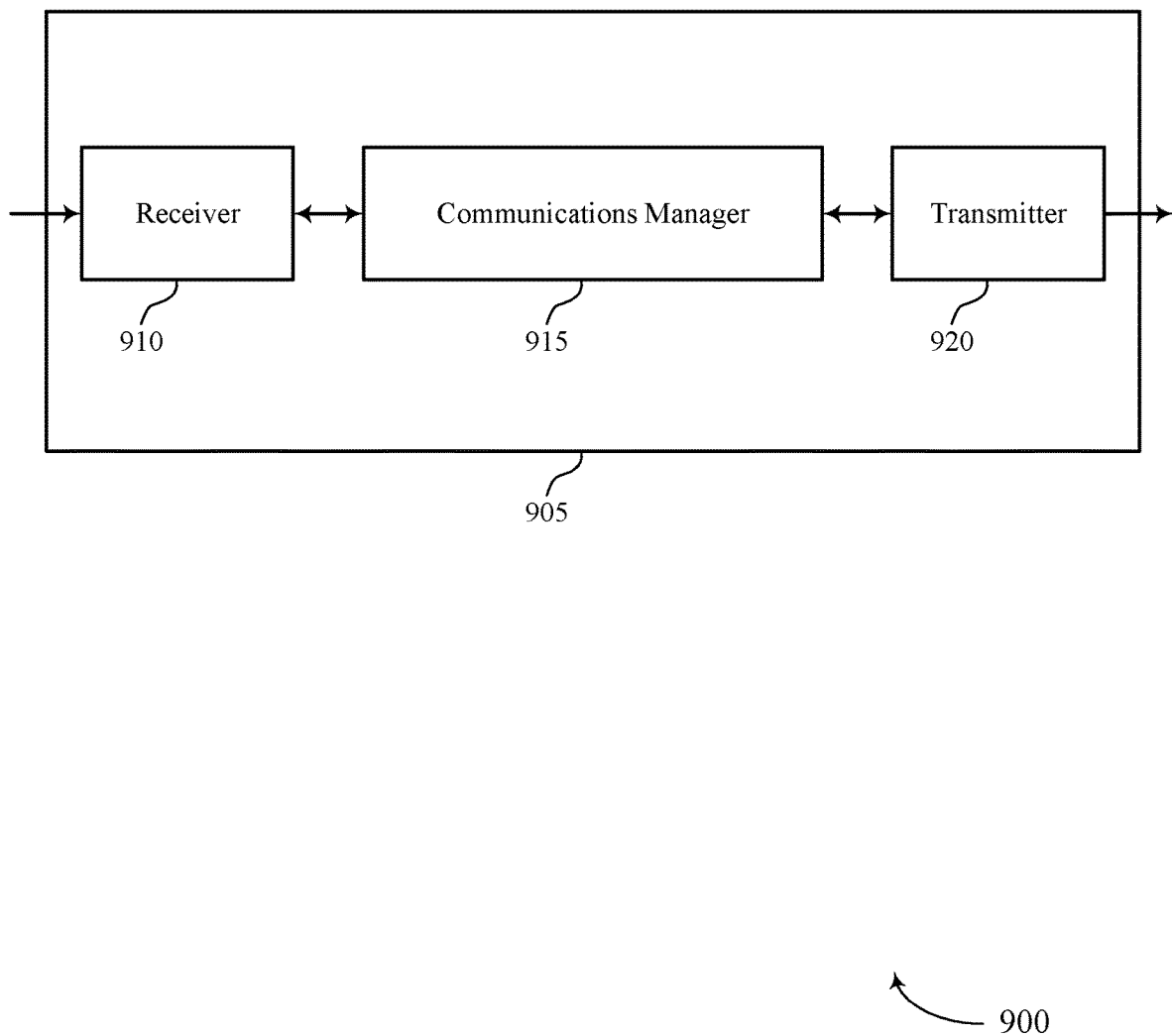
FIGS. 9 and 10 show block diagrams of devices that support communication preemption applicability techniques in accordance with aspects of the present disclosure.

FIG. 9 shows a block diagram 900 of a device 905 that supports communication preemption applicability techniques in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to communication preemption applicability techniques, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, at the UE, a downlink control message that schedules transmission by the UE of an uplink message using a set of time and frequency resources, receive, at the UE, an uplink preemption indicator, where the uplink preemption indicator is indicative of one or more spatial directions in which transmissions made by the UE are preempted during at least a portion of the set of time and frequency resources, and suppress transmission of the uplink message in the one or more spatial directions during at least the portion of the set of time and frequency resources based on the uplink preemption indicator.

The communications manager 915 may also identify, at the UE, that the UE is scheduled to transmit a positioning reference signal using a set of time and frequency resources, transmit the scheduled positioning reference signal in accordance with the rule, receive, at the UE, an uplink preemption indicator, where the uplink preemption indicator is indicative of at least a portion of the set of time and frequency resources for which transmissions made by the UE are preempted, and identify a rule for application of the uplink preemption indicator to the scheduled positioning reference signal.

The communications manager 915 may also receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receive, at the UE, a downlink preemption indicator, where the downlink preemption indicator indicates that one or more communications are preempted during at least a portion of the set of time and frequency resources, identify a rule for application of the downlink preemption indicator, and receive the one or more communications in accordance with the rule. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 915 as described herein may be implemented to realize one or more potential advantages. One implementation may allow a UE 115 to save power and increase battery life by more effectively balancing the performance and resource utilization of communications according to different priorities. Another implementation may provide improved quality and reliability of service at the UE 115, as the number of separate resources allocated to the UE 115 may be reduced.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
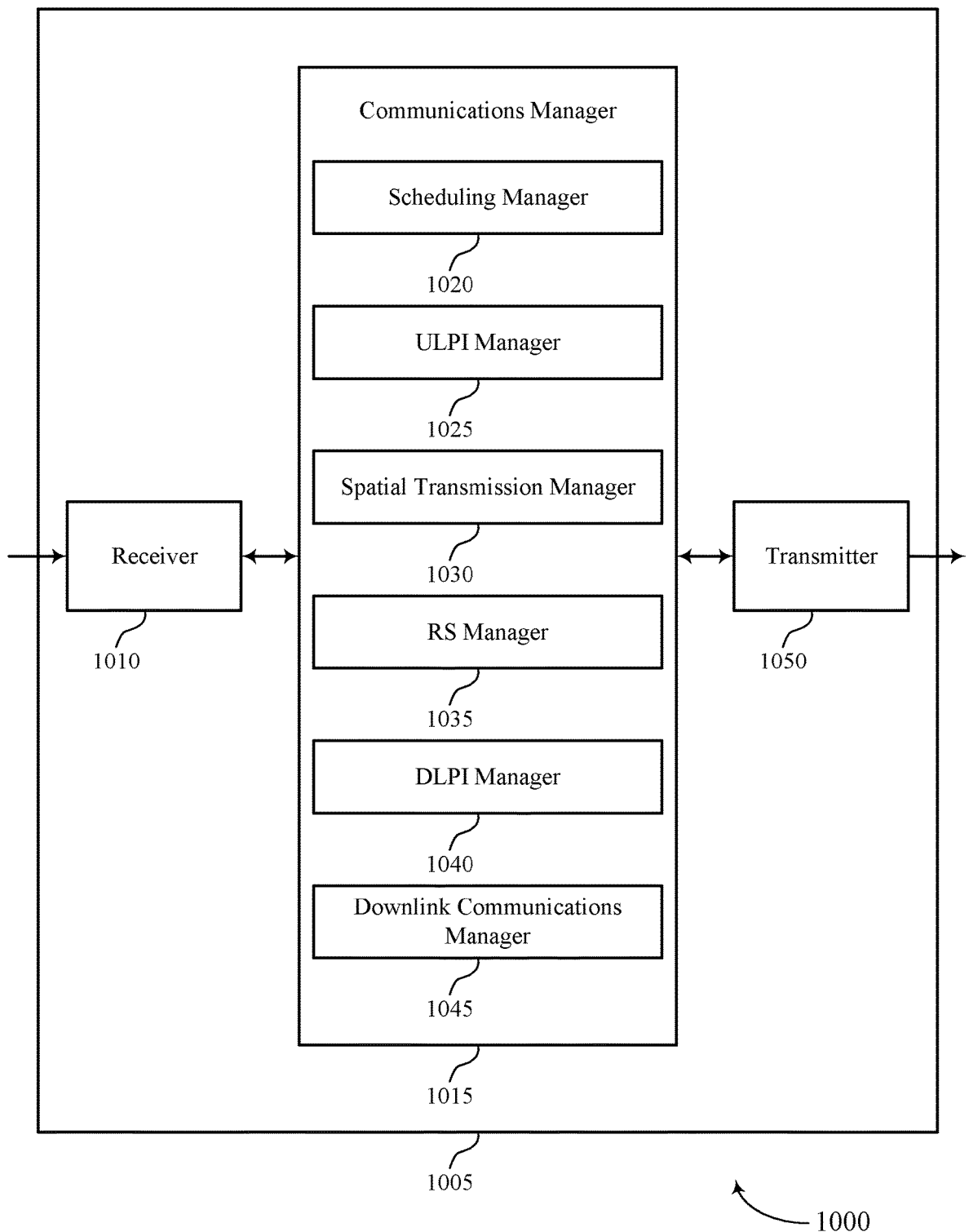

FIG. 10 shows a block diagram 1000 of a device 1005 that supports communication preemption applicability techniques in accordance with aspects of the present disclosure. The device 1005 may be an example of aspects of a device 905, or a UE 115 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to communication preemption applicability techniques, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a scheduling manager 1020, an ULPI manager 1025, a spatial transmission manager 1030, a RS manager 1035, a DLPI manager 1040, and a downlink communications manager 1045. The communications manager 1015 may be an example of aspects of the communications manager 1210 described herein.

The scheduling manager 1020 may receive, at the UE, a downlink control message that schedules transmission by the UE of an uplink message using a set of time and frequency resources. The ULPI manager 1025 may receive, at the UE, an uplink preemption indicator, where the uplink preemption indicator is indicative of one or more spatial directions in which transmissions made by the UE are preempted during at least a portion of the set of time and frequency resources. The spatial transmission manager 1030 may suppress transmission of the uplink message in the one or more spatial directions during at least the portion of the set of time and frequency resources based on the uplink preemption indicator.

The RS manager 1035 may identify, at the UE, that the UE is scheduled to transmit a positioning reference signal using a set of time and frequency resources. The ULPI manager 1025 may receive, at the UE, an uplink preemption indicator, where the uplink preemption indicator is indicative of at least a portion of the set of time and frequency resources for which transmissions made by the UE are preempted, and identify a rule for application of the uplink preemption indicator to the scheduled positioning reference signal. The RS manager 1035 may transmit the scheduled positioning reference signal in accordance with the rule.

The scheduling manager 1020 may receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic. The DLPI manager 1040 may receive, at the UE, a downlink preemption indicator, where the downlink preemption indicator indicates that one or more communications are preempted during at least a portion of the set of time and frequency resources and identify a rule for application of the downlink preemption indicator. The downlink communications manager 1045 may receive the one or more communications in accordance with the rule.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
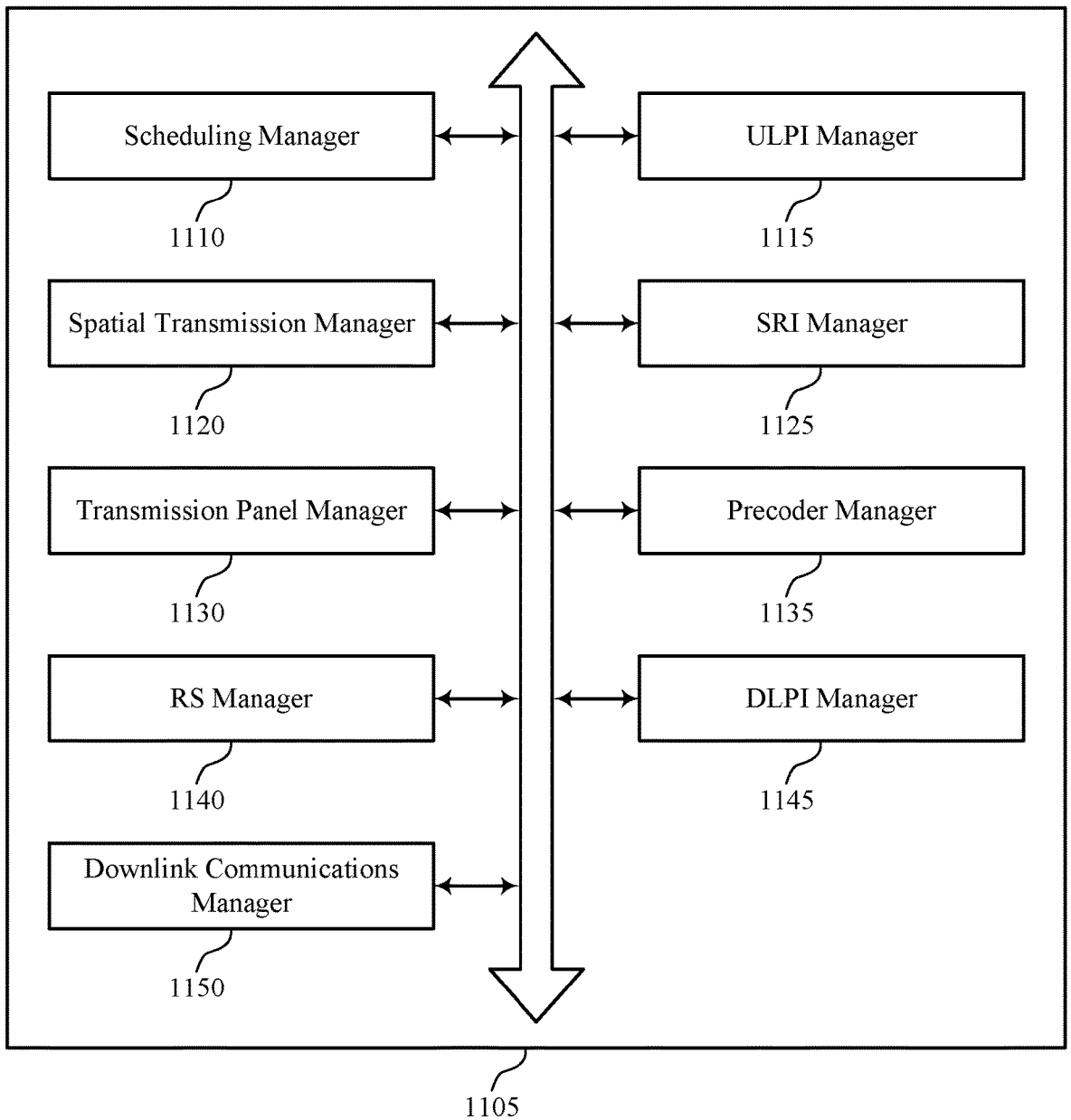
FIG. 11 shows a block diagram of a communications manager that supports communication preemption applicability techniques in accordance with aspects of the present disclosure.

FIG. 11 shows a block diagram 1100 of a communications manager 1105 that supports communication preemption applicability techniques in accordance with aspects of the present disclosure. The communications manager 1105 may be an example of aspects of a communications manager 915, a communications manager 1015, or a communications manager 1210 described herein. The communications manager 1105 may include a scheduling manager 1110, an ULPI manager 1115, a spatial transmission manager 1120, a SRI manager 1125, a transmission panel manager 1130, a precoder manager 1135, a RS manager 1140, a DLPI manager 1145, and a downlink communications manager 1150. Each of these modules may communicate, directly or indirectly, with one another (e.g., via one or more buses).

The scheduling manager 1110 may receive, at the UE, a downlink control message that schedules transmission by the UE of an uplink message using a set of time and frequency resources. In some examples, the scheduling manager 1110 may receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic. In some examples, the scheduling manager 1110 may identify, from the downlink control message, a group of time and frequency resources including the set of time and frequency resources for downlink communications, where the downlink preemption indicator indicates the one or more preempted communications based on the group of time and frequency resources.

In some examples, the scheduling manager 1110 may identify, from the downlink control message, a group of time and frequency resources including one or more multimedia broadcast multicast service symbols, where the downlink preemption indicator indicates the one or more preempted communications based on the group of time and frequency resources. In some examples, the scheduling manager 1110 may identify, from the downlink control message, a group of time and frequency resources including one or more uplink symbols, where the downlink preemption indicator indicates the one or more preempted communications based on the group of time and frequency resources.

The ULPI manager 1115 may receive, at the UE, an uplink preemption indicator, where the uplink preemption indicator is indicative of one or more spatial directions in which transmissions made by the UE are preempted during at least a portion of the set of time and frequency resources. In some examples, the ULPI manager 1115 may receive, at the UE, an uplink preemption indicator, where the uplink preemption indicator is indicative of at least a portion of the set of time and frequency resources for which transmissions made by the UE are preempted. In some examples, the ULPI manager 1115 may identify a rule for application of the uplink preemption indicator to the scheduled positioning reference signal. In some examples, the ULPI manager 1115 may receive radio resource control signaling indicative of a relationship between the second subset of the bit sequence and the one or more spatial directions. In some examples, the ULPI manager 1115 may refrain from transmitting the positioning reference signal using the portion of the set of time and frequency resources based on applying the uplink preemption indicator to the scheduled positioning reference signal according to the rule.

In some examples, the ULPI manager 1115 may receive an indication of the rule, where the rule is identified based on the indication. In some examples, the ULPI manager 1115 may determine that the portion of the set of time and frequency resources for which transmissions made by the UE are preempted correspond to the set of time and frequency resources, where the rule is identified based on the determination. In some cases, the uplink preemption indicator includes a bit sequence in downlink control information. In some cases, a first subset of the bit sequence indicates the portion of the set of time and frequency resources and a second subset of the bit sequence indicates the one or more spatial directions. In some cases, the relationship indicates a mapping of one or more sounding reference signal resource indicators to one or more bit values represented by the second subset of the bit sequence.

The spatial transmission manager 1120 may suppress transmission of the uplink message in the one or more spatial directions during at least the portion of the set of time and frequency resources based on the uplink preemption indicator. In some examples, the spatial transmission manager 1120 may transmit the uplink message in spatial directions different than the one or more spatial directions identified by the uplink preemption indicator during at least the portion of the set of time and frequency resources. In some examples, the spatial transmission manager 1120 may determine the one or more spatial directions based on the one or more bits.

The RS manager 1140 may identify, at the UE, that the UE is scheduled to transmit a positioning reference signal using a set of time and frequency resources. In some examples, the RS manager 1140 may transmit the scheduled positioning reference signal in accordance with the rule. In some examples, the RS manager 1140 may transmit the positioning reference signal using the set of time and frequency resources regardless of the uplink preemption indicator being indicative of at least the portion of the set of time and frequency resources. In some cases, the positioning reference signal is a sounding reference signal that includes a usage indication that the sounding reference signal is to be used for positioning, where applying the uplink preemption indicator to the scheduled positioning reference signal is based on the usage indication. In some cases, the rule is identified based on the usage indication.

The DLPI manager 1145 may receive, at the UE, a downlink preemption indicator, where the downlink preemption indicator indicates that one or more communications are preempted during at least a portion of the set of time and frequency resources. In some examples, the DLPI manager 1145 may identify a rule for application of the downlink preemption indicator. In some examples, the DLPI manager 1145 may identify a channel priority list. In some examples, the DLPI manager 1145 may identify a priority of the one or more communications. In some examples, the DLPI manager 1145 may identify a priority of the downlink preemption indicator, where the rule for application of the downlink preemption indicator is based on the channel priority list and a comparison of the priority of the one or more communications and the priority of the downlink preemption indicator.

In some examples, the DLPI manager 1145 may receive, at the UE, an indication of the rule in radio resource control signaling, the downlink control message, or both. In some examples, the DLPI manager 1145 may receive, at the UE, a downlink preemption indicator monitoring configuration in a system information block. In some examples, the DLPI manager 1145 may identify a radio network temporary identifier. In some examples, the DLPI manager 1145 may decode the downlink preemption indicator based on the identified radio network temporary identifier and the received downlink preemption indicator monitoring configuration. In some cases, the channel priority list is identified based on a format of the downlink control message, a size of the downlink control message, a radio network temporary identifier of the downlink control message, a search space or control resource set used to monitor for the downlink control message, an indication in the downlink control message, or some combination thereof. In some cases, the priority of the downlink preemption indicator is identified based on a bit sequence included in the downlink preemption indicator, a radio network temporary identifier of the downlink preemption indicator, a monitoring occasion of the downlink preemption indicator, or some combination thereof. In some cases, the indication includes a priority indication for at least a portion of the scheduled set of time and frequency resources for downlink communications.

The downlink communications manager 1150 may receive the one or more communications in accordance with the rule. The SRI manager 1125 may identify that the uplink preemption indicator includes one or more bits that correspond to a sounding reference signal resource indicator. The transmission panel manager 1130 may identify one or more panels in which transmissions made by the UE are preempted during at least the portion of the set of time and frequency resources based on the one or more bits, where the one or more spatial directions are determined based on the identified one or more panels. The precoder manager 1135 may identify one or more precoders in which transmissions made by the UE are preempted during at least the portion of the set of time and frequency resources based on the one or more bits, where the one or more spatial directions are determined based on the identified one or more precoders.

Figure 12:
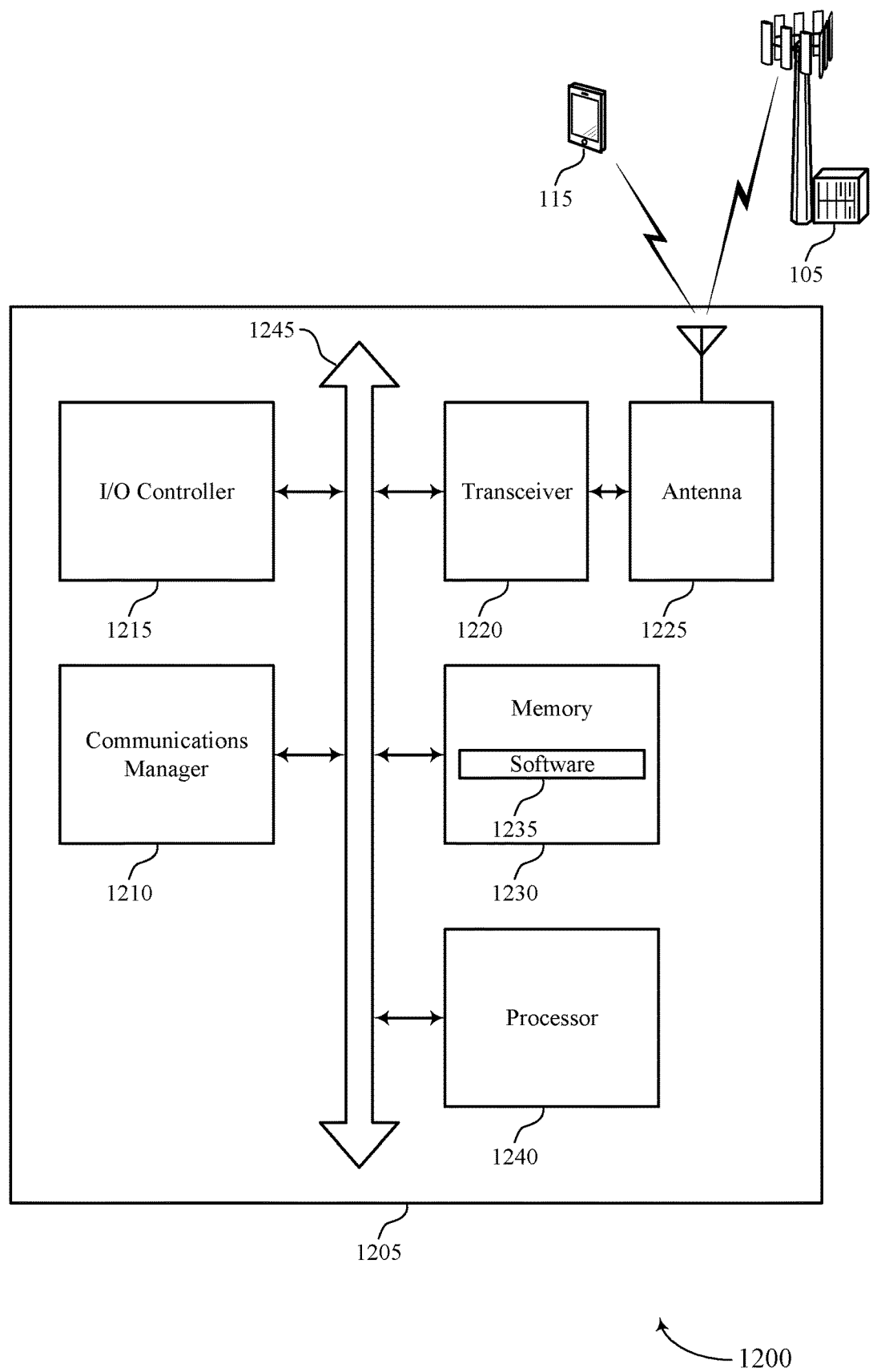
FIG. 12 shows a diagram of a system including a device that supports communication preemption applicability techniques in accordance with aspects of the present disclosure.

FIG. 12 shows a diagram of a system 1200 including a device 1205 that supports communication preemption applicability techniques in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, at the UE, a downlink control message that schedules transmission by the UE of an uplink message using a set of time and frequency resources, receive, at the UE, an uplink preemption indicator, where the uplink preemption indicator is indicative of one or more spatial directions in which transmissions made by the UE are preempted during at least a portion of the set of time and frequency resources, and suppress transmission of the uplink message in the one or more spatial directions during at least the portion of the set of time and frequency resources based on the uplink preemption indicator.

The communications manager 1210 may also identify, at the UE, that the UE is scheduled to transmit a positioning reference signal using a set of time and frequency resources, transmit the scheduled positioning reference signal in accordance with the rule, receive, at the UE, an uplink preemption indicator, where the uplink preemption indicator is indicative of at least a portion of the set of time and frequency resources for which transmissions made by the UE are preempted, and identify a rule for application of the uplink preemption indicator to the scheduled positioning reference signal.

The communications manager 1210 may also receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic, receive, at the UE, a downlink preemption indicator, where the downlink preemption indicator indicates that one or more communications are preempted during at least a portion of the set of time and frequency resources, identify a rule for application of the downlink preemption indicator, and receive the one or more communications in accordance with the rule.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting communication preemption applicability techniques).

Based on preempting only the potentially interfering spatial directions, a processor of a UE 115 may efficiently use resources that otherwise would be unnecessarily preempted. The processor of the UE 115 may turn on one or more processing units for utilizing unnecessary resources, increase a processing clock, or a similar mechanism within the UE 115. As such, when the resources are used more efficiently, the processor may be ready to respond more efficiently through the reduction of a ramp up in processing power.

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
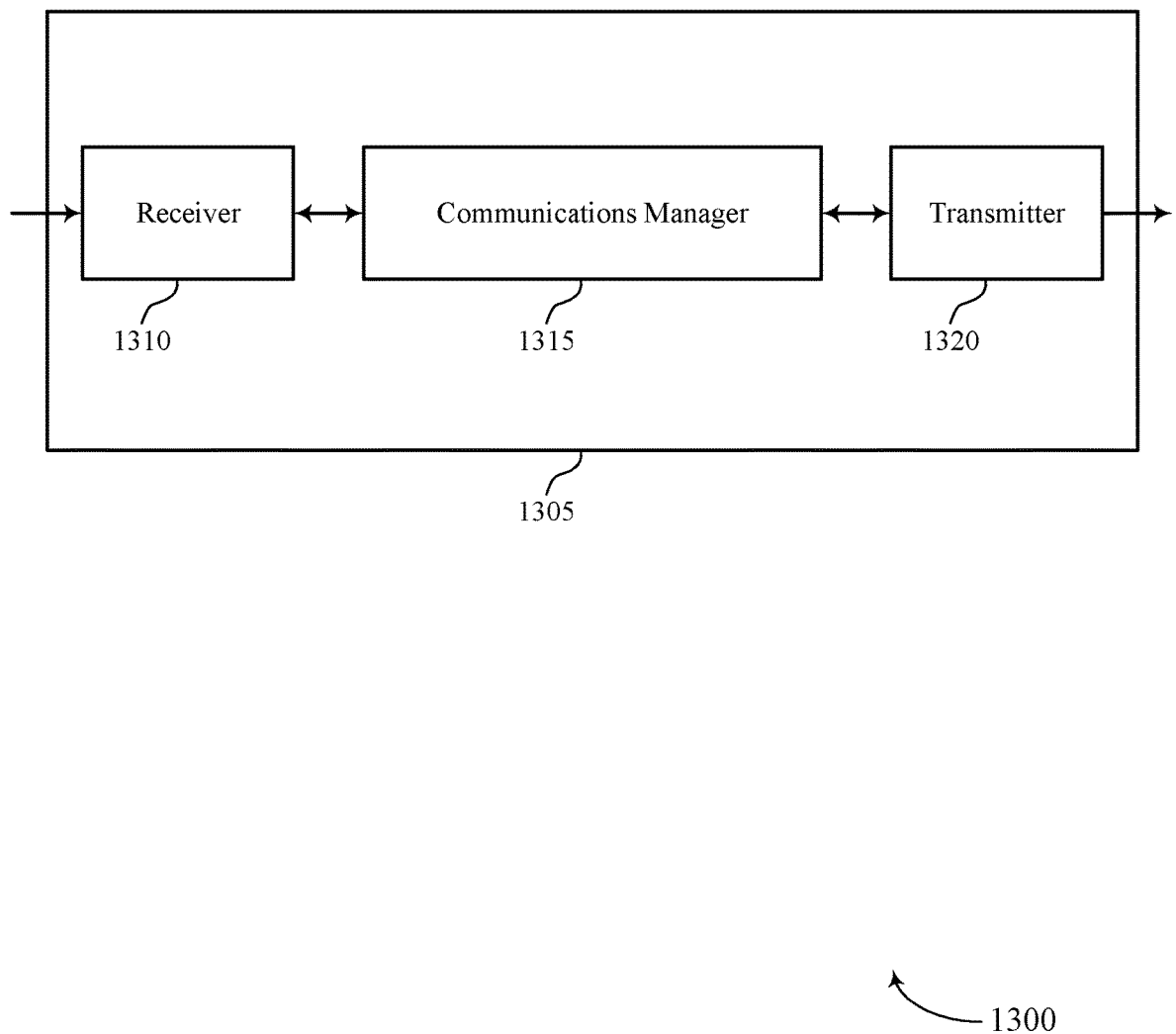
FIGS. 13 and 14 show block diagrams of devices that support communication preemption applicability techniques in accordance with aspects of the present disclosure.

FIG. 13 shows a block diagram 1300 of a device 1305 that supports communication preemption applicability techniques in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to communication preemption applicability techniques, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to a UE, a downlink control message that schedules transmission by the UE of an uplink message using a set of time and frequency resources, transmit, to the UE, an uplink preemption indicator, where the uplink preemption indicator is indicative of one or more spatial directions in which transmissions made by the UE are preempted during at least a portion of the set of time and frequency resources, and monitor for the uplink message during at least the portion of the set of time and frequency resources based on the transmitted uplink preemption indicator.

The communications manager 1315 may also transmit, to a UE, a downlink message that schedules transmission by the UE of a positioning reference signal using a set of time and frequency resources, transmit, to the UE, an uplink preemption indicator, where the uplink preemption indicator is indicative of at least a portion of the set of time and frequency resources for which transmissions made by the UE are preempted, identify a rule for UE application of the uplink preemption indicator to the scheduled positioning reference signal, and monitor for the scheduled positioning reference signal based on the rule.

The communications manager 1315 may also transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmit, to the UE, a downlink preemption indicator, where the downlink preemption indicator indicates that one or more communications are preempted during at least a portion of the set of time and frequency resources, identify a rule for UE application of the downlink preemption indicator, and monitor for the one or more communications based on the rule. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 915 as described herein may be implemented to realize one or more potential advantages. One implementation may allow a base station 105 to save power and increase battery life by more effectively balancing the performance and resource utilization of communications according to different priorities. Another implementation may provide improved quality and reliability of service at the base station 105, as the number of separate resources allocated by the base station 105 may be reduced.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
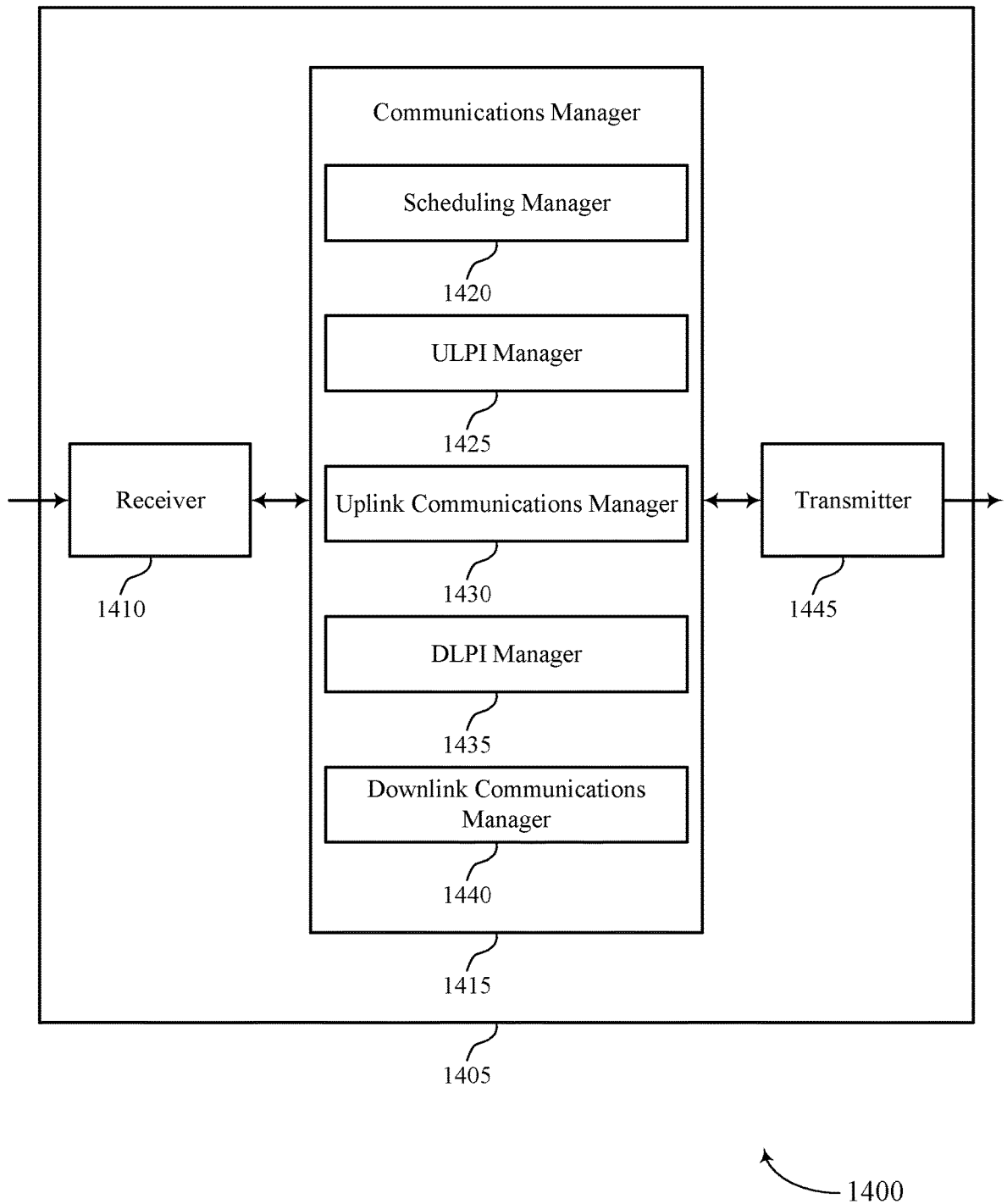

FIG. 14 shows a block diagram 1400 of a device 1405 that supports communication preemption applicability techniques in accordance with aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to communication preemption applicability techniques, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a scheduling manager 1420, an ULPI manager 1425, an uplink communications manager 1430, a DLPI manager 1435, and a downlink communications manager 1440. The communications manager 1415 may be an example of aspects of the communications manager 1610 described herein.

The scheduling manager 1420 may transmit, to a UE, a downlink control message that schedules transmission by the UE of an uplink message using a set of time and frequency resources. The ULPI manager 1425 may transmit, to the UE, an uplink preemption indicator, where the uplink preemption indicator is indicative of one or more spatial directions in which transmissions made by the UE are preempted during at least a portion of the set of time and frequency resources. The uplink communications manager 1430 may monitor for the uplink message during at least the portion of the set of time and frequency resources based on the transmitted uplink preemption indicator.

The scheduling manager 1420 may transmit, to a UE, a downlink message that schedules transmission by the UE of a positioning reference signal using a set of time and frequency resources. The ULPI manager 1425 may transmit, to the UE, an uplink preemption indicator, where the uplink preemption indicator is indicative of at least a portion of the set of time and frequency resources for which transmissions made by the UE are preempted and identify a rule for UE application of the uplink preemption indicator to the scheduled positioning reference signal. The uplink communications manager 1430 may monitor for the scheduled positioning reference signal based on the rule.

The scheduling manager 1420 may transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic. The DLPI manager 1435 may transmit, to the UE, a downlink preemption indicator, where the downlink preemption indicator indicates that one or more communications are preempted during at least a portion of the set of time and frequency resources and identify a rule for UE application of the downlink preemption indicator. The downlink communications manager 1440 may monitor for the one or more communications based on the rule.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
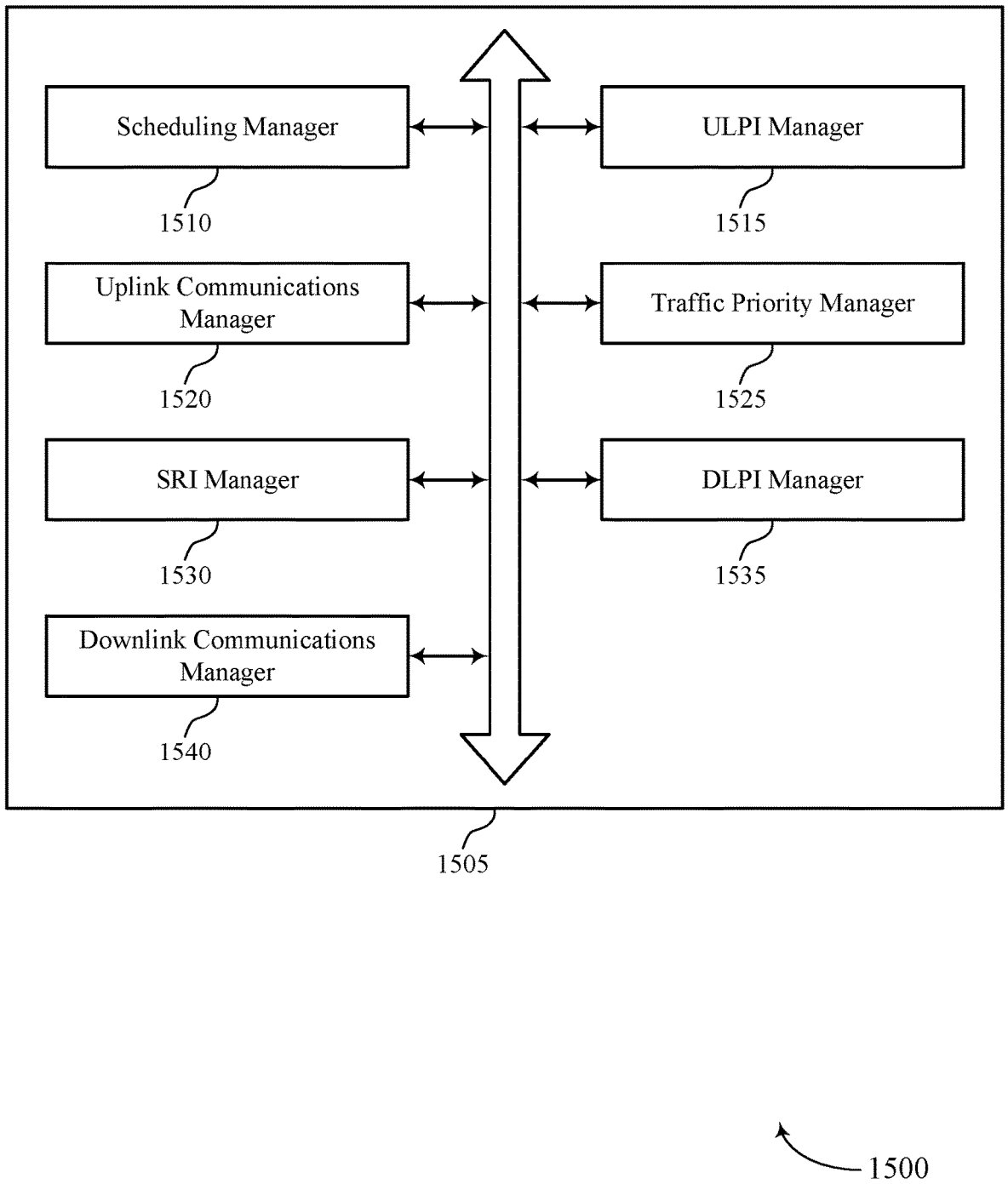
FIG. 15 shows a block diagram of a communications manager that supports communication preemption applicability techniques in accordance with aspects of the present disclosure.

FIG. 15 shows a block diagram 1500 of a communications manager 1505 that supports communication preemption applicability techniques in accordance with aspects of the present disclosure. The communications manager 1505 may be an example of aspects of a communications manager 1315, a communications manager 1415, or a communications manager 1610 described herein. The communications manager 1505 may include a scheduling manager 1510, an ULPI manager 1515, an uplink communications manager 1520, a traffic priority manager 1525, a SRI manager 1530, a DLPI manager 1535, and a downlink communications manager 1540. Each of these modules may communicate, directly or indirectly, with one another (e.g., via one or more buses).

The scheduling manager 1510 may transmit, to a UE, a downlink control message that schedules transmission by the UE of an uplink message using a set of time and frequency resources. In some examples, the scheduling manager 1510 may transmit, to a UE, a downlink message that schedules transmission by the UE of a positioning reference signal using a set of time and frequency resources. In some examples, the scheduling manager 1510 may transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic.

The ULPI manager 1515 may transmit, to the UE, an uplink preemption indicator, where the uplink preemption indicator is indicative of one or more spatial directions in which transmissions made by the UE are preempted during at least a portion of the set of time and frequency resources. In some examples, the ULPI manager 1515 may transmit, to the UE, an uplink preemption indicator, where the uplink preemption indicator is indicative of at least a portion of the set of time and frequency resources for which transmissions made by the UE are preempted. In some examples, the ULPI manager 1515 may identify a rule for UE application of the uplink preemption indicator to the scheduled positioning reference signal. In some examples, the ULPI manager 1515 may transmit radio resource control signaling indicative of a relationship between the second subset of the bit sequence and the one or more spatial directions. In some examples, the ULPI manager 1515 may transmit, to the UE, an indication of the rule.

In some examples, the ULPI manager 1515 may determine that the portion of the set of time and frequency resources for which transmissions made by the UE are preempted correspond to the set of time and frequency resources, where the rule is identified based on the determination. In some cases, the uplink preemption indicator includes a bit sequence in downlink control information. In some cases, a first subset of the bit sequence indicates the portion of the set of time and frequency resources and a second subset of the bit sequence indicates the one or more spatial directions. In some cases, the relationship indicates a mapping of one or more sounding reference signal resource indicators to one or more bit values represented by the second subset of the bit sequence.

The uplink communications manager 1520 may monitor for the uplink message during at least the portion of the set of time and frequency resources based on the transmitted uplink preemption indicator. In some examples, the uplink communications manager 1520 may monitor for the scheduled positioning reference signal based on the rule. In some examples, the uplink communications manager 1520 may receive the uplink message in spatial directions different than the one or more spatial directions indicated by the uplink preemption indicator during at least the portion of the set of time and frequency resources. In some examples, the uplink communications manager 1520 may identify the one or more spatial directions in which transmissions made by the UE are preempted based on the identification that the traffic of the another UE is of the first priority that is higher than the second priority of the uplink message.

In some examples, the uplink communications manager 1520 may identify one or more precoders in which transmissions made by the UE are preempted during at least the portion of the set of time and frequency resources, where the sounding reference signal resource indicator is identified based on the one or more precoders. In some examples, the uplink communications manager 1520 may monitor for the uplink message in spatial directions different than the one or more spatial directions indicated by the uplink preemption indicator during at least the portion of the set of time and frequency resources. In some examples, the uplink communications manager 1520 may refrain from monitoring for the positioning reference signal using the portion of the set of time and frequency resources based on the rule.

In some examples, the uplink communications manager 1520 may receive the positioning reference signal using the set of time and frequency resources regardless of the uplink preemption indicator being indicative of at least the portion of the set of time and frequency resources based on the rule. In some cases, the positioning reference signal is a sounding reference signal that includes a usage indication that the sounding reference signal is to be used for positioning. In some cases, the rule is identified based on the usage indication.

The DLPI manager 1535 may transmit, to the UE, a downlink preemption indicator, where the downlink preemption indicator indicates that one or more communications are preempted during at least a portion of the set of time and frequency resources. In some examples, the DLPI manager 1535 may identify a rule for UE application of the downlink preemption indicator. In some examples, the DLPI manager 1535 may transmit, to the UE, an indication of the rule in radio resource control signaling, the downlink control message, or both. In some examples, the DLPI manager 1535 may transmit, to the UE, a downlink preemption indicator monitoring configuration in a system information block. In some examples, the DLPI manager 1535 may identify a radio network temporary identifier. In some examples, the DLPI manager 1535 may encode the downlink preemption indicator based on the identified radio network temporary identifier.

In some examples, the DLPI manager 1535 may determine a group of time and frequency resources, from the set of time and frequency resources scheduled by the downlink control message, including the set of time and frequency resources for downlink communications, where the downlink preemption indicator indicates the one or more preempted communications based on the group of time and frequency resources. In some examples, the DLPI manager 1535 may determine a group of time and frequency resources, from the set of time and frequency resources scheduled by the downlink control message, including one or more multimedia broadcast multicast service symbols, where the downlink preemption indicator indicates the one or more preempted communications based on the group of time and frequency resources. In some examples, the DLPI manager 1535 may determine a group of time and frequency resources, from the set of time and frequency resources scheduled by the downlink control message, including one or more uplink symbols, where the downlink preemption indicator indicates the one or more preempted communications based on the group of time and frequency resources. In some cases, the indication includes a priority indication for at least a portion of the scheduled set of time and frequency resources for downlink communications.

The downlink communications manager 1540 may monitor for the one or more communications based on the rule. The traffic priority manager 1525 may identify traffic of another UE is of a first priority that is higher than a second priority of the uplink message. In some examples, the traffic priority manager 1525 may identify a channel priority list. In some examples, the traffic priority manager 1525 may identify a priority of the one or more communications. In some examples, the traffic priority manager 1525 may identify a priority of the downlink preemption indicator, where the rule for UE application of the downlink preemption indicator is based on the channel priority list and a comparison of the priority of the one or more communications and the priority of the downlink preemption indicator. In some examples, the traffic priority manager 1525 may determine a format of the downlink control message, a size of the downlink control message, a radio network temporary identifier of the downlink control message, a search space or control resource set used to monitor for the downlink control message, an indication in the downlink control message, or some combination thereof based on the channel priority list, where the channel priority list is indicated to the UE based on the determining.

In some examples, the traffic priority manager 1525 may determine a bit sequence included in the downlink preemption indicator, a radio network temporary identifier of the downlink preemption indicator, a monitoring occasion of the downlink preemption indicator, or some combination thereof based on the priority of the downlink preemption indicator, where the priority of the downlink preemption indicator is indicated to the UE based on the determining. The SRI manager 1530 may identify one or more bits that correspond to a sounding reference signal resource indicator based on the identified one or more spatial directions, where the uplink preemption indicator is indicative of one or more spatial directions based on the sounding reference signal resource indicator.

Figure 16:
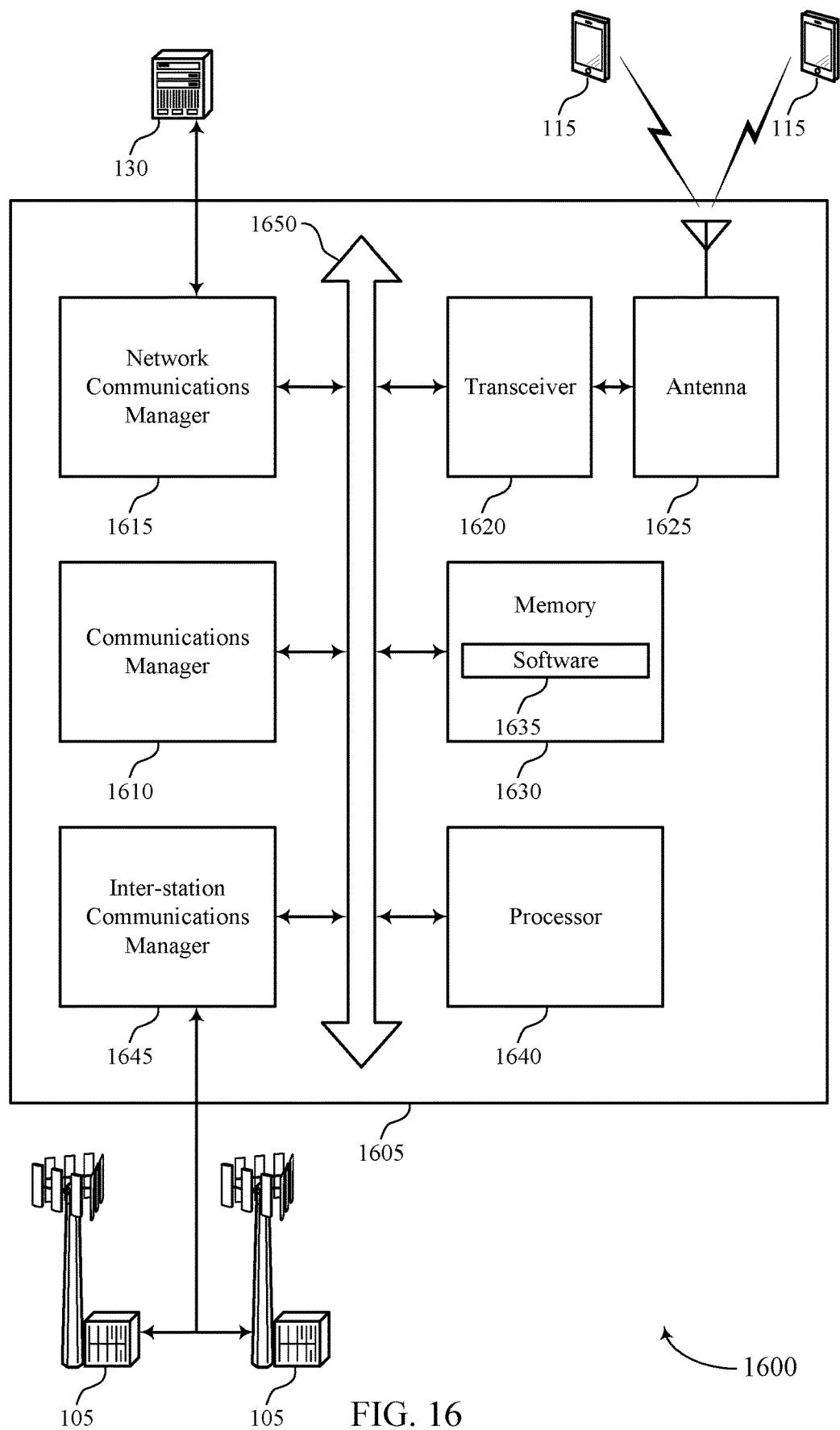
FIG. 16 shows a diagram of a system including a device that supports communication preemption applicability techniques in accordance with aspects of the present disclosure.

FIG. 16 shows a diagram of a system 1600 including a device 1605 that supports communication preemption applicability techniques in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to a UE, a downlink control message that schedules transmission by the UE of an uplink message using a set of time and frequency resources, transmit, to the UE, an uplink preemption indicator, where the uplink preemption indicator is indicative of one or more spatial directions in which transmissions made by the UE are preempted during at least a portion of the set of time and frequency resources, and monitor for the uplink message during at least the portion of the set of time and frequency resources based on the transmitted uplink preemption indicator.

The communications manager 1610 may also transmit, to a UE, a downlink message that schedules transmission by the UE of a positioning reference signal using a set of time and frequency resources, transmit, to the UE, an uplink preemption indicator, where the uplink preemption indicator is indicative of at least a portion of the set of time and frequency resources for which transmissions made by the UE are preempted, identify a rule for UE application of the uplink preemption indicator to the scheduled positioning reference signal, and monitor for the scheduled positioning reference signal based on the rule.

The communications manager 1610 may also transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic, transmit, to the UE, a downlink preemption indicator, where the downlink preemption indicator indicates that one or more communications are preempted during at least a portion of the set of time and frequency resources, identify a rule for UE application of the downlink preemption indicator, and monitor for the one or more communications based on the rule.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code or software 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting communication preemption applicability techniques).

Based on preempting only the potentially interfering spatial directions, a processor of a base station 105 may efficiently use resources that otherwise would be unnecessarily preempted. As such, when the resources are used more efficiently, the processor may be ready to respond more efficiently through the reduction of a ramp up in processing power.

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

Figure 17:
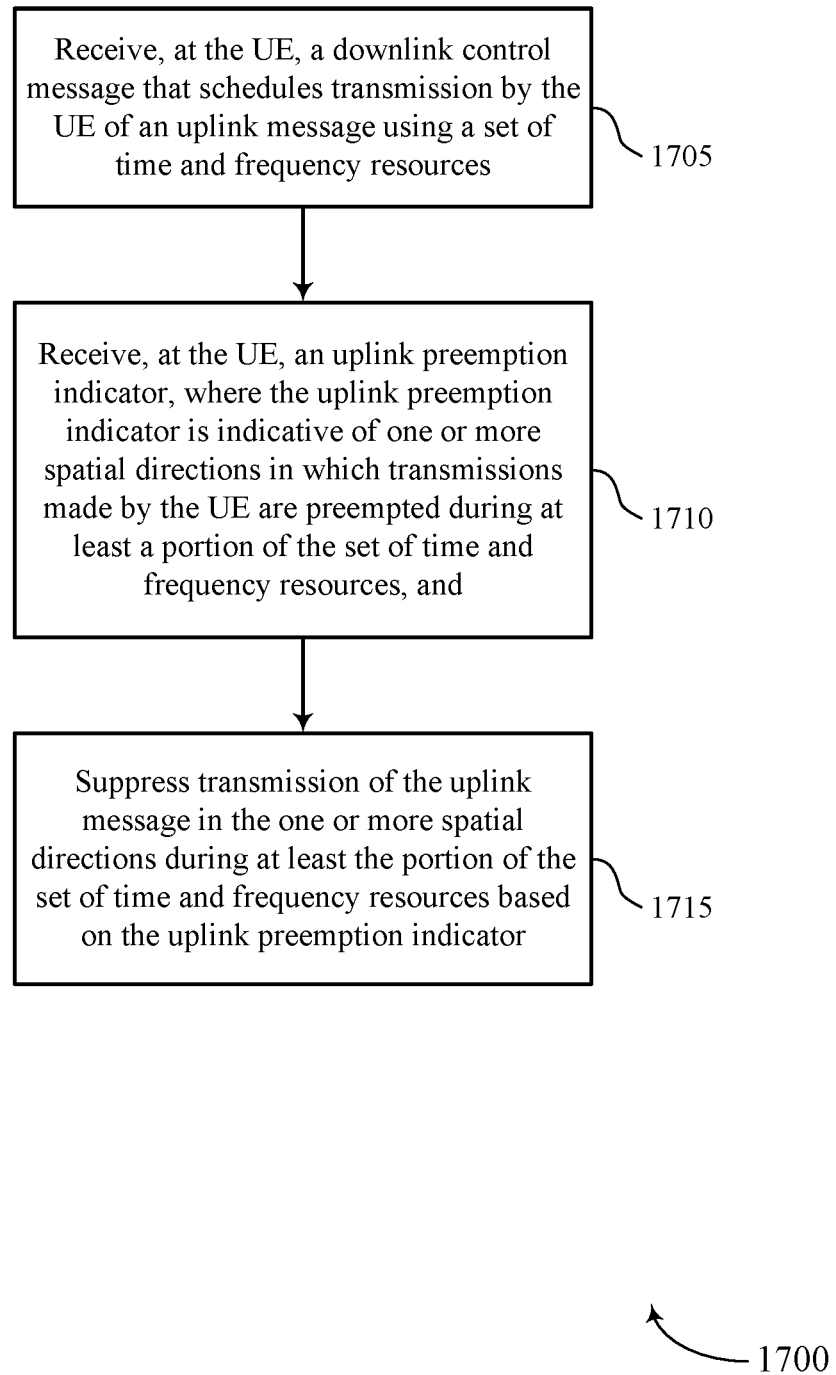
FIGS. 17 through 23 show flowcharts illustrating methods that support communication preemption applicability techniques in accordance with aspects of the present disclosure.

FIG. 17 shows a flowchart illustrating a method 1700 that supports communication preemption applicability techniques in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive, at the UE, a downlink control message that schedules transmission by the UE of an uplink message using a set of time and frequency resources. The operations of 1705 may be performed according to the methods described herein. In some examples, aspects of the operations of 1705 may be performed by a scheduling manager as described with reference to FIGS. 9 through 12.

At 1710, the UE may receive, at the UE, an uplink preemption indicator, where the uplink preemption indicator is indicative of one or more spatial directions in which transmissions made by the UE are preempted during at least a portion of the set of time and frequency resources. The operations of 1710 may be performed according to the methods described herein. In some examples, aspects of the operations of 1710 may be performed by an ULPI manager as described with reference to FIGS. 9 through 12.

At 1715, the UE may suppress transmission of the uplink message in the one or more spatial directions during at least the portion of the set of time and frequency resources based on the uplink preemption indicator. The operations of 1715 may be performed according to the methods described herein. In some examples, aspects of the operations of 1715 may be performed by a spatial transmission manager as described with reference to FIGS. 9 through 12.

Figure 18:
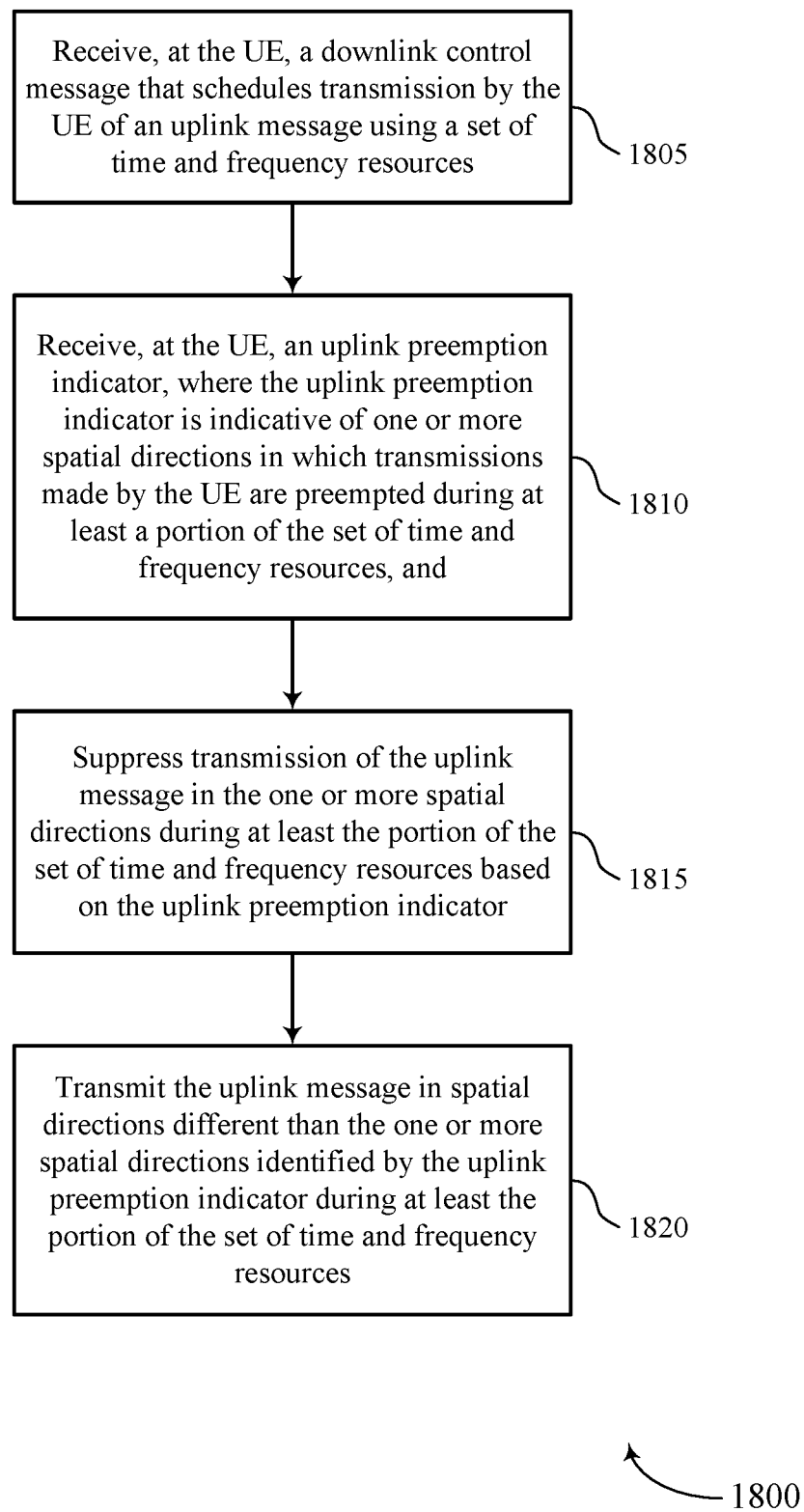

FIG. 18 shows a flowchart illustrating a method 1800 that supports communication preemption applicability techniques in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive, at the UE, a downlink control message that schedules transmission by the UE of an uplink message using a set of time and frequency resources. The operations of 1805 may be performed according to the methods described herein. In some examples, aspects of the operations of 1805 may be performed by a scheduling manager as described with reference to FIGS. 9 through 12.

At 1810, the UE may receive, at the UE, an uplink preemption indicator, where the uplink preemption indicator is indicative of one or more spatial directions in which transmissions made by the UE are preempted during at least a portion of the set of time and frequency resources. The operations of 1810 may be performed according to the methods described herein. In some examples, aspects of the operations of 1810 may be performed by an ULPI manager as described with reference to FIGS. 9 through 12.

At 1815, the UE may suppress transmission of the uplink message in the one or more spatial directions during at least the portion of the set of time and frequency resources based on the uplink preemption indicator. The operations of 1815 may be performed according to the methods described herein. In some examples, aspects of the operations of 1815 may be performed by a spatial transmission manager as described with reference to FIGS. 9 through 12.

At 1820, the UE may transmit the uplink message in spatial directions different than the one or more spatial directions identified by the uplink preemption indicator during at least the portion of the set of time and frequency resources. The operations of 1820 may be performed according to the methods described herein. In some examples, aspects of the operations of 1820 may be performed by a spatial transmission manager as described with reference to FIGS. 9 through 12.

Figure 19:
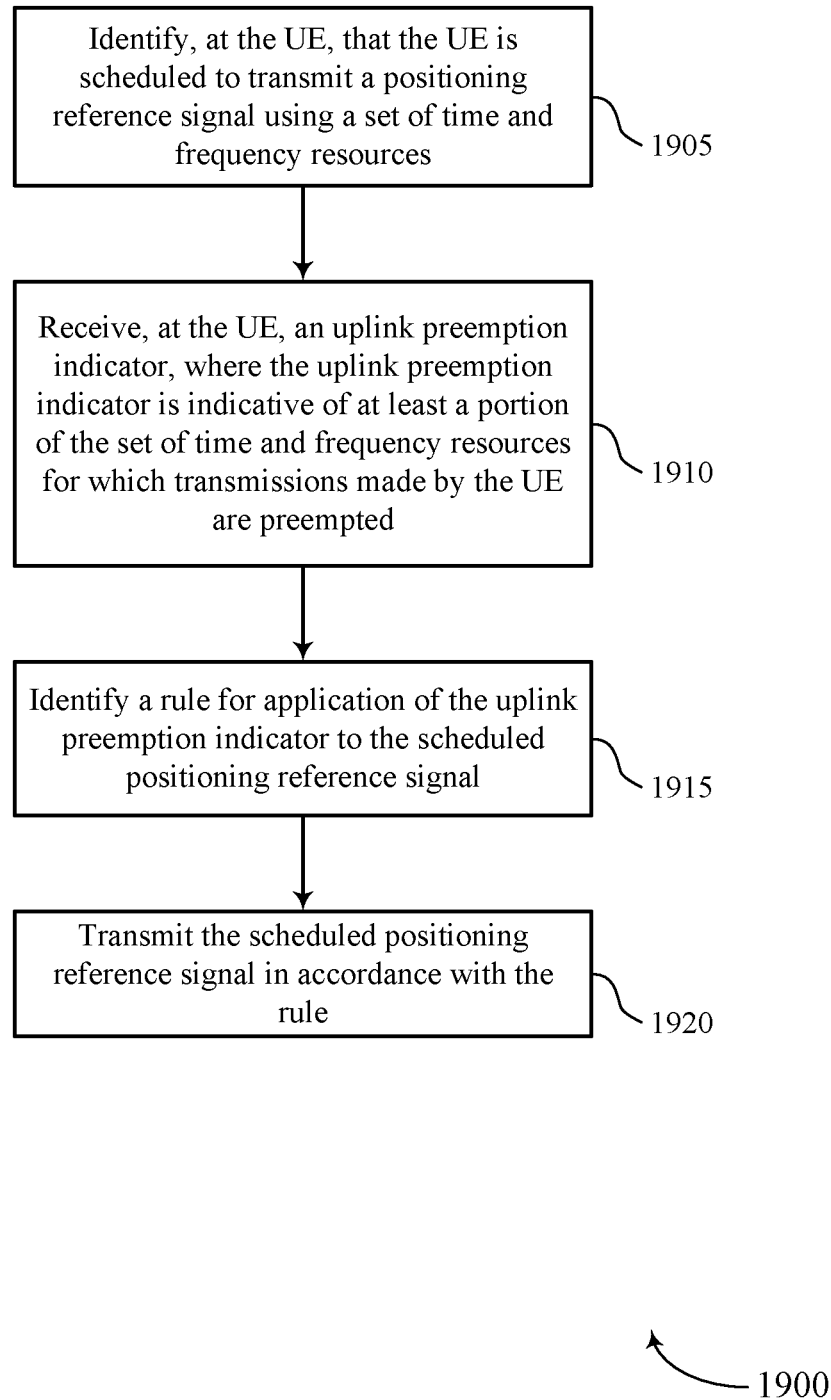

FIG. 19 shows a flowchart illustrating a method 1900 that supports communication preemption applicability techniques in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may identify, at the UE, that the UE is scheduled to transmit a positioning reference signal using a set of time and frequency resources. The operations of 1905 may be performed according to the methods described herein. In some examples, aspects of the operations of 1905 may be performed by a RS manager as described with reference to FIGS. 9 through 12.

At 1910, the UE may receive, at the UE, an uplink preemption indicator, where the uplink preemption indicator is indicative of at least a portion of the set of time and frequency resources for which transmissions made by the UE are preempted. The operations of 1910 may be performed according to the methods described herein. In some examples, aspects of the operations of 1910 may be performed by an ULPI manager as described with reference to FIGS. 9 through 12.

At 1915, the UE may identify a rule for application of the uplink preemption indicator to the scheduled positioning reference signal. The operations of 1915 may be performed according to the methods described herein. In some examples, aspects of the operations of 1915 may be performed by an ULPI manager as described with reference to FIGS. 9 through 12.

At 1920, the UE may transmit the scheduled positioning reference signal in accordance with the rule. The operations of 1920 may be performed according to the methods described herein. In some examples, aspects of the operations of 1920 may be performed by a RS manager as described with reference to FIGS. 9 through 12.

Figure 20:
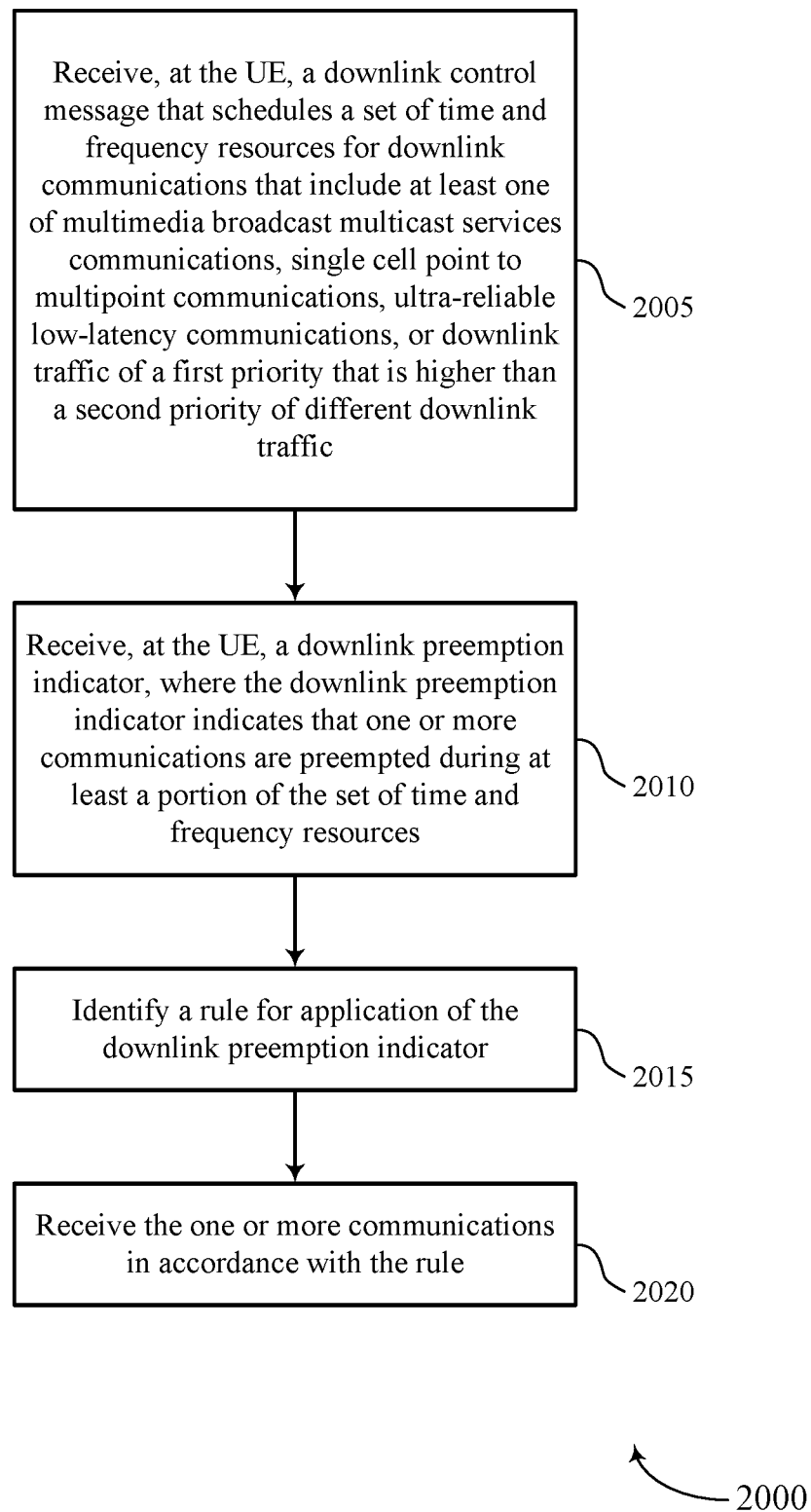

FIG. 20 shows a flowchart illustrating a method 2000 that supports communication preemption applicability techniques in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, at the UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different downlink traffic. The operations of 2005 may be performed according to the methods described herein. In some examples, aspects of the operations of 2005 may be performed by a scheduling manager as described with reference to FIGS. 9 through 12.

At 2010, the UE may receive, at the UE, a downlink preemption indicator, where the downlink preemption indicator indicates that one or more communications are preempted during at least a portion of the set of time and frequency resources. The operations of 2010 may be performed according to the methods described herein. In some examples, aspects of the operations of 2010 may be performed by a DLPI manager as described with reference to FIGS. 9 through 12.

At 2015, the UE may identify a rule for application of the downlink preemption indicator. The operations of 2015 may be performed according to the methods described herein. In some examples, aspects of the operations of 2015 may be performed by a DLPI manager as described with reference to FIGS. 9 through 12.

At 2020, the UE may receive the one or more communications in accordance with the rule. The operations of 2020 may be performed according to the methods described herein. In some examples, aspects of the operations of 2020 may be performed by a downlink communications manager as described with reference to FIGS. 9 through 12.

Figure 21:
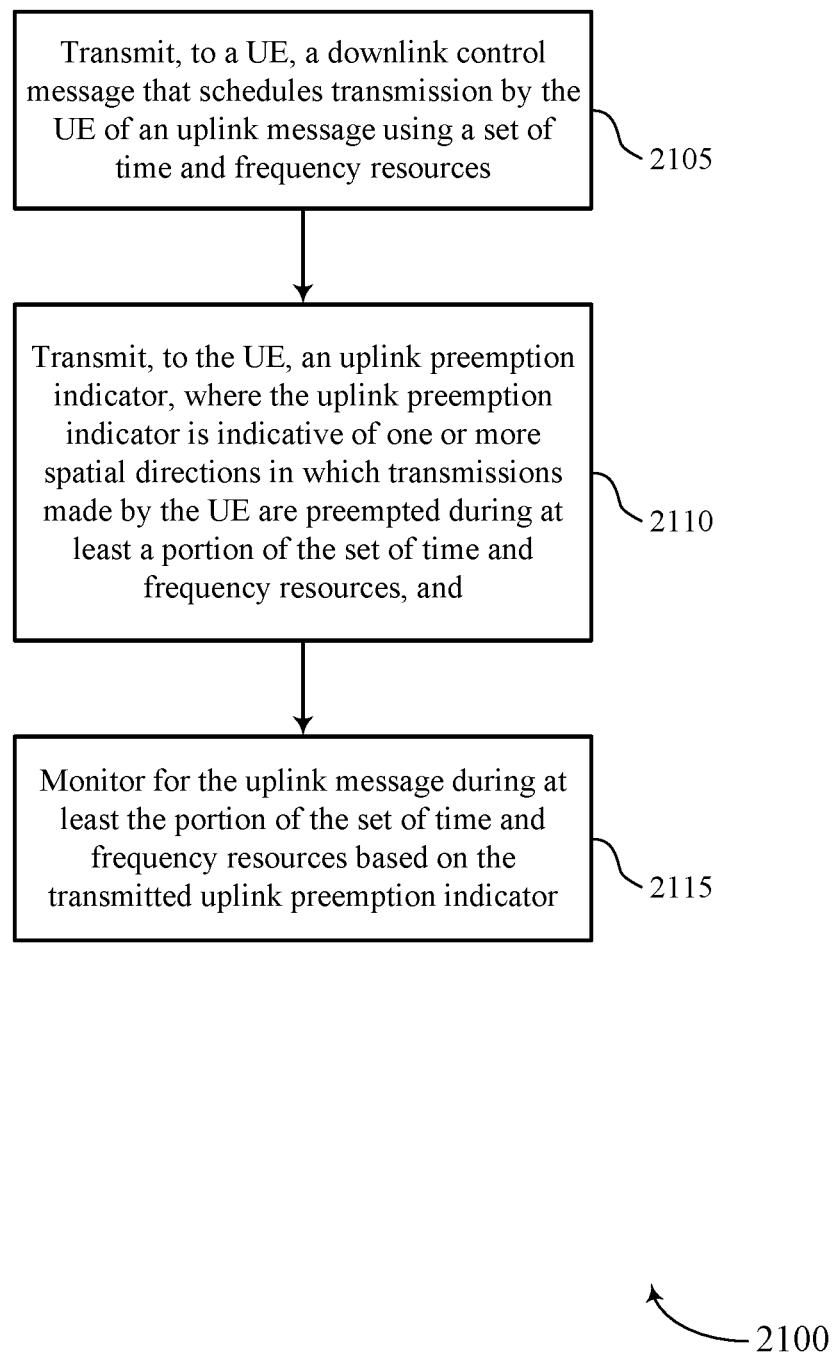

FIG. 21 shows a flowchart illustrating a method 2100 that supports communication preemption applicability techniques in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a downlink control message that schedules transmission by the UE of an uplink message using a set of time and frequency resources. The operations of 2105 may be performed according to the methods described herein. In some examples, aspects of the operations of 2105 may be performed by a scheduling manager as described with reference to FIGS. 13 through 16.

At 2110, the base station may transmit, to the UE, an uplink preemption indicator, where the uplink preemption indicator is indicative of one or more spatial directions in which transmissions made by the UE are preempted during at least a portion of the set of time and frequency resources. The operations of 2110 may be performed according to the methods described herein. In some examples, aspects of the operations of 2110 may be performed by an ULPI manager as described with reference to FIGS. 13 through 16.

At 2115, the base station may monitor for the uplink message during at least the portion of the set of time and frequency resources based on the transmitted uplink preemption indicator. The operations of 2115 may be performed according to the methods described herein. In some examples, aspects of the operations of 2115 may be performed by an uplink communications manager as described with reference to FIGS. 13 through 16.

Figure 22:
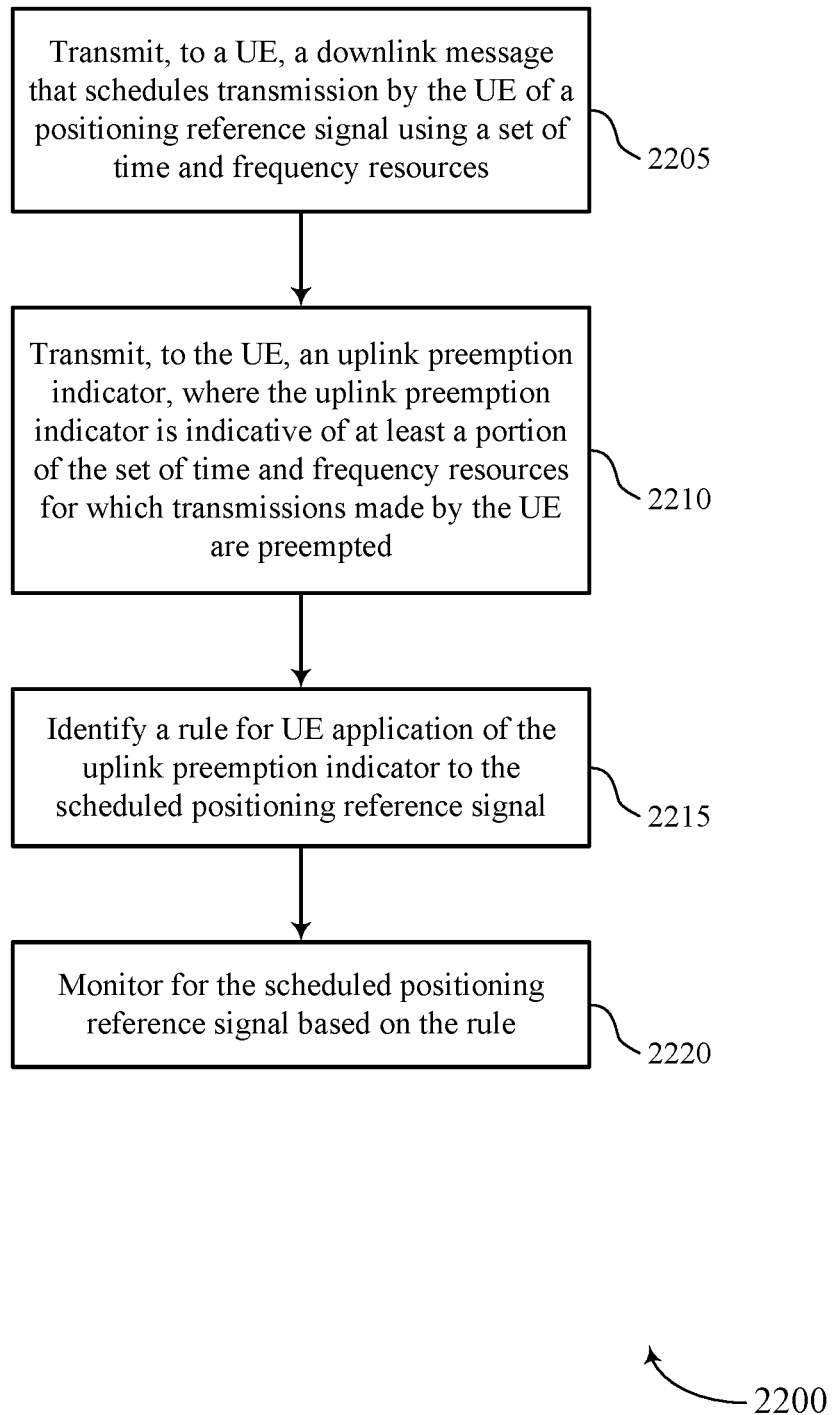

FIG. 22 shows a flowchart illustrating a method 2200 that supports communication preemption applicability techniques in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a downlink message that schedules transmission by the UE of a positioning reference signal using a set of time and frequency resources. The operations of 2205 may be performed according to the methods described herein. In some examples, aspects of the operations of 2205 may be performed by a scheduling manager as described with reference to FIGS. 13 through 16.

At 2210, the base station may transmit, to the UE, an uplink preemption indicator, where the uplink preemption indicator is indicative of at least a portion of the set of time and frequency resources for which transmissions made by the UE are preempted. The operations of 2210 may be performed according to the methods described herein. In some examples, aspects of the operations of 2210 may be performed by an ULPI manager as described with reference to FIGS. 13 through 16.

At 2215, the base station may identify a rule for UE application of the uplink preemption indicator to the scheduled positioning reference signal. The operations of 2215 may be performed according to the methods described herein. In some examples, aspects of the operations of 2215 may be performed by an ULPI manager as described with reference to FIGS. 13 through 16.

At 2220, the base station may monitor for the scheduled positioning reference signal based on the rule. The operations of 2220 may be performed according to the methods described herein. In some examples, aspects of the operations of 2220 may be performed by an uplink communications manager as described with reference to FIGS. 13 through 16.

Figure 23:
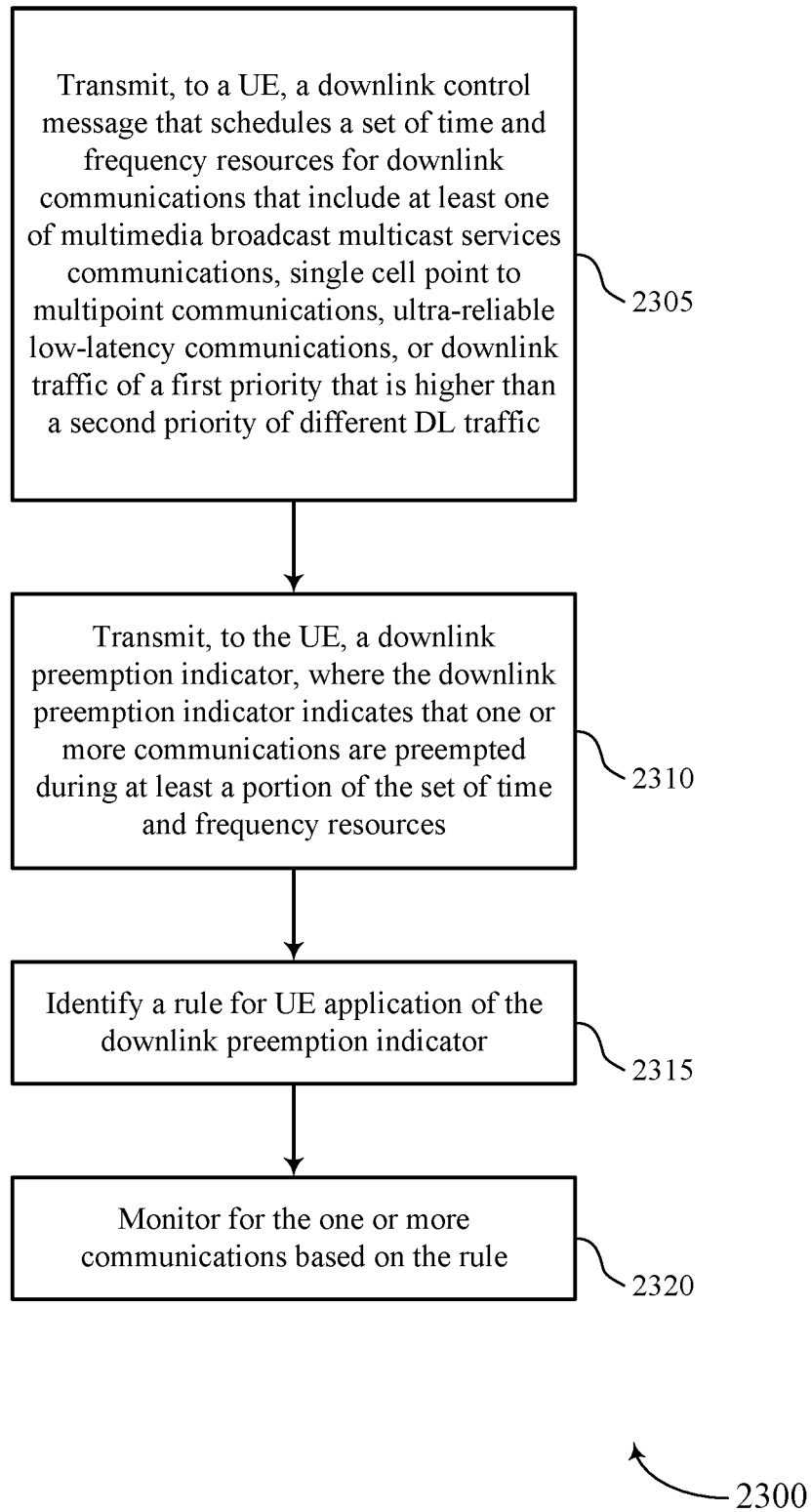

FIG. 23 shows a flowchart illustrating a method 2300 that supports communication preemption applicability techniques in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a downlink control message that schedules a set of time and frequency resources for downlink communications that include at least one of multimedia broadcast multicast services communications, single cell point to multipoint communications, ultra-reliable low-latency communications, or downlink traffic of a first priority that is higher than a second priority of different DL traffic. The operations of 2305 may be performed according to the methods described herein. In some examples, aspects of the operations of 2305 may be performed by a scheduling manager as described with reference to FIGS. 13 through 16.

At 2310, the base station may transmit, to the UE, a downlink preemption indicator, where the downlink preemption indicator indicates that one or more communications are preempted during at least a portion of the set of time and frequency resources. The operations of 2310 may be performed according to the methods described herein. In some examples, aspects of the operations of 2310 may be performed by a DLPI manager as described with reference to FIGS. 13 through 16.

At 2315, the base station may identify a rule for UE application of the downlink preemption indicator. The operations of 2315 may be performed according to the methods described herein. In some examples, aspects of the operations of 2315 may be performed by a DLPI manager as described with reference to FIGS. 13 through 16.

At 2320, the base station may monitor for the one or more communications based on the rule. The operations of 2320 may be performed according to the methods described herein. In some examples, aspects of the operations of 2320 may be performed by a downlink communications manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, at the UE, a downlink control message that schedules transmission by the UE of an uplink message using a plurality of time and frequency resources;
    receiving, at the UE, an uplink preemption indicator, wherein the uplink preemption indicator is indicative of one or more spatial directions in which transmissions made by the UE are preempted during at least a portion of the plurality of time and frequency resources, and wherein the uplink preemption indicator comprises a bit sequence, the bit sequence comprising a first subset that indicates the portion of the plurality of time and frequency resources and a second subset that indicates the one or more spatial directions;
    suppressing transmission of the uplink message in the one or more spatial directions during at least the portion of the plurality of time and frequency resources based at least in part on the uplink preemption indicator; and
    transmitting the uplink message in spatial directions different than the one or more spatial directions identified by the uplink preemption indicator during at least the portion of the plurality of time and frequency resources.

2. The method of claim 1, further comprising:
    identifying that the uplink preemption indicator includes one or more bits that correspond to a sounding reference signal resource indicator; and
    determining the one or more spatial directions based at least in part on the one or more bits.

3. The method of claim 2, wherein determining the one or more spatial directions comprises:
    identifying one or more panels in which transmissions made by the UE are preempted during at least the portion of the plurality of time and frequency resources based at least in part on the one or more bits, wherein the one or more spatial directions are determined based at least in part on the identified one or more panels.

4. The method of claim 2, wherein determining the one or more spatial directions comprises:
    identifying one or more beams in which transmissions made by the UE are preempted during at least the portion of the plurality of time and frequency resources based at least in part on the one or more bits, wherein the one or more spatial directions are determined based at least in part on the identified one or more beams.

5. The method of claim 2, wherein determining the one or more spatial directions comprises:
    identifying one or more precoders in which transmissions made by the UE are preempted during at least the portion of the plurality of time and frequency resources based at least in part on the one or more bits, wherein the one or more spatial directions are determined based at least in part on the identified one or more precoders.

6. The method of claim 1, further comprising:
    receiving radio resource control signaling indicative of a relationship between the second subset of the bit sequence and the one or more spatial directions.

7. The method of claim 6, wherein the relationship indicates a mapping of one or more sounding reference signal resource indicators to one or more bit values represented by the second subset of the bit sequence.

8. An apparatus for wireless communication at a user equipment (UE), comprising:
    a processor;
    memory in electronic communication with the processor; and
    instructions stored in the memory and executable by the processor to cause the apparatus to:
        receive, at the UE, a downlink control message that schedules transmission by the UE of an uplink message using a plurality of time and frequency resources;
        receive, at the UE, an uplink preemption indicator, wherein the uplink preemption indicator is indicative of one or more spatial directions in which transmissions made by the UE are preempted during at least a portion of the plurality of time and frequency resources, and wherein the uplink preemption indicator comprises a bit sequence, the bit sequence comprising a first subset that indicates the portion of the plurality of time and frequency resources and a second subset that indicates the one or more spatial directions;
        suppress transmission of the uplink message in the one or more spatial directions during at least the portion of the plurality of time and frequency resources based at least in part on the uplink preemption indicator; and
        transmit the uplink message in spatial directions different than the one or more spatial directions identified by the uplink preemption indicator during at least the portion of the plurality of time and frequency resources.

9. The apparatus of claim 8, wherein the instructions are further executable by the processor to cause the apparatus to:

identify that the uplink preemption indicator includes one or more bits that correspond to a sounding reference signal resource indicator; and determine the one or more spatial directions based at least in part on the one or more bits.

10. The apparatus of claim 9, wherein the instructions to determine the one or more spatial directions are executable by the processor to cause the apparatus to:

identify one or more panels in which transmissions made by the UE are preempted during at least the portion of the plurality of time and frequency resources based at least in part on the one or more bits, wherein the one or more spatial directions are determined based at least in part on the identified one or more panels.

11. The apparatus of claim 9, wherein the instructions to determine the one or more spatial directions are executable by the processor to cause the apparatus to:

identify one or more beams in which transmissions made by the UE are preempted during at least the portion of the plurality of time and frequency resources based at least in part on the one or more bits, wherein the one or more spatial directions are determined based at least in part on the identified one or more beams.

12. The apparatus of claim 9, wherein the instructions to determine the one or more spatial directions are executable by the processor to cause the apparatus to:

identify one or more precoders in which transmissions made by the UE are preempted during at least the portion of the plurality of time and frequency resources based at least in part on the one or more bits, wherein the one or more spatial directions are determined based at least in part on the identified one or more precoders.

13. The apparatus of claim 8, wherein the instructions are further executable by the processor to cause the apparatus to:

receive radio resource control signaling indicative of a relationship between the second subset of the bit sequence and the one or more spatial directions.

14. The apparatus of claim 13, wherein the relationship indicates a mapping of one or more sounding reference signal resource indicators to one or more bit values represented by the second subset of the bit sequence.

15. An apparatus for wireless communication at a user equipment (UE), comprising:

means for receiving, at the UE, a downlink control message that schedules transmission by the UE of an uplink message using a plurality of time and frequency resources;

means for receiving, at the UE, an uplink preemption indicator, wherein the uplink preemption indicator is indicative of one or more spatial directions in which transmissions made by the UE are preempted during at least a portion of the plurality of time and frequency resources, and wherein the uplink preemption indicator comprises a bit sequence, the bit sequence comprising a first subset that indicates the portion of the plurality of time and frequency resources and a second subset that indicates the one or more spatial directions;

means for suppressing transmission of the uplink message in the one or more spatial directions during at least the portion of the plurality of time and frequency resources based at least in part on the uplink preemption indicator; and means for transmitting the uplink message in spatial directions different than the one or more spatial directions identified by the uplink preemption indicator during at least the portion of the plurality of time and frequency resources.

16. A non-transitory computer-readable medium storing code for wireless communication at a user equipment (UE), the code comprising instructions executable by a processor to:

receive, at the UE, a downlink control message that schedules transmission by the UE of an uplink message using a plurality of time and frequency resources;

receive, at the UE, an uplink preemption indicator, wherein the uplink preemption indicator is indicative of one or more spatial directions in which transmissions made by the UE are preempted during at least a portion of the plurality of time and frequency resources, and wherein the uplink preemption indicator comprises a bit sequence, the bit sequence comprising a first subset that indicates the portion of the plurality of time and frequency resources and a second subset that indicates the one or more spatial directions;

suppress transmission of the uplink message in the one or more spatial directions during at least the portion of the plurality of time and frequency resources based at least in part on the uplink preemption indicator; and transmit the uplink message in spatial directions different than the one or more spatial directions identified by the uplink preemption indicator during at least the portion of the plurality of time and frequency resources.

* * * * *